(12) United States Patent
Wang et al.

(10) Patent No.: US 11,662,551 B2
(45) Date of Patent: May 30, 2023

(54) OPTICAL LENS ASSEMBLY, IMAGE CAPTURING UNIT AND ELECTRONIC DEVICE

(71) Applicant: LARGAN PRECISION CO., LTD., Taichung (TW)

(72) Inventors: Kuo-Jui Wang, Taichung (TW); Kuan Chun Wang, Taichung (TW); Hung-Shuo Chen, Taichung (TW); Jin Sen Wang, Taichung (TW); Syuan Ruei Lai, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 352 days.

(21) Appl. No.: 16/814,914

(22) Filed: Mar. 10, 2020

(65) Prior Publication Data
US 2021/0191075 A1 Jun. 24, 2021

(30) Foreign Application Priority Data
Dec. 20, 2019 (TW) .................................. 108146927

(51) Int. Cl.
*G02B 9/34* (2006.01)
*G02B 13/18* (2006.01)
(Continued)

(52) U.S. Cl.
CPC ............. *G02B 9/34* (2013.01); *G02B 13/004* (2013.01); *G02B 13/18* (2013.01); *G02B 3/04* (2013.01);
(Continued)

(58) Field of Classification Search
CPC ........ G02B 13/004; G02B 9/34; G02B 13/18; G02B 5/005; G02B 27/0025; G02B 13/14; G02B 3/04
(Continued)

(56) References Cited

U.S. PATENT DOCUMENTS 7,355,801 B2 * 4/2008 Chen .................... G02B 13/004
359/740
7,826,149 B2 * 11/2010 Tang ...................... G02B 13/22
359/773
(Continued)

FOREIGN PATENT DOCUMENTS

CN  105425367 A  3/2016
CN  108205188 A  6/2018
(Continued)

*Primary Examiner* — Evelyn A Lester
(74) *Attorney, Agent, or Firm* — Maschoff Brennan

(57) ABSTRACT

An optical lens assembly includes four lens elements which are, in order from an object side to an image side along an imaging optical path: a first lens element, a second lens element, a third lens element and a fourth lens element. The first lens element has positive refractive power. The second lens element has an image-side surface being concave in a paraxial region thereof. The third lens element has an object-side surface being concave in a paraxial region thereof. The fourth lens element with negative refractive power has an object-side surface being convex in a paraxial region thereof and an image-side surface being concave in a paraxial region thereof, and at least one of the object-side surface and the image-side surface of the fourth lens element has at least one inflection point in an off-axis region thereof.

31 Claims, 41 Drawing Sheets

(51) Int. Cl.
- *G02B 13/00* (2006.01)
- *G02B 13/14* (2006.01)
- *G02B 5/00* (2006.01)
- *G02B 27/00* (2006.01)
- *G02B 3/04* (2006.01)

(52) U.S. Cl.
CPC .............. *G02B 5/005* (2013.01); *G02B 13/14* (2013.01); *G02B 27/0025* (2013.01)

(58) Field of Classification Search
USPC .................................. 359/715, 740, 771–773
See application file for complete search history.

(56) References Cited

U.S. PATENT DOCUMENTS

| | | | | |
|---|---|---|---|---|
| 7,920,340 | B2* | 4/2011 | Tang | G02B 9/34 359/773 |
| 7,957,079 | B2* | 6/2011 | Tang | G02B 9/34 359/773 |
| 7,969,664 | B2* | 6/2011 | Tang | G02B 13/004 359/771 |
| 7,995,292 | B2* | 8/2011 | Onoda | G02B 13/004 359/773 |
| 8,004,777 | B2* | 8/2011 | Sano | G02B 9/34 359/773 |
| 8,045,278 | B2* | 10/2011 | Shih | G02B 13/004 359/773 |
| 8,149,523 | B2* | 4/2012 | Ozaki | G02B 13/18 359/773 |
| 8,169,528 | B2* | 5/2012 | Chen | G02B 13/004 348/335 |
| 8,179,470 | B2* | 5/2012 | Chen | G02B 9/34 348/335 |
| 8,199,418 | B2* | 6/2012 | Chen | G02B 9/34 359/773 |
| 8,351,136 | B2* | 1/2013 | Tsai | G02B 9/34 359/772 |
| 8,358,473 | B2* | 1/2013 | Tang | G02B 13/004 359/740 |
| 8,400,553 | B2* | 3/2013 | Yamashita | G02B 9/34 359/773 |
| 8,405,919 | B2* | 3/2013 | Tsai | G02B 9/34 359/740 |
| 8,432,620 | B2* | 4/2013 | Park | G02B 13/004 359/740 |
| 8,456,766 | B2* | 6/2013 | Tang | G02B 9/34 359/771 |
| 8,462,447 | B2* | 6/2013 | Park | G02B 13/004 359/708 |
| 8,477,433 | B2 | 7/2013 | Huang et al. | |
| 8,498,064 | B2* | 7/2013 | Okano | G02B 13/004 359/772 |
| 8,576,499 | B2* | 11/2013 | Okano | G02B 9/34 359/715 |
| 8,582,215 | B2* | 11/2013 | Chen | G02B 9/34 359/773 |
| 8,665,538 | B2* | 3/2014 | Chung | G02B 13/18 359/773 |
| 8,717,690 | B2* | 5/2014 | Chen | G02B 13/004 359/773 |
| 8,730,594 | B2* | 5/2014 | Ise | G02B 13/004 359/773 |
| 8,736,985 | B2* | 5/2014 | Cho | G02B 13/18 359/773 |
| 8,760,776 | B2* | 6/2014 | Hsieh | G02B 9/34 359/773 |
| 8,773,772 | B2* | 7/2014 | An | G02B 13/004 359/771 |
| 8,773,782 | B2* | 7/2014 | Chou | G02B 13/0045 359/773 |
| 8,817,390 | B2* | 8/2014 | Hashimoto | G02B 13/004 359/773 |
| 8,848,298 | B2* | 9/2014 | Tsai | G02B 27/64 359/772 |
| 8,908,291 | B1* | 12/2014 | Chung | G02B 13/004 359/715 |
| 9,316,809 | B2 | 4/2016 | Hsu et al. | |
| 10,303,916 | B2 | 5/2019 | Bazrafkan | |
| 10,466,442 | B2 | 11/2019 | Chen et al. | |
| 11,372,204 | B2* | 6/2022 | Chen | G02B 9/62 |
| 2009/0207507 | A1* | 8/2009 | Shinohara | G02B 9/34 359/773 |
| 2009/0257133 | A1* | 10/2009 | Sano | G02B 9/34 359/773 |
| 2010/0060996 | A1* | 3/2010 | Ozaki | G02B 13/18 359/773 |
| 2010/0097709 | A1* | 4/2010 | Tsai | G02B 9/34 359/773 |
| 2011/0069401 | A1* | 3/2011 | Jo | G02B 13/004 359/773 |
| 2011/0090572 | A1* | 4/2011 | Tang | G02B 9/34 359/715 |
| 2011/0090573 | A1* | 4/2011 | Tang | G02B 9/34 359/773 |
| 2011/0096412 | A1* | 4/2011 | Tang | G02B 9/34 359/715 |
| 2011/0115962 | A1* | 5/2011 | Chen | G02B 13/004 359/715 |
| 2011/0199691 | A1* | 8/2011 | Park | G02B 13/004 359/715 |
| 2011/0205640 | A1* | 8/2011 | Shih | G02B 9/34 359/715 |
| 2011/0261470 | A1* | 10/2011 | Chen | G02B 13/004 359/715 |
| 2011/0261471 | A1* | 10/2011 | Taniyama | H04N 5/2254 359/773 |
| 2012/0013998 | A1* | 1/2012 | Tang | G02B 13/004 359/715 |
| 2012/0019706 | A1* | 1/2012 | Yamashita | G02B 9/34 359/715 |
| 2012/0033124 | A1* | 2/2012 | Tsai | G02B 13/18 359/715 |
| 2012/0075723 | A1* | 3/2012 | Takei | G02B 13/004 359/715 |
| 2012/0099014 | A1* | 4/2012 | Huang | G02B 13/004 359/715 |
| 2012/0140105 | A1* | 6/2012 | Tang | G02B 9/34 359/715 |
| 2012/0261550 | A1* | 10/2012 | Chou | G02B 13/0045 359/716 |
| 2012/0287514 | A1* | 11/2012 | Tang | G02B 13/22 359/715 |
| 2012/0327521 | A1* | 12/2012 | Tsai | G02B 9/34 359/715 |
| 2013/0044379 | A1* | 2/2013 | Hsieh | G02B 13/004 359/715 |
| 2013/0063827 | A1* | 3/2013 | Hsu | G02B 13/004 359/715 |
| 2013/0077182 | A1* | 3/2013 | Park | G02B 13/004 359/715 |
| 2013/0265652 | A1* | 10/2013 | An | G02B 13/18 359/773 |
| 2013/0335836 | A1* | 12/2013 | Chung | G02B 9/34 359/715 |
| 2014/0002711 | A1* | 1/2014 | Tsai | G02B 13/18 359/715 |
| 2014/0098431 | A1 | 4/2014 | Kwon | |
| 2014/0347515 | A1* | 11/2014 | Iba | G03B 17/565 359/715 |
| 2015/0043092 | A1* | 2/2015 | Suzuki | G02B 9/34 359/715 |
| 2015/0219877 | A1* | 8/2015 | Zhao | G02B 13/004 359/773 |
| 2015/0370039 | A1 | 12/2015 | Bone | |
| 2016/0154207 | A1* | 6/2016 | Son | G02B 13/004 359/715 |
| 2016/0154216 | A1* | 6/2016 | Liao | G02B 13/004 359/715 |

(56) References Cited

U.S. PATENT DOCUMENTS

| | | | |
|---|---|---|---|
| 2016/0161708 A1* | 6/2016 | Jang | G02B 13/004 |
| | | | 359/715 |
| 2017/0235099 A1 | 8/2017 | Tsai et al. | |
| 2019/0285848 A1 | 9/2019 | Hsieh et al. | |
| 2019/0285849 A1 | 9/2019 | Hsieh et al. | |
| 2019/0377159 A1 | 12/2019 | Deschauer et al. | |
| 2020/0018930 A1 | 1/2020 | Tseng et al. | |
| 2020/0150387 A1 | 5/2020 | Kim et al. | |
| 2020/0183128 A1 | 6/2020 | Lee et al. | |
| 2022/0086318 A1 | 3/2022 | Kim | |

FOREIGN PATENT DOCUMENTS

| | | |
|---|---|---|
| CN | 108459393 A | 8/2018 |
| CN | 108459394 A | 8/2018 |
| CN | 207764463 U | 8/2018 |
| CN | 109814233 A | 5/2019 |
| CN | 109814234 A | 5/2019 |
| CN | 208907940 U | 5/2019 |
| CN | 110174745 A | 8/2019 |
| CN | 110221414 A | 9/2019 |
| CN | 110488456 A | 11/2019 |
| CN | 110515181 A | 11/2019 |
| CN | 110908076 A | 3/2020 |
| JP | 2011-95301 A | 5/2011 |
| TW | I634360 B | 9/2018 |
| TW | I665484 B | 7/2019 |

\* cited by examiner

US 11,662,551 B2

OPTICAL LENS ASSEMBLY, IMAGE CAPTURING UNIT AND ELECTRONIC DEVICE

RELATED APPLICATIONS

This application claims priority to Taiwan Application 108146927, filed on Dec. 20, 2019, which is incorporated by reference herein in its entirety.

BACKGROUND

Technical Field

The present disclosure relates to an optical lens assembly, an image capturing unit and an electronic device, more particularly to an optical lens assembly and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical lens assembly includes four lens elements. The four lens elements are, in order from an object side to an image side along an imaging optical path, a first lens element, a second lens element, a third lens element and a fourth lens element.

The first lens element has positive refractive power. The second lens element has an image-side surface being concave in a paraxial region thereof. The third lens element has an object-side surface being concave in a paraxial region thereof. The fourth lens element with negative refractive power has an object-side surface being convex in a paraxial region thereof and an image-side surface being concave in a paraxial region thereof, and at least one of the object-side surface and the image-side surface of the fourth lens element has at least one inflection point in an off-axis region thereof.

When an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, and a curvature radius of the object-side surface of the fourth lens element is R7, the following conditions are satisfied:

$Vd1+Vd2+Vd3+Vd4<130$;

$1.0<CT1/(T12+CT2)<2.20$;

$1.75<TD/BL$; and $0.10<fd/R7$.

According to another aspect of the present disclosure, an optical lens assembly includes four lens elements. The four lens elements are, in order from an object side to an image side along an imaging optical path, a first lens element, a second lens element, a third lens element and a fourth lens element.

The first lens element has positive refractive power. The second lens element has an image-side surface being concave in a paraxial region thereof. The third lens element has positive refractive power. The fourth lens element has an object-side surface being convex in a paraxial region thereof and an image-side surface being concave in a paraxial region thereof, and at least one of the object-side surface and the image-side surface of the fourth lens element has at least one inflection point in an off-axis region thereof.

When an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, and a curvature radius of the object-side surface of the fourth lens element is R7, the following conditions are satisfied:

$Vd1+Vd2+Vd3+Vd4<130$;

$1.05<CT1/(T12+CT2)$;

$1.75<TD/BL<20$; and $0.10<fd/R7$.

According to another aspect of the present disclosure, an optical lens assembly includes four lens elements. The four lens elements are, in order from an object side to an image side along an imaging optical path, a first lens element, a second lens element, a third lens element and a fourth lens element.

The first lens element has positive refractive power. The second lens element has an image-side surface being concave in a paraxial region thereof. The third lens element has positive refractive power. The fourth lens element with negative refractive power has an object-side surface being convex in a paraxial region thereof and an image-side surface being concave in a paraxial region thereof, and at least one of the object-side surface and the image-side surface of the fourth lens element has at least one inflection point in an off-axis region thereof.

When an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, a curvature radius of the image-side surface of the second lens element is R4, and a curvature radius of the object-side surface of the fourth lens element is R7, the following conditions are satisfied:

$Vd1+Vd2+Vd3+Vd4<130;$ $1.0<CT1/(T12+CT2);$ $1.75<TD/BL;$ $0.10<fd/R7;$ and $0.10<fd/R4.$ According to another aspect of the present disclosure, an image capturing unit includes one of the aforementioned optical lens assemblies and an image sensor, wherein the image sensor is disposed on the image surface of the optical lens assembly.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical lens assembly includes four lens elements. The four lens elements are, in order from an object side to an image side along an imaging optical path, a first lens element, a second lens element, a third lens element and a fourth lens element.

The first lens element has positive refractive power. Therefore, it is favorable for light converging at the object side of the optical lens assembly so as to reduce the total track length, thereby achieving compactness.

The second lens element can have positive refractive power. The second lens element can also have an object-side surface being convex in a paraxial region thereof and has an image-side surface being concave in a paraxial region thereof. Therefore, it is favorable for distributing the positive refractive power so as to correct aberrations generated when reducing the total track length.

The third lens element can have positive refractive power and can also have an object-side surface being concave in a paraxial region thereof. Therefore, it is favorable for balancing the distribution of positive refractive power in the optical lens assembly so as to reduce the sensitivity and spherical aberration.

The fourth lens element can have negative refractive power. The fourth lens element has an object-side surface being convex in a paraxial region thereof and an image-side surface being concave in a paraxial region thereof. Therefore, it is favorable for balancing the positive refractive power at the object side and correcting field curvature of the fourth lens element.

Each of the first lens element, the second lens element, the third lens element and the fourth lens element can have at least one of an object-side surface and an image-side surface thereof having at least one inflection point in an off-axis region thereof. Therefore, it is favorable for the peripheral light converging effectively so as to reduce the total track length of the optical lens assembly. Moreover, at least one of the object-side surface and the image-side surface of the fourth lens element has at least one inflection point in the off-axis region thereof. Please refer to FIG. 29, which shows a schematic view of some inflection points P of the lens elements (410, 420, 430 and 440) according to the 4th embodiment of the present disclosure. There is only one inflection point marked on each lens surface in FIG. 29 for exemplary purposes. However, there may be more than one inflection point on each of the lens surfaces.

Figure 29:
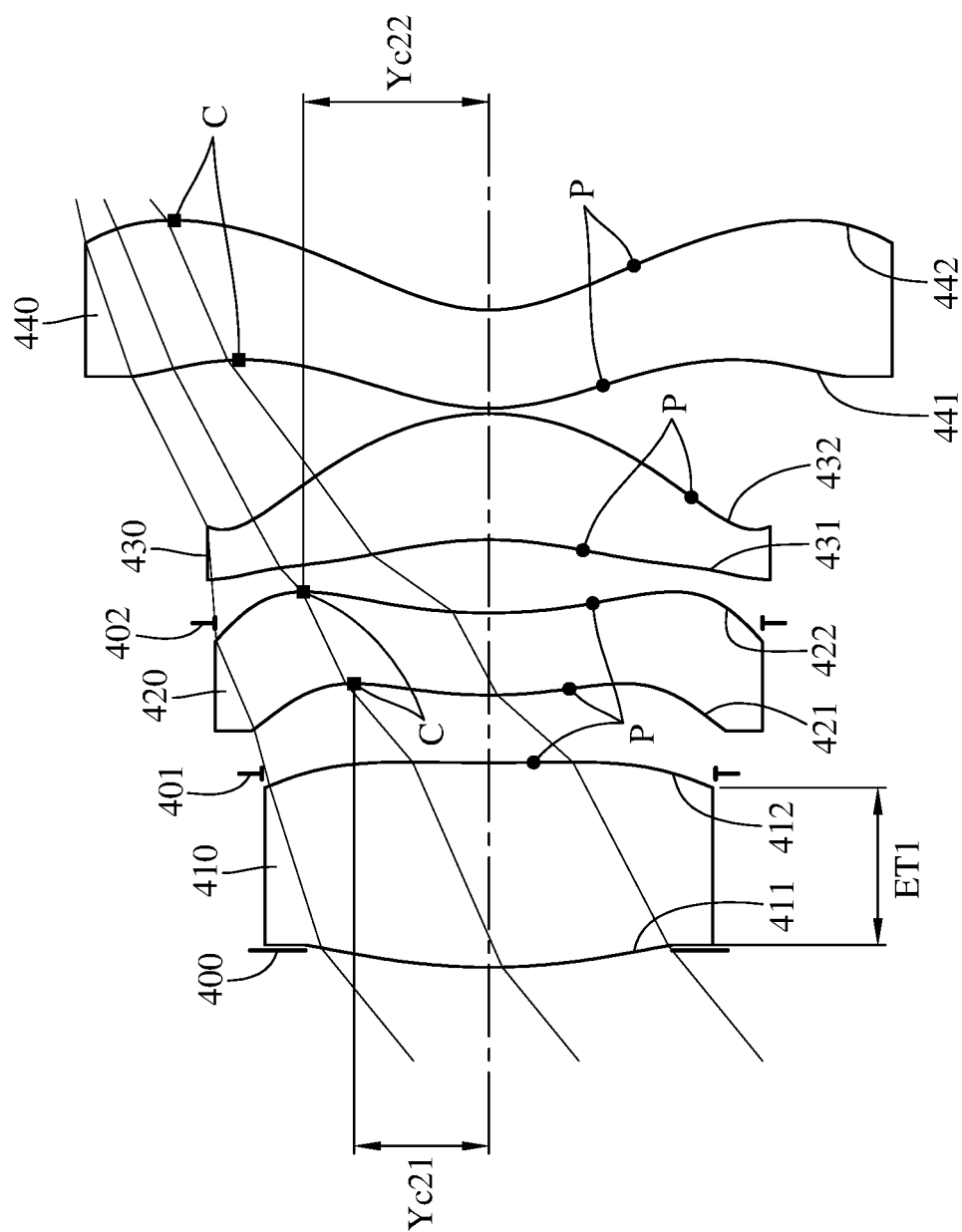
FIG. 29 shows a schematic view of Yc21, Yc22 and ET1 and several inflection points and critical points of the lens elements according to the 4th embodiment of the present disclosure.

Each of the first lens element, the second lens element, the third lens element and the fourth lens element can have at least one of the object-side surface and the image-side surface thereof having at least one critical point in the off-axis region thereof. Therefore, it is favorable for increasing the shape variation of the lens elements so as to reduce the size thereof and improve peripheral image quality of the optical lens assembly. Moreover, the object-side surface of the fourth lens element can have at least one concave critical point in the off-axis region thereof, and the image-side surface of the fourth lens element can have at least one convex critical point in the off-axis region thereof. Therefore, it is favorable for reducing the incident angle of peripheral light of the fourth lens element so as to correct field curvature. Moreover, the object-side surface of the second lens element can have at least one critical point in the off-axis region thereof. Moreover, the image-side surface of the second lens element can have at least one critical point in the off-axis region thereof. Please refer to FIG. 29, which shows a schematic view of critical points C of the object-side surface 421 and the image-side surface 422 of the second lens element 420, a concave critical point C of the object-side surface 441 of the fourth lens element 440 and a convex critical point of the image-side surface 442 of the fourth lens element 440. The critical points of the second and fourth lens elements in FIG. 29 are only exemplary. The other lens elements may also have one or more critical points.

When an Abbe number of the first lens element is Vd1, an Abbe number of the second lens element is Vd2, an Abbe number of the third lens element is Vd3, and an Abbe number of the fourth lens element is Vd4, the following condition is satisfied: Vd1+Vd2+Vd3+Vd4<130. Therefore, it is favorable for reducing effective radii by using materials with high refractive index when operated within a relatively long wavelength range, thereby further miniaturizing each lens element and the overall lens assembly. Moreover, the following condition can also be satisfied: 30<Vd1+Vd2+Vd3+Vd4<100. Moreover, the following condition can also be satisfied: 40<Vd1+Vd2+Vd3+Vd4<95. According to the present disclosure, the Abbe number Vd of one lens element is obtained from the following equation: Vd=(Nd−1)/(NF−NC), wherein Nd is the refractive index of said lens element at the wavelength of helium d-line (587.6 nm), NF is the refractive index of said lens element at the wavelength of hydrogen F-line (486.1 nm), and NC is the refractive index of said lens element at the wavelength of hydrogen C-line (656.3 nm).

When a central thickness of the first lens element is CT1, a central thickness of the second lens element is CT2, and an axial distance between the first lens element and the second lens element is T12, the following condition is satisfied: 1.0<CT1/(T12+CT2). Therefore, it is favorable for increasing the thickness of the positive first lens element so as to achieve a compact lens system, especially reducing the size of the lens system on the object side, and it is also favorable for reducing the curvature angle at the surface periphery of the first lens element so as to increase the manufacturability and reduce stray light. Moreover, the following condition can also be satisfied: 1.05<CT1/(T12+CT2). Moreover, the following condition can also be satisfied: 1.0<CT1/(T12+CT2)<2.20. Moreover, the following condition can also be satisfied: 1.10<CT1/(T12+CT2)<2.0. Moreover, the following condition can also be satisfied: 1.20<CT1/(T12+CT2)<1.75.

When an axial distance between the object-side surface of the first lens element and the image-side surface of the fourth lens element is TD, and an axial distance between the image-side surface of the fourth lens element and an image surface is BL, the following condition is satisfied: 1.75<TD/BL. Therefore, it is favorable for balancing between providing sufficient space between the lens elements and the image surface, and properly utilizing limited space of the optical lens assembly. Moreover, the following condition can also be satisfied: 1.75<TD/BL<20. Moreover, the following condition can also be satisfied: 2.0<TD/BL<15. Moreover, the following condition can also be satisfied: 2.25<TD/BL<10.

When a focal length of the optical lens assembly at the wavelength of helium d-line is fd, and a curvature radius of the object-side surface of the fourth lens element is R7, the following condition is satisfied: 0.10<fd/R7. Therefore, it is favorable for moving the exit pupil towards the object side so as to reduce the back focal length, and it is also favorable for increasing illuminance in the peripheral region of the image surface and satisfying the specification requirement of the chief ray angle on the image sensor. Said focal length of the optical lens assembly at the wavelength of helium d-line refers to the focal length of the optical lens assembly measured at the helium d-line as a reference wavelength.

When the focal length of the optical lens assembly at the wavelength of helium d-line is fd, and a curvature radius of the image-side surface of the second lens element is R4, the following condition can be satisfied: 0.10<fd/R4. Therefore, it is favorable for the second lens element to correct aberrations generated by the first lens element, and it is also favorable for light converging at the peripheral region of the entrance pupil with the configuration of a large aperture.

When the central thickness of the first lens element is CT1, and a distance in parallel with an optical axis between a maximum effective radius position of the object-side surface of the first lens element and a maximum effective radius position of the image-side surface of the first lens element is ET1, the following condition can be satisfied: 0.80<CT1/ET1<1.75. Therefore, it is favorable for enhancing the peripheral thickness of the first lens element while miniaturizing the first lens element, so as to increase the configuration flexibility with other optical components. Moreover, the following condition can also be satisfied: 1.0<CT1/ET1<1.60. Please refer to FIG. 29, which shows a schematic view of ET1 according to the 4th embodiment of the present disclosure.

When the focal length of the optical lens assembly at the wavelength of helium d-line is fd, a focal length of the first lens element at the wavelength of helium d-line is fd1, a focal length of the second lens element at the wavelength of helium d-line is fd2, a focal length of the third lens element at the wavelength of helium d-line is fd3, and a focal length of the fourth lens element at the wavelength of helium d-line is fd4, the following conditions can be satisfied: |fd/fd1|<1.0; |fd/fd2|<0.80; |fd/fd3|<0.80; and |fd/fd4|<0.80. Therefore, it is favorable for avoiding overly strong refractive power from any single lens element so as to avoid stray light due to excessive refraction at the periphery. Moreover, the following conditions can also be satisfied: |fd/fd2|<0.50; and |fd/fd4|<0.50. Moreover, the following condition can also be satisfied: |fd/fd2|<0.35. Said focal length of one lens element at the wavelength of helium d-line refers to the focal length of the lens element measured at the helium d-line as a reference wavelength.

When a vertical distance between a non-axial critical point on the image-side surface of the second lens element and the optical axis is Yc22, and an entrance pupil diameter of the optical lens assembly is EPD, the following condition can be satisfied: 0.50<2×Yc22/EPD<2.0. Therefore, it is favorable for having critical points on the image-side surface of the second lens element so as to correct aberrations generated by the first lens element, and it is also favorable for light converging at the peripheral region of the entrance pupil, especially with a large aperture configuration. Please refer to FIG. 29, which shows a schematic view of Yc22 according to the 4th embodiment of the present disclosure.

When the entrance pupil diameter of the optical lens assembly is EPD, and the axial distance between the object-side surface of the first lens element and the image-side surface of the fourth lens element is TD, the following condition can be satisfied: 0.45<EPD/TD<1.0. Therefore, it is favorable for enlarging the aperture, for better detection sensitivity with a lower required intensity for the light source. Moreover, the following condition can also be satisfied: 0.5<EPD/TD<0.75.

When the central thickness of the first lens element is CT1, the central thickness of the second lens element is CT2, a central thickness of the third lens element is CT3, and a central thickness of the fourth lens element is CT4, the following conditions can be satisfied: 1.0<CT1/CT2; 1.0<CT1/CT3; and 1.0<CT1/CT4. Therefore, it is favorable for properly arranging the lens elements in limited space without being overly close to one another. Moreover, the following condition can also be satisfied: 2.0<CT1/CT2. Moreover, the following conditions can also be satisfied: 2.0<CT1/CT2<5.0; and 1.25<CT1/CT4<3.50.

When the focal length of the optical lens assembly at the wavelength of helium d-line is fd, and the entrance pupil diameter of the optical lens assembly is EPD, the following condition can be satisfied: 0.80<fd/EPD<1.70. Therefore, it is favorable for enlarging the aperture and enhancing detection sensitivity with a lower required intensity of the light source.

When an axial distance between the object-side surface of the first lens element and the image surface is TL, and a maximum image height of the optical lens assembly (half of a diagonal length of an effective photosensitive area of an image sensor) is ImgH, the following condition can be satisfied: 0.80<TL/ImgH<2.40. Therefore, it is favorable for the miniaturization of the optical lens assembly so as to be applicable in various compact portable electronic devices.

When the focal length of the optical lens assembly at the wavelength of helium d-line is fd, and the distance in parallel with the optical axis between the maximum effective radius position of the object-side surface of the first lens element and the maximum effective radius position of the image-side surface of the first lens element is ET1, the following condition can be satisfied: fd/ET1<6.0. Therefore, it is favorable for increasing the peripheral thickness of the first lens element while miniaturizing first lens element so as to increase the configuration flexibility with other optical components. Moreover, the following condition can also be satisfied: 2.0<fd/ET1<5.0.

When the axial distance between the object-side surface of the first lens element and the image-side surface of the fourth lens element is TD, and the central thickness of the first lens element is CT1, the following condition can be satisfied: 1.0<TD/CT1<5.0. Therefore, it is favorable for the first lens element to have a proper thickness and for properly arranging the lens elements in limited space of the optical lens assembly. Moreover, the following condition can also be satisfied: 2.0<TD/CT1<4.0.

At least one of the first lens element, the second lens element, the third lens element and the fourth lens element can be made of black plastic material. Therefore, it is favorable for utilizing the lens element made of black plastic material as a VIS-cut filter to block incoming visible light. Moreover, the lens elements can be made with black dye additives as black dyed plastic lens elements. Moreover, the first lens element can be made of black plastic material.

When a vertical distance between a non-axial critical point on the object-side surface of the second lens element and the optical axis is Yc21, and the vertical distance between the non-axial critical point on the image-side surface of the second lens element and the optical axis is Yc22, the following condition can be satisfied: 0.3<Yc21/Yc22<1.20. Therefore, it is favorable for the second lens element to correct off-axis aberrations generated by the first lens element, and it is also favorable for light converging at the peripheral region of the entrance pupil with a large aperture. Moreover, the following condition can also be satisfied: 0.40≤Yc21/Yc22<1.0. Please refer to FIG. 29, which shows a schematic view of Yc21 and Yc22 according to the 4th embodiment of the present disclosure.

When the axial distance between the first lens element and the second lens element is T12, and an axial distance between the second lens element and the third lens element is T23, the following condition can be satisfied: 0.50<T12/T23<6.0. Therefore, it is favorable for utilizing space on both sides of the second lens element so as to achieve compactness and maintain high design flexibility. Moreover, the following condition can also be satisfied: 0.60<T12/T23<3.0.

When a maximum value among Abbe numbers of all lens elements of the optical lens assembly is Vdmax, and a minimum value among Abbe numbers of all lens elements of the optical lens assembly is Vdmin, the following condition can be satisfied: Vdmax−Vdmin<10. Therefore, it is favorable for balancing between astigmatism corrections and the miniaturization of the optical lens assembly, and it is also favorable for reducing the effective radius with high refractive index materials when operated within a relatively long wavelength range.

According to the present disclosure, the optical lens assembly can be operated with infrared light, visible light or monochromatic light, but the present disclosure is not limited thereto.

According to the present disclosure, the aforementioned features and conditions can be utilized in numerous combinations so as to achieve corresponding effects.

According to the present disclosure, the lens elements of the optical lens assembly can be made of either glass or plastic material. When the lens elements are made of glass material, the refractive power distribution of the optical lens assembly may be more flexible, and the influence on imaging caused by external environment temperature change may be reduced. The glass lens element can either be made by grinding or molding. When the lens elements are made of plastic material, the manufacturing costs can be effectively reduced. Furthermore, surfaces of each lens element can be arranged to be spherical or aspheric, wherein the former reduces manufacturing difficulty, and the latter allows more control variables for eliminating aberrations thereof, the required number of the lens elements can be reduced, and the total track length of the optical lens assembly can be effectively shortened. Furthermore, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters (e.g., TL, BL and HFOV) of the optical lens assembly, the image capturing unit and the electronic device are not specifically defined, these parameters may be determined according to the reference wavelength range.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical lens assembly, based on the corresponding image sensor, can be flat or curved, especially a curved surface being concave facing towards the object side of the optical lens assembly.

According to the present disclosure, an image correction unit, such as a field flattener, can be optionally disposed between the lens element closest to the image side of the optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 39:
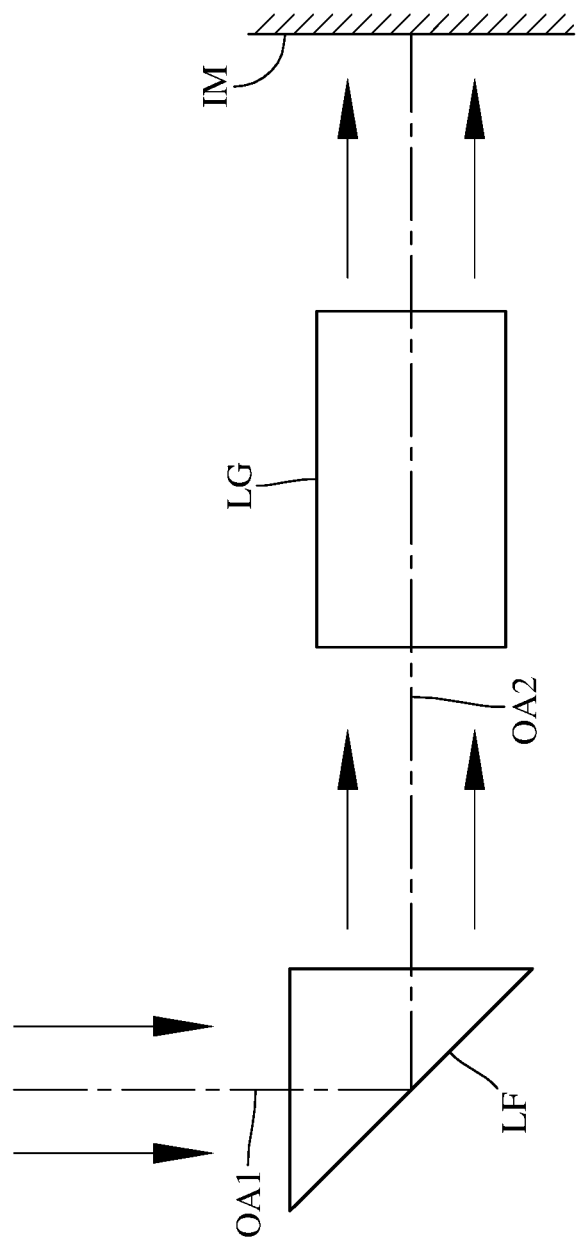
FIG. 39 shows a schematic view of a configuration of a light-folding element in an optical lens assembly according to one embodiment of the present disclosure.
Figure 40:
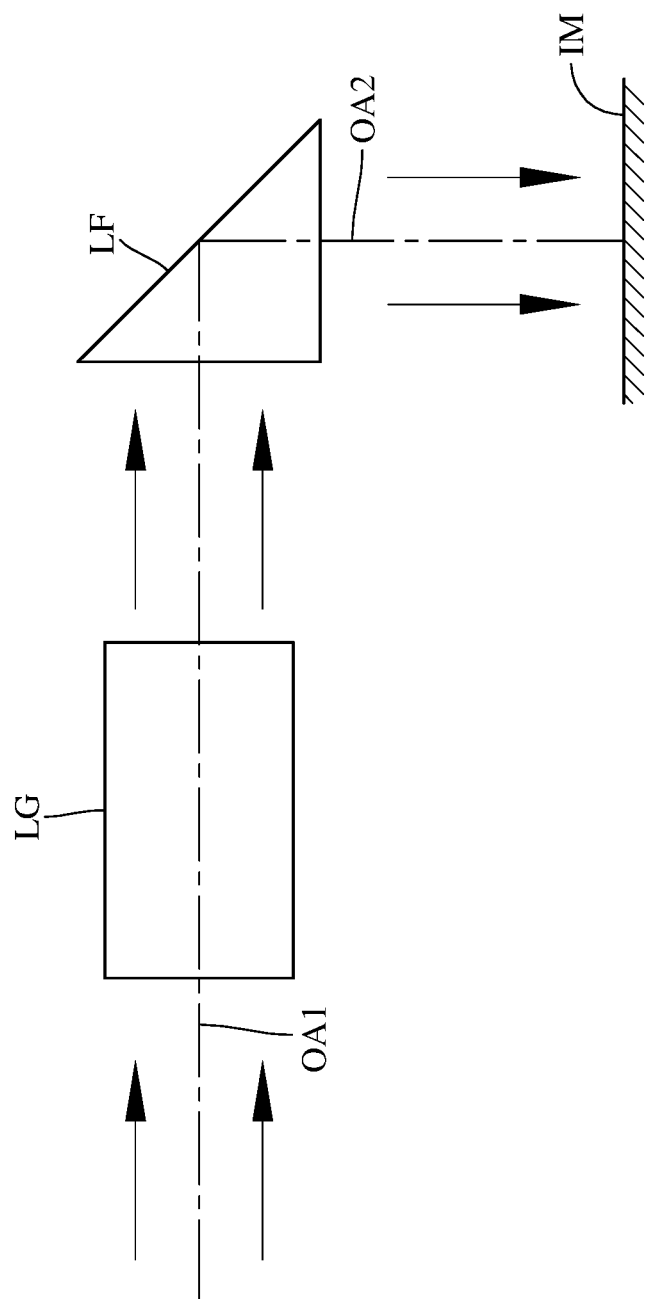
FIG. 40 shows a schematic view of another configuration of a light-folding element in an optical lens assembly according to one embodiment of the present disclosure.
Figure 41:
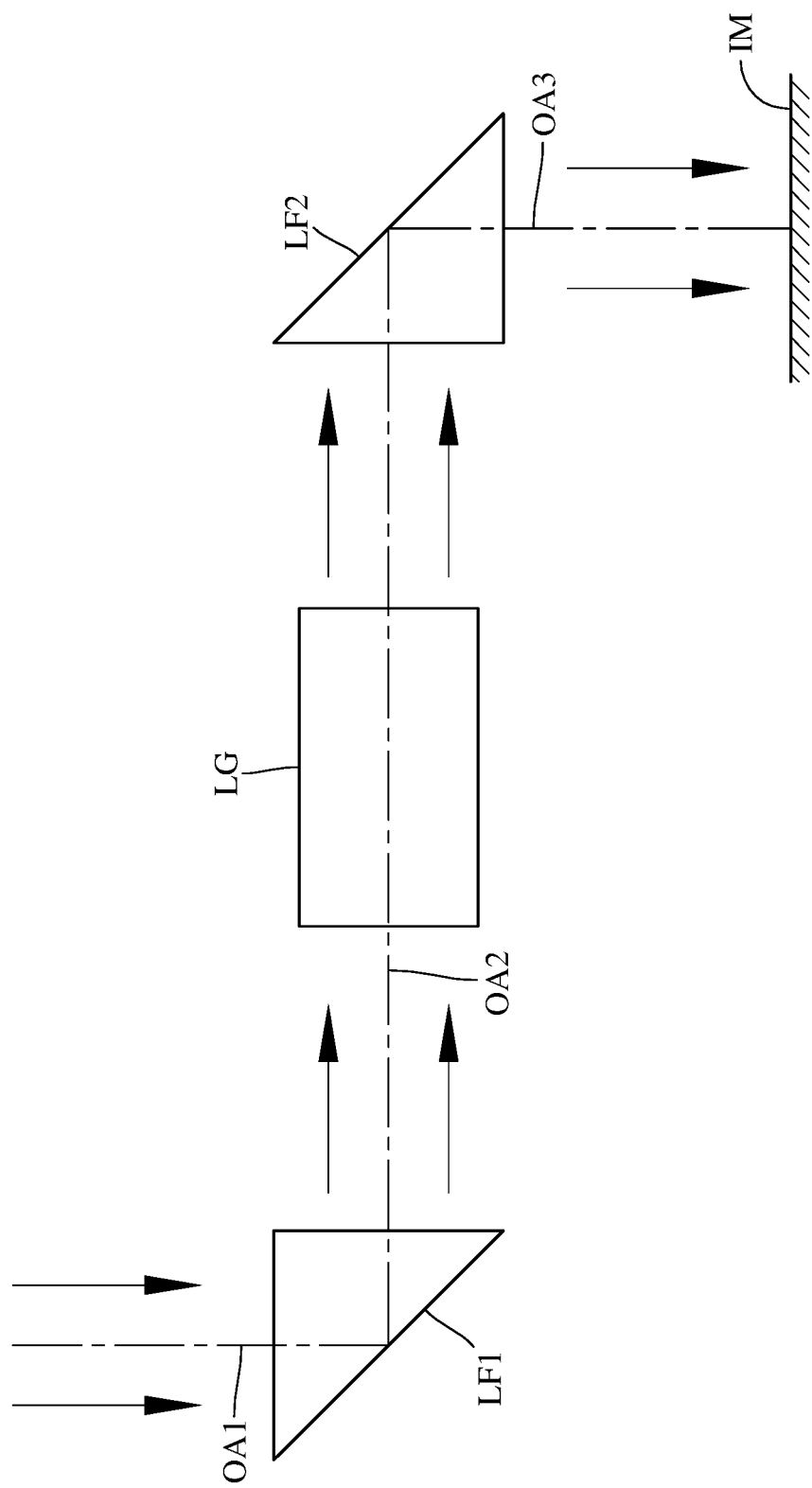
FIG. 41 shows a schematic view of a configuration of two light-folding elements in an optical lens assembly according to one embodiment of the present disclosure.

According to the present disclosure, at least one light-folding element, such as a prism or a mirror, can be optionally disposed between an imaged object and the image surface on the imaging optical path, such that the optical lens assembly can be more flexible in space arrangement, and therefore the dimensions of an electronic device is not restricted by the total track length of the optical lens assembly. Specifically, please refer to FIG. 39 and FIG. 40. FIG. 39 shows a schematic view of a configuration of a light-folding element in an optical lens assembly according to one embodiment of the present disclosure, and FIG. 40 shows a schematic view of another configuration of a light-folding element in an optical lens assembly according to one embodiment of the present disclosure. In FIG. 39 and FIG. 40, the optical lens assembly can have, in order from an imaged object (not shown in figure) to an image surface IM along an imaging optical path, a first optical axis OA1, a light-folding element LF and a second optical axis OA2. The light-folding element LF can be disposed between the imaged object and a lens group LG of the optical lens assembly as shown in FIG. 39 or disposed between a lens group LG of the optical lens assembly and the image surface IM as shown in FIG. 40. Furthermore, please refer to FIG. 41, which shows a schematic view of a configuration of two light-folding elements in an optical lens assembly according to one embodiment of the present disclosure. In FIG. 41, the optical lens assembly can have, in order from an imaged object (not shown in figure) to an image surface IM along an imaging optical path, a first optical axis OA1, a first light-folding element LF1, a second optical axis OA2, a second light-folding element LF2 and a third optical axis OA3. The first light-folding element LF1 is disposed between the imaged object and a lens group LG of the optical lens assembly, and the second light-folding element LF2 is disposed between the lens group LG of the optical lens assembly and the image surface IM. The optical lens assembly can be optionally provided with three or more light-folding elements, and the present disclosure is not limited to the type, amount and position of the light-folding elements of the embodiments disclosed in the aforementioned figures.

According to the present disclosure, the optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical lens assembly and thereby provides a wider field of view for the same.

According to the present disclosure, the optical lens assembly can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
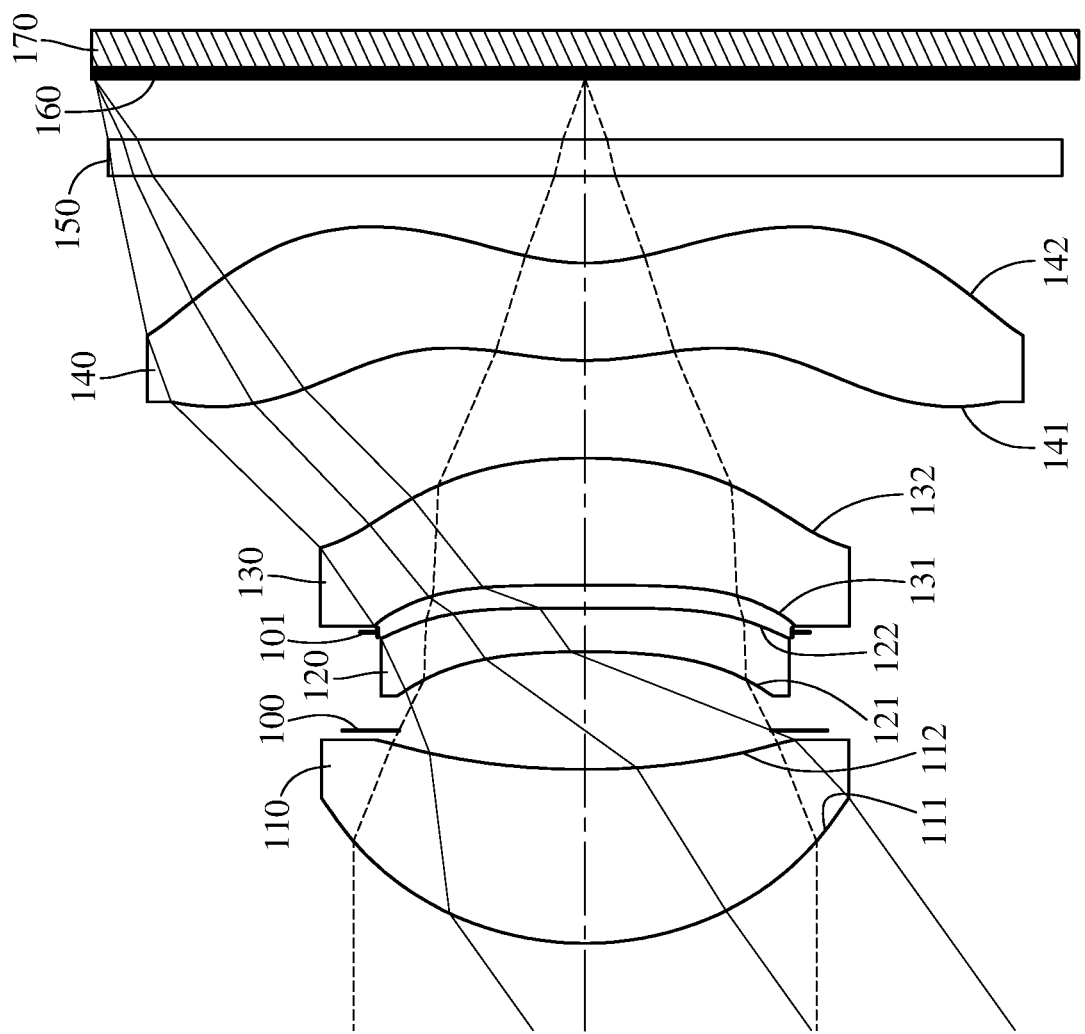
FIG. 1 is a schematic view of an image capturing unit according to the 1st embodiment of the present disclosure.
Figure 2:
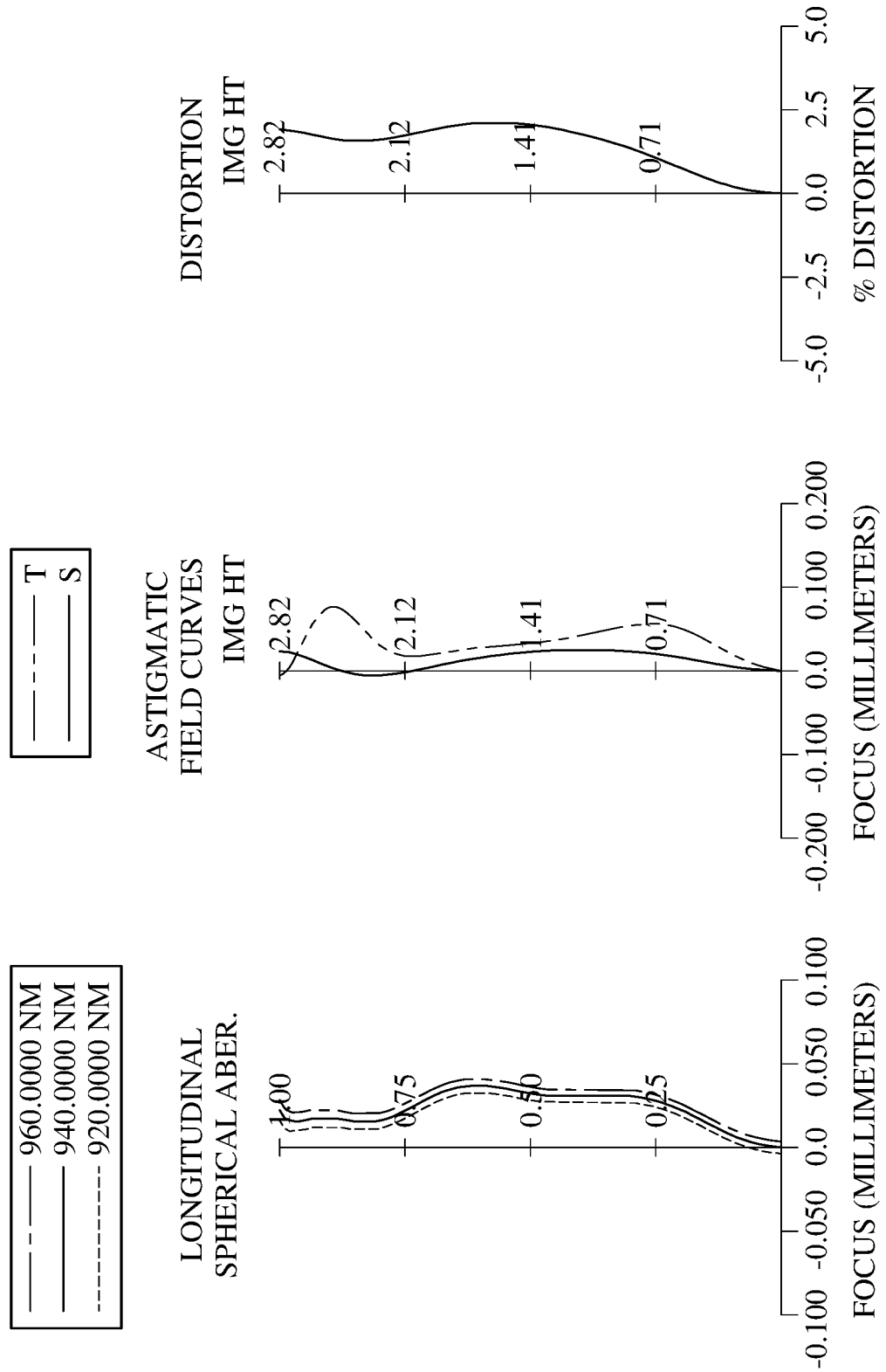
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical lens assembly (its reference numeral is omitted) of the present disclosure and an image sensor 170. The optical lens assembly includes, in order from an object side to an image side along an imaging optical path, a first lens element 110, an aperture stop 100, a second lens element 120, a stop 101, a third lens element 130, a fourth lens element 140, a filter 150 and an image surface 160. The optical lens assembly includes four lens elements (110, 120, 130 and 140) with no additional lens element disposed between each of the adjacent four lens elements.

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric. The object-side surface 111 of the first lens element 110 has at least one inflection point in an off-axis region thereof. The image-side surface 112 of the first lens element 110 has at least one inflection point in an off-axis region thereof.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The image-side surface 122 of the second lens element 120 has at least one inflection point and at least one critical point in an off-axis region thereof.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric. The image-side surface 132 of the third lens element 130 has at least one inflection point in an off-axis region thereof.

The fourth lens element 140 with negative refractive power has an object-side surface 141 being convex in a paraxial region thereof and an image-side surface 142 being concave in a paraxial region thereof. The fourth lens element 140 is made of plastic material and has the object-side surface 141 and the image-side surface 142 being both aspheric. The object-side surface 141 of the fourth lens element 140 has at least one inflection point in an off-axis region thereof. The image-side surface 142 of the fourth lens element 140 has at least one inflection point in an off-axis region thereof. The object-side surface 141 of the fourth lens element 140 has at least one convex critical point and at least one concave critical point in the off-axis region thereof. The image-side surface 142 of the fourth lens element 140 has at least one convex critical point in the off-axis region thereof.

The filter 150 is made of glass material and located between the fourth lens element 140 and the image surface 160, and will not affect the focal length of the optical lens assembly. The image sensor 170 is disposed on or near the image surface 160 of the optical lens assembly.

The equation of the aspheric surface profiles of the aforementioned lens elements of the 1st embodiment is expressed as follows:

$$X(Y) = (Y^2/R)/(1 + \text{sqrt}(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical lens assembly of the image capturing unit according to the 1st embodiment, when a focal length of the optical lens assembly at a wavelength of helium d-line is fd, a focal length of the optical lens assembly at a reference wavelength is fr, an entrance pupil diameter of the optical lens assembly is EPD, half of a maximum field of view of the optical lens assembly is HFOV, these parameters have the following values: fd=3.67 millimeters (mm), fr=3.86 mm, EPD=2.66 mm, fd/EPD=1.38, HFOV=35.6 degrees (deg.). In this embodiment, the optical lens assembly is operated within a wavelength range of 920 nm to 960 nm (i.e., a wavelength range infrared light), and the reference wavelength is 940 nm.

When an Abbe number of the first lens element is Vd1, an Abbe number of the second lens element is Vd2, an Abbe number of the third lens element is Vd3, and an Abbe number of the fourth lens element is Vd4, the following condition is satisfied: Vd1+Vd2+Vd3+Vd4=87.2.

When a maximum value among Abbe numbers of all lens elements of the optical lens assembly is Vdmax, and a minimum value among Abbe numbers of all lens elements of the optical lens assembly is Vdmin, the following condition is satisfied: Vdmax−Vdmin=5.6. In this embodiment, among the four lens elements (110, 120, 130 and 140), the Abbe numbers of the first lens element 110, the second lens element 120 and the third lens element 130 are the same and all smaller than the Abbe number of the fourth lens element 140, so Vdmax is equal to the Abbe number of the fourth lens element 140 and Vdmin is equal to the Abbe numbers of the first lens element 110, the second lens element 120 and the third lens element 130.

When a central thickness of the first lens element 110 is CT1, a central thickness of the second lens element 120 is CT2, and an axial distance between the first lens element 110 and the second lens element 120 is T12, the following condition is satisfied: CT1/(T12+CT2)=1.08. In this embodiment, an axial distance between two adjacent lens elements is an air gap in a paraxial region between two adjacent lens surfaces of the two adjacent lens elements.

When the central thickness of the first lens element 110 is CT1, and the central thickness of the second lens element 120 is CT2, the following condition is satisfied: CT1/CT2=4.00.

When the central thickness of the first lens element 110 is CT1, and a central thickness of the third lens element 130 is CT3, the following condition is satisfied: CT1/CT3=1.37.

When the central thickness of the first lens element 110 is CT1, and a central thickness of the fourth lens element 140 is CT4, the following condition is satisfied: CT1/CT4=1.79.

When the central thickness of the first lens element 110 is CT1, and a distance in parallel with the optical axis between a maximum effective radius position of the object-side surface 111 of the first lens element 110 and a maximum effective radius position of the image-side surface 112 of the first lens element 110 is ET1, the following condition is satisfied: CT1/ET1=3.00.

When the axial distance between the first lens element 110 and the second lens element 120 is T12, and an axial distance between the second lens element 120 and the third lens element 130 is T23, the following condition is satisfied: T12/T23=5.13.

When the entrance pupil diameter of the optical lens assembly is EPD, and an axial distance between the object-side surface 111 of the first lens element 110 and the image-side surface 142 of the fourth lens element 140 is TD, the following condition is satisfied: EPD/TD=0.68.

When the axial distance between the object-side surface 111 of the first lens element 110 and the image-side surface 142 of the fourth lens element 140 is TD, and the central thickness of the first lens element 110 is CT1, the following condition is satisfied: TD/CT1=3.91.

When the axial distance between the object-side surface 111 of the first lens element 110 and the image-side surface 142 of the fourth lens element 140 is TD, and an axial distance between the image-side surface 142 of the fourth lens element 140 and the image surface 160 is BL, the following condition is satisfied: TD/BL=3.70.

When an axial distance between the object-side surface 111 of the first lens element 110 and the image surface 160 is TL, and a maximum image height of the optical lens assembly is ImgH, the following condition is satisfied: TL/ImgH=1.762.

When the focal length of the optical lens assembly at the wavelength of helium d-line is fd, and a curvature radius of the image-side surface 122 of the second lens element 120 is R4, the following condition is satisfied: fd/R4=0.09.

When the focal length of the optical lens assembly at the wavelength of helium d-line is fd, and a curvature radius of the object-side surface 141 of the fourth lens element 140 is R7, the following condition is satisfied: fd/R7=2.07.

When the focal length of the optical lens assembly at the wavelength of helium d-line is fd, and a focal length of the first lens element at the wavelength of helium d-line is fd1, the following condition is satisfied: |fd/fd1|=0.90.

When the focal length of the optical lens assembly at the wavelength of helium d-line is fd, and a focal length of the second lens element at the wavelength of helium d-line is fd2, the following condition is satisfied: |fd/fd2|=0.52.

When the focal length of the optical lens assembly at the wavelength of helium d-line is fd, and a focal length of the third lens element at the wavelength of helium d-line is fd3, the following condition is satisfied: −fd/fd3|=0.74.

When the focal length of the optical lens assembly at the wavelength of helium d-line is fd, and a focal length of the fourth lens element at the wavelength of helium d-line is fd4, the following condition is satisfied: |fd/fd4|=0.29.

When the focal length of the optical lens assembly at the wavelength of helium d-line is fd, and the distance in parallel with the optical axis between the maximum effective radius position of the object-side surface 111 of the first lens element 110 and the maximum effective radius position of the image-side surface 112 of the first lens element 110 is ET1, the following condition is satisfied: fd/ET1=11.02.

When a vertical distance between the critical point on the image-side surface 122 of the second lens element 120 and the optical axis is Yc22, the following condition is satisfied: Yc22=0.18 [mm].

When the vertical distance between the critical point on the image-side surface 122 of the second lens element 120 and the optical axis is Yc22, and the entrance pupil diameter of the optical lens assembly is EPD, the following condition is satisfied: 2×Yc22/EPD=0.13.

The detailed optical data of the 1st embodiment are shown in Table 1 and the aspheric surface data are shown in Table 2 below.

TABLE 1

1st Embodiment
fd = 3.67 mm, EPD = 2.66 mm, HFOV = 35.6 deg.

| Surface # | | Curvature Radius | Thickness | Material | Index d-line | 940 nm | Abbe # | Focal Length d-line | 940 nm |
|---|---|---|---|---|---|---|---|---|---|
| 0 | Object | Plano | Infinity | | | | | | |
| 1 | Lens 1 | 1.840 (ASP) | 1.000 | Plastic | 1.660 | 1.634 | 20.4 | 4.09 | 4.27 |
| 2 | | 4.540 (ASP) | 0.223 | | | | | | |
| 3 | Ape. Stop | Plano | 0.454 | | | | | | |
| 4 | Lens 2 | −5.246 (ASP) | 0.250 | Plastic | 1.660 | 1.634 | 20.4 | −7.01 | −7.29 |
| 5 | | 39.786 (ASP) | −0.139 | | | | | | |
| 6 | Stop | Plano | 0.271 | | | | | | |
| 7 | Lens 3 | −99.846 (ASP) | 0.730 | Plastic | 1.660 | 1.634 | 20.4 | 4.98 | 5.19 |
| 8 | | −3.192 (ASP) | 0.562 | | | | | | |
| 9 | Lens 4 | 1.777 (ASP) | 0.560 | Plastic | 1.614 | 1.594 | 26.0 | −12.62 | −12.85 |
| 10 | | 1.272 (ASP) | 0.500 | | | | | | |
| 11 | Filter | Plano | 0.210 | Glass | 1.517 | 1.508 | 64.2 | — | — |
| 12 | | Plano | 0.348 | | | | | | |
| 13 | Image | Plano | 0.000 | | | | | | |

Note:
Operating wavelength range is 920–960 nm (infrared light), reference wavelength is 940 nm, and d-line wavelength is 587.6 nm.
An effective radius of the stop 101 (Surface 6) is 1.190 mm.

TABLE 2

Aspheric Coefficients

| Surface # | 1 | 2 | 4 | 5 |
|---|---|---|---|---|
| k = | 0.0000E+00 | −8.7683E+01 | 0.0000E+00 | 0.0000E+00 |
| A4 = | −1.7627E−02 | 1.1865E−01 | −1.2983E−01 | −2.2056E−01 |
| A6 = | 7.4016E−02 | −1.8129E−01 | 7.8400E−03 | 5.1509E−01 |
| A8 = | −1.4277E−01 | 2.9005E−01 | 4.5976E−01 | −1.2163E+00 |
| A10 = | 1.5933E−01 | −3.5044E−01 | −1.8077E+00 | 1.7955E+00 |
| A12 = | −9.9443E−02 | 2.7227E−01 | 3.1226E+00 | −1.8059E+00 |
| A14 = | 3.2582E−02 | −1.1838E−01 | −2.8141E+00 | 1.2282E+00 |
| A16 = | −4.3392E−03 | 2.1240E−02 | 1.2892E+00 | −4.9724E−01 |
| A18 = | — | — | −2.3586E−01 | 8.8513E−02 |

| Surface # | 7 | 8 | 9 | 10 |
|---|---|---|---|---|
| k = | −8.5116E+01 | −4.7800E+01 | −1.0000E+00 | −1.0000E+00 |
| A4 = | −1.4337E−01 | −3.3799E−01 | −3.5767E−01 | −3.1855E−01 |
| A6 = | 2.4641E−01 | 5.4575E−01 | 1.8957E−01 | 1.8116E−01 |
| A8 = | −7.2664E−01 | −8.9671E−01 | −9.3121E−02 | −8.7239E−02 |
| A10 = | 1.8342E+00 | 1.1510E+00 | 4.1446E−02 | 3.0962E−02 |
| A12 = | −3.5044E+00 | −1.0342E+00 | −1.2999E−02 | −7.8324E−03 |
| A14 = | 4.1810E+00 | 6.0579E−01 | 2.6084E−03 | 1.3733E−03 |
| A16 = | −2.8989E+00 | −2.1513E−01 | −3.1983E−04 | −1.5815E−04 |
| A18 = | 1.0775E+00 | 4.1731E−02 | 2.1936E−05 | 1.0713E−05 |
| A20 = | −1.6738E−01 | −3.3905E−03 | −6.4778E−07 | −3.2155E−07 |

In Table 1, the curvature radius, the thickness and the focal length are shown in millimeters (mm). Surface numbers 0-13 represent the surfaces sequentially arranged from the object side to the image side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
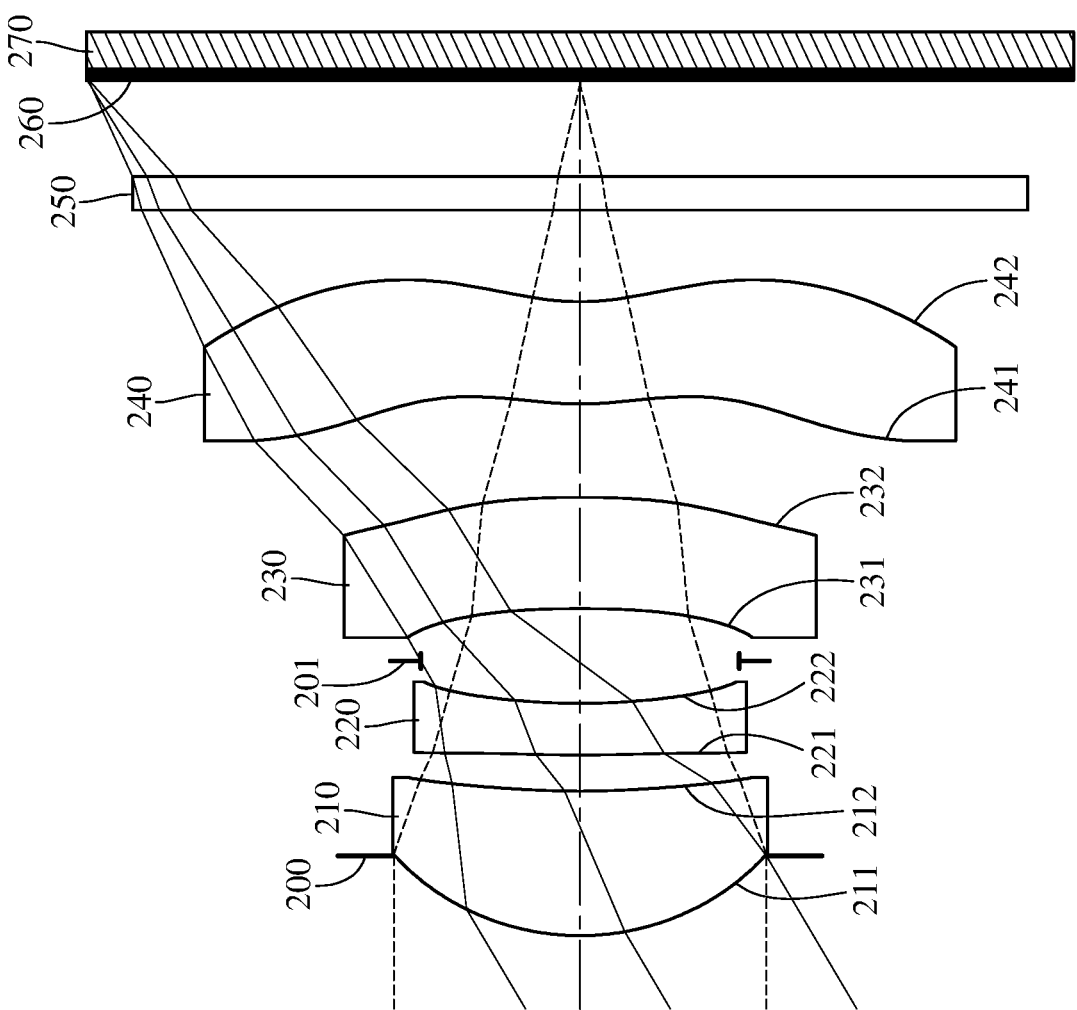
FIG. 3 is a schematic view of an image capturing unit according to the 2nd embodiment of the present disclosure.
Figure 4:
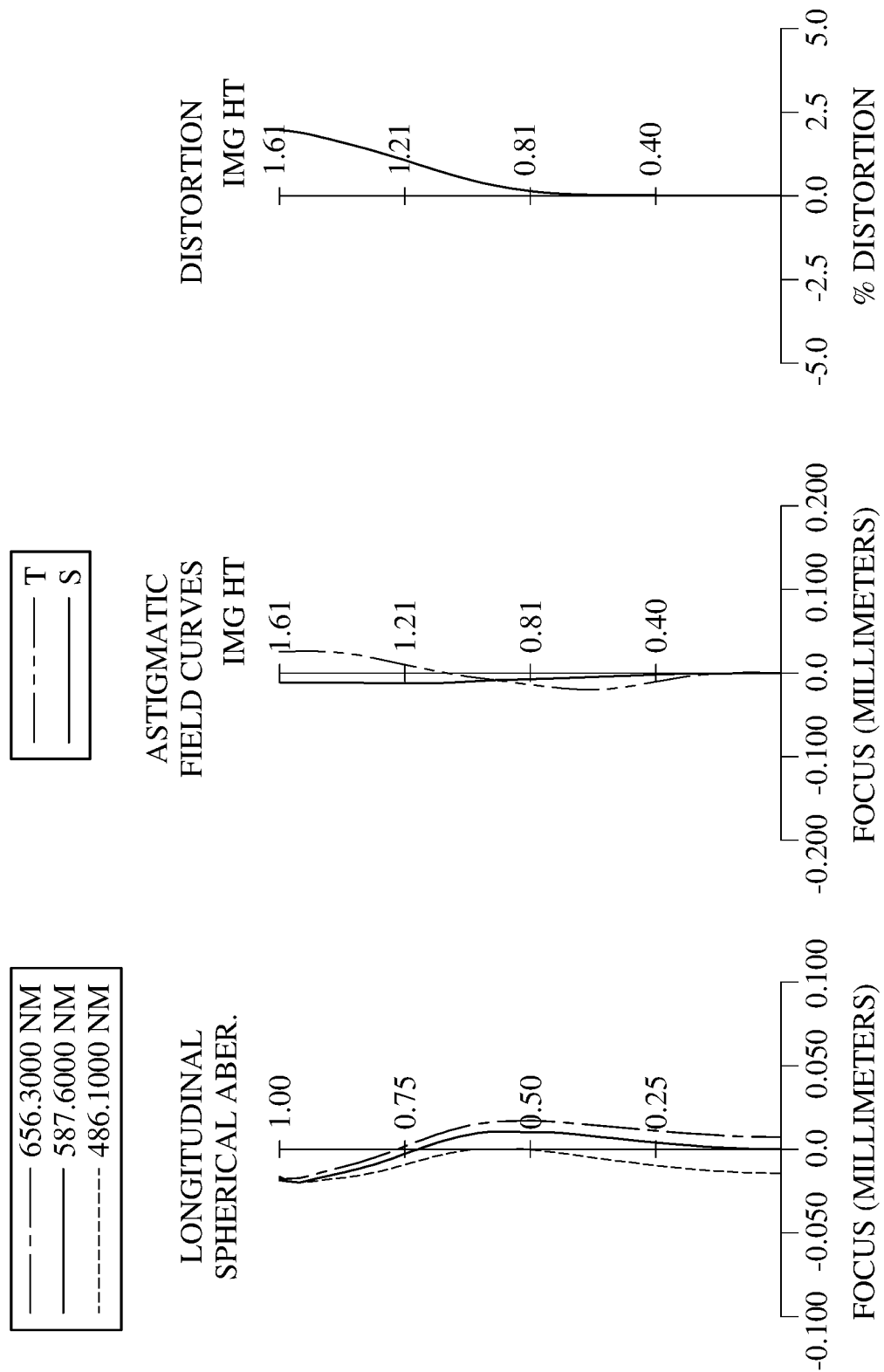
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical lens assembly (its reference numeral is omitted) of the present disclosure and an image sensor 270. The optical lens assembly includes, in order from an object side to an image side along an imaging optical path, an aperture stop 200, a first lens element 210, a second lens element 220, a stop 201, a third lens element 230, a fourth lens element 240, a filter 250 and an image surface 260. The optical lens assembly includes four lens elements (210, 220, 230 and 240) with no additional lens element disposed between each of the adjacent four lens elements.

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point in an off-axis region thereof.

The third lens element 230 with negative refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric. The image-side surface 232 of the third lens element 230 has at least one inflection point in an off-axis region thereof.

The fourth lens element 240 with negative refractive power has an object-side surface 241 being convex in a paraxial region thereof and an image-side surface 242 being concave in a paraxial region thereof. The fourth lens element 240 is made of plastic material and has the object-side surface 241 and the image-side surface 242 being both aspheric. The object-side surface 241 of the fourth lens element 240 has at least one inflection point in an off-axis region thereof. The image-side surface 242 of the fourth lens element 240 has at least one inflection point in an off-axis region thereof. The object-side surface 241 of the fourth lens element 240 has at least one concave critical point in the off-axis region thereof. The image-side surface 242 of the fourth lens element 240 has at least one convex critical point in the off-axis region thereof.

The filter 250 is made of glass material and located between the fourth lens element 240 and the image surface 260, and will not affect the focal length of the optical lens assembly. The image sensor 270 is disposed on or near the image surface 260 of the optical lens assembly.

The detailed optical data of the 2nd embodiment are shown in Table 3 and the aspheric surface data are shown in Table 4 below.

TABLE 3

2nd Embodiment
fd = 2.68 mm, EPD = 1.22 mm, HFOV = 30.6 deg.

| Surface # | | Curvature Radius | Thickness | Material | Index (d-line) | Abbe # | Focal Length (d-line) |
|---|---|---|---|---|---|---|---|
| 0 | Object | Plano | Infinity | | | | |
| 1 | Ape. Stop | Plano | −0.261 | | | | |
| 2 | Lens 1 | 0.837 (ASP) | 0.473 | Plastic | 1.544 | 55.9 | 1.97 |
| 3 | | 3.043 (ASP) | 0.118 | | | | |
| 4 | Lens 2 | 4.749 (ASP) | 0.169 | Plastic | 1.669 | 19.4 | −5.74 |
| 5 | | 2.093 (ASP) | 0.139 | | | | |
| 6 | Stop | Plano | 0.171 | | | | |
| 7 | Lens 3 | −3.700 (ASP) | 0.364 | Plastic | 1.669 | 19.4 | −89.71 |
| 8 | | −4.099 (ASP) | 0.306 | | | | |
| 9 | Lens 4 | 1.152 (ASP) | 0.334 | Plastic | 1.583 | 30.2 | −6.35 |
| 10 | | 0.785 (ASP) | 0.300 | | | | |
| 11 | Filter | Plano | 0.110 | Glass | 1.517 | 64.2 | — |
| 12 | | Plano | 0.314 | | | | |
| 13 | Image | Plano | 0.000 | | | | |

Note:
Operating wavelength range is a wavelength range of visible light, and reference wavelength is 587.6 nm (d-line).
An effective radius of the stop 201 (Surface 6) is 0.520 mm.

TABLE 4

Aspheric Coefficients

| Surface # | 2 | 3 | 4 | 5 |
|---|---|---|---|---|
| k = | −9.2979E−01 | 1.0532E+01 | −8.9800E+01 | −6.9512E+00 |
| A4 = | 1.7316E−01 | −2.1693E−01 | −5.5886E−01 | −4.5270E−01 |
| A6 = | 4.9374E−01 | −2.8913E−01 | 1.8792E+00 | 6.5559E+00 |
| A8 = | −2.5737E+00 | 2.7280E+00 | −6.3439E+00 | −5.8914E+01 |
| A10 = | 1.2988E+01 | 6.8648E−01 | 3.6009E+01 | 3.5566E+02 |
| A12 = | −2.9500E+01 | −3.2227E+01 | −1.1161E+02 | −1.0614E+03 |
| A14 = | 2.8477E+01 | 6.2084E+01 | 1.3045E+02 | 1.2752E+03 |
| Surface # | 7 | 8 | 9 | 10 |
| k = | −9.0000E+01 | −8.8966E+00 | −1.3278E+01 | −7.7916E+00 |
| A4 = | −8.3589E−01 | −1.1203E+00 | −1.6362E+00 | −9.4414E−01 |
| A6 = | 2.9958E+00 | 5.4685E+00 | 3.1311E+00 | 1.8320E+00 |
| A8 = | −1.7977E+01 | −2.0177E+01 | −3.9884E+00 | −3.0269E+00 |
| A10 = | 8.1767E+01 | 5.4077E+01 | 4.5499E+00 | 3.8621E+00 |
| A12 = | −2.5224E+02 | −8.6204E+01 | −4.0424E+00 | −3.4606E+00 |
| A14 = | 4.7725E+02 | 7.1262E+01 | 2.2666E+00 | 1.9848E+00 |
| A16 = | −5.1216E+02 | −2.3700E+01 | −6.8730E−01 | −6.4284E−01 |
| A18 = | — | — | 8.5756E−02 | 8.8576E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| fd [mm] | 2.68 | T12/T23 | 0.38 |
| fr [mm] | 2.68 | EPD/TD | 0.59 |
| EPD [mm] | 1.22 | TD/CT1 | 4.38 |
| fd/EPD | 2.20 | TD/BL | 2.87 |
| HFOV [deg.] | 30.6 | TL/ImgH | 1.738 |
| Vd1 + Vd2 + Vd3 + Vd4 | 125.0 | fd/R4 | 1.28 |
| Vdmax − Vdmin | 36.5 | fd/R7 | 2.33 |
| CT1/(T12 + CT2) | 1.65 | \|fd/fd1\| | 1.36 |
| CT1/CT2 | 2.80 | \|fd/fd2\| | 0.47 |
| CT1/CT3 | 1.30 | \|fd/fd3\| | 0.03 |
| CT1/CT4 | 1.42 | \|fd/fd4\| | 0.42 |
| CT1/ET1 | 1.91 | fd/ET1 | 10.79 |

3rd Embodiment

Figure 5:
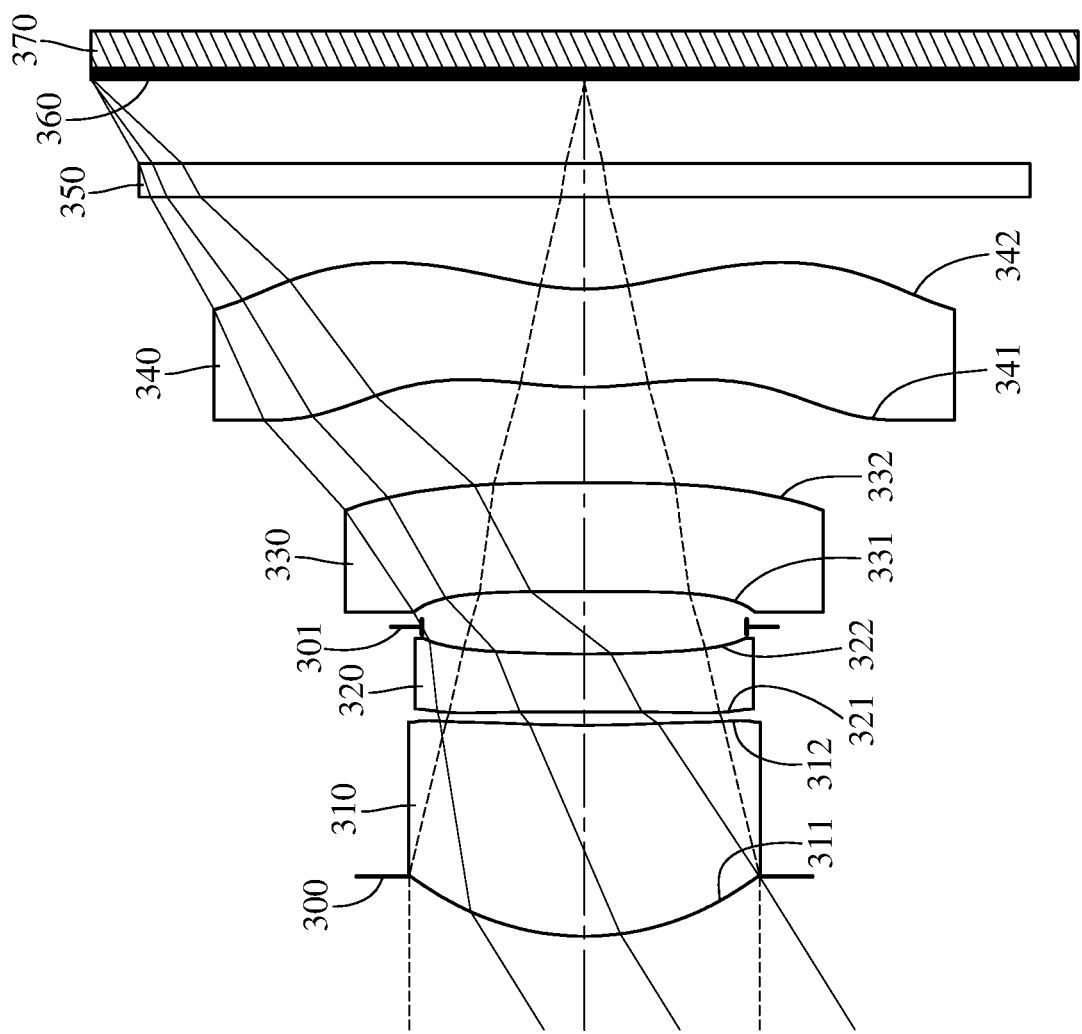
FIG. 5 is a schematic view of an image capturing unit according to the 3rd embodiment of the present disclosure.
Figure 6:
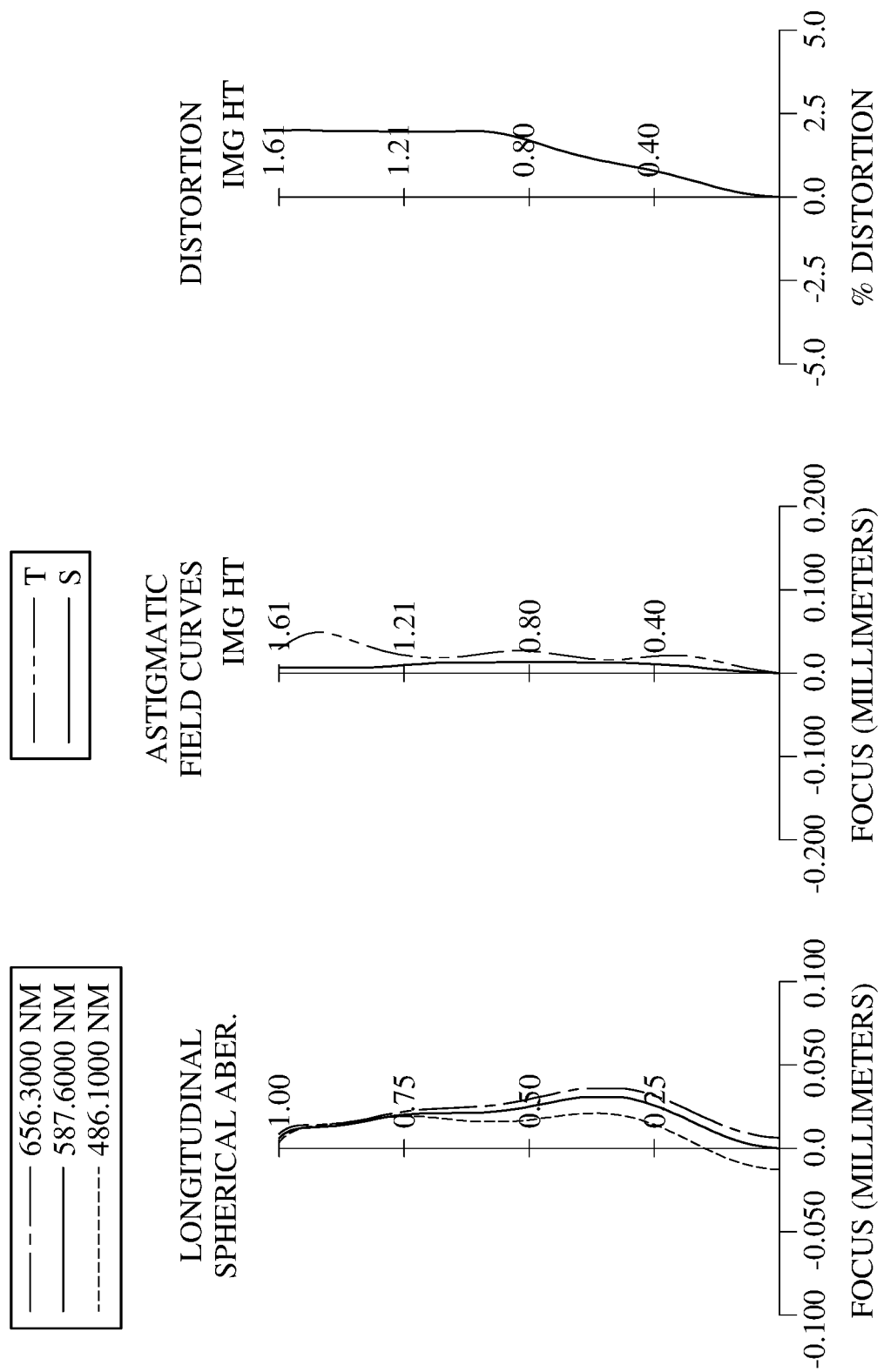
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical lens assembly (its reference numeral is omitted) of the present disclosure and an image sensor 370. The optical lens assembly includes, in order from an object side to an image side along an imaging optical path, an aperture stop 300, a first lens element 310, a second lens element 320, a stop 301, a third lens element 330, a fourth lens element 340, a filter 350 and an image surface 360. The optical lens assembly includes four lens elements (310, 320, 330 and 340) with no additional lens element disposed between each of the adjacent four lens elements.

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric. The image-side surface 312 of the first lens element 310 has at least one inflection point and at least one critical point in an off-axis region thereof.

The second lens element 320 with negative refractive power has an object-side surface 321 being convex in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point and at least one critical point in an off-axis region thereof.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material and has the object-side surface 341 and the image-side surface 342 being both aspheric. The object-side surface 341 of the fourth lens element 340 has at least one inflection point in an off-axis region thereof. The image-side surface 342 of the fourth lens element 340 has at least one inflection point in an off-axis region thereof. The object-side surface 341 of the fourth lens element 340 has at least one convex critical point and at least one concave critical point in the off-axis region thereof. The image-side surface 342 of the fourth lens element 340 has at least one convex critical point in the off-axis region thereof.

The filter 350 is made of glass material and located between the fourth lens element 340 and the image surface 360, and will not affect the focal length of the optical lens assembly. The image sensor 370 is disposed on or near the image surface 360 of the optical lens assembly.

In this embodiment, when a vertical distance between the critical point on the object-side surface 321 of the second lens element 320 and an optical axis is Yc21, the following condition is satisfied: Yc21=0.040 [mm] and 0.387 [mm].

The detailed optical data of the 3rd embodiment are shown in Table 5 and the aspheric surface data are shown in Table 6 below.

TABLE 5

3rd Embodiment
fd = 2.51 mm, EPD = 1.14 mm, HFOV = 31.9 deg.

| Surface # | | Curvature Radius | Thickness | Material | Index (d-line) | Abbe # | Focal Length (d-line) |
|---|---|---|---|---|---|---|---|
| 0 | Object | Plano | Infinity | | | | |
| 1 | Ape. Stop | Plano | −0.195 | | | | |
| 2 | Lens 1 | 0.884 (ASP) | 0.689 | Plastic | 1.515 | 56.6 | 2.06 |
| 3 | | 3.878 (ASP) | 0.044 | | | | |
| 4 | Lens 2 | 27.713 (ASP) | 0.189 | Plastic | 1.698 | 16.3 | −8.12 |
| 5 | | 5.549 (ASP) | 0.088 | | | | |
| 6 | Stop | Plano | 0.116 | | | | |
| 7 | Lens 3 | −64.663 (ASP) | 0.355 | Plastic | 1.705 | 14.0 | 84.73 |
| 8 | | −31.131 (ASP) | 0.312 | | | | |
| 9 | Lens 4 | 1.255 (ASP) | 0.321 | Plastic | 1.583 | 30.2 | −5.21 |
| 10 | | 0.804 (ASP) | 0.300 | | | | |

TABLE 5-continued

3rd Embodiment
fd = 2.51 mm, EPD = 1.14 mm, HFOV = 31.9 deg.

| Surface # | | Curvature Radius | Thickness | Material | Index (d-line) | Abbe # | Focal Length (d-line) |
|---|---|---|---|---|---|---|---|
| 11 | Filter | Plano | 0.110 | Glass | 1.517 | 64.2 | — |
| 12 | | Plano | 0.274 | | | | |
| 13 | Image | Plano | 0.000 | | | | |

Note:
Operating wavelength range is a wavelength range of visible light, and reference wavelength is 587.6 nm (d-line).
An effective radius of the stop 301 (Surface 6) is 0.530 mm.

TABLE 6

Aspheric Coefficients

| Surface # | 2 | 3 | 4 | 5 |
|---|---|---|---|---|
| k = | −1.2533E+00 | 1.2293E+01 | 9.0000E+01 | 4.6435E+01 |
| A4 = | 6.0611E−02 | −6.7588E−01 | −6.0343E−01 | −6.7426E−02 |
| A6 = | 2.1344E+00 | 7.4706E+00 | 8.7404E+00 | 4.3571E−01 |
| A8 = | −1.7523E+01 | −1.1200E+02 | −1.0540E+02 | 9.4417E+00 |
| A10 = | 7.4477E+01 | 7.6331E+02 | 6.8989E+02 | −6.9846E+01 |
| A12 = | −1.5470E+02 | −2.2062E+03 | −1.9496E+03 | 2.8550E+02 |
| A14 = | 1.2302E+02 | 2.2430E+03 | 1.9447E+03 | −4.1528E+02 |

| Surface # | 7 | 8 | 9 | 10 |
|---|---|---|---|---|
| k = | 9.0000E+01 | 9.0000E+01 | −1.1204E+01 | −5.6577E+00 |
| A4 = | −3.8428E−01 | −5.9943E−01 | −1.5816E+00 | −1.0358E+00 |
| A6 = | 2.4599E−01 | 2.6931E+00 | 4.4594E+00 | 2.6332E+00 |
| A8 = | −9.3317E+00 | −1.0321E+01 | −1.1602E+01 | −5.2942E+00 |
| A10 = | 8.3058E+01 | 2.3301E+01 | 2.1034E+01 | 6.9949E+00 |
| A12 = | −5.1923E+02 | −2.8136E+01 | −2.2589E+01 | −5.8614E+00 |
| A14 = | 1.6596E+03 | 1.5815E+01 | 1.3889E+01 | 3.0007E+00 |
| A16 = | −2.1424E+03 | −2.9143E+00 | −4.5438E+00 | −8.4743E−01 |
| A18 = | — | — | 6.1349E−01 | 1.0013E−01 |

In the 3rd embodiment, the equation of the aspheric surface profiles of the aforementioned lens elements is the same as the equation of the 1st embodiment. Also, except for the Yc21 mentioned in this embodiment, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| fd [mm] | 2.51 | EPD/TD | 0.54 |
| fr [mm] | 2.51 | TD/CT1 | 3.07 |
| EPD [mm] | 1.14 | TD/BL | 3.09 |
| fd/EPD | 2.20 | TL/ImgH | 1.738 |
| HFOV [deg.] | 31.9 | fd/R4 | 0.45 |
| Vd1 + Vd2 + Vd3 + Vd4 | 117.1 | fd/R7 | 2.00 |
| Vdmax − Vdmin | 42.5 | \|fd/fd1\| | 1.22 |
| CT1/(T12 + CT2) | 2.96 | \|fd/fd2\| | 0.31 |
| CT1/CT2 | 3.65 | \|fd/fd3\| | 0.03 |
| CT1/CT3 | 1.94 | \|fd/fd4\| | 0.48 |
| CT1/CT4 | 2.15 | fd/ET1 | 5.04 |
| CT1/ET1 | 1.38 | Yc21 [mm] | 0.040; 0.387 |
| T12/T23 | 0.22 | | |

4th Embodiment

Figure 7:
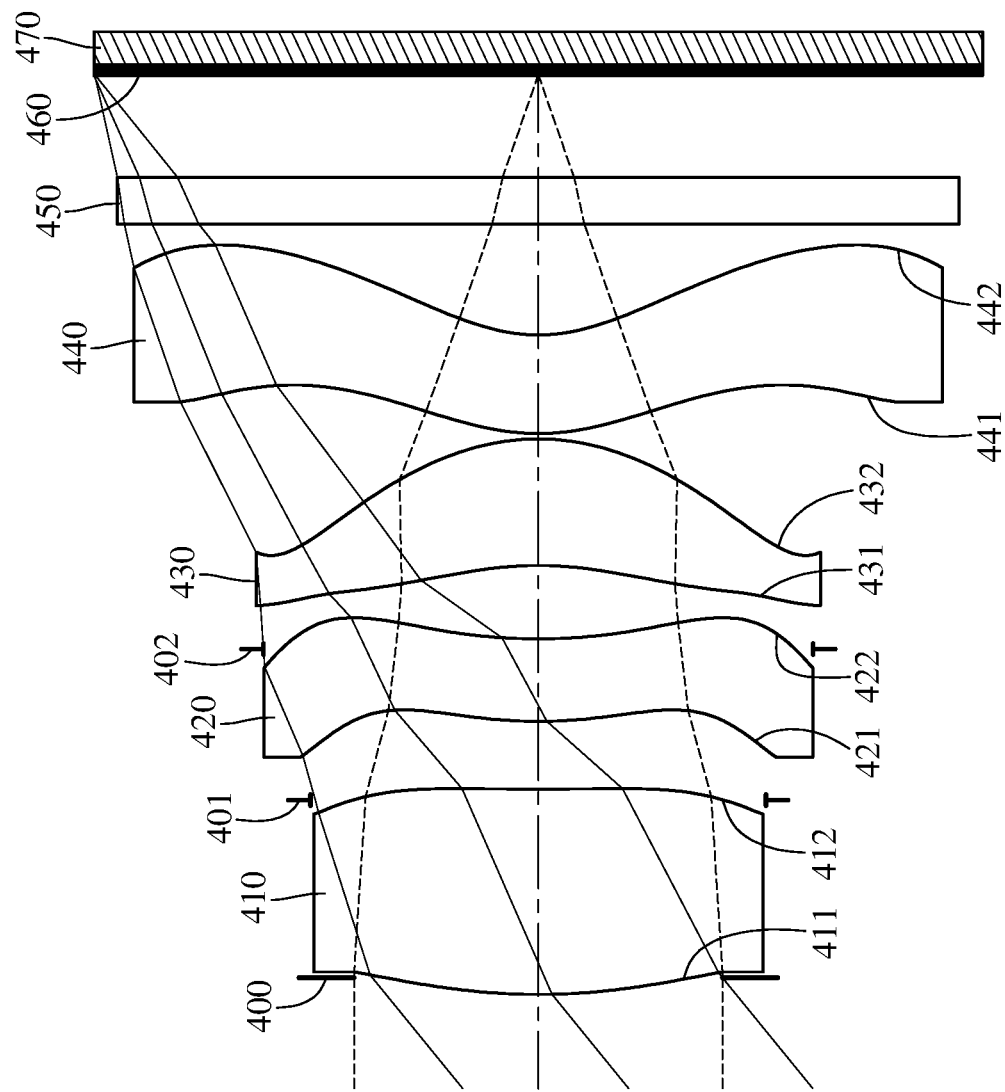
FIG. 7 is a schematic view of an image capturing unit according to the 4th embodiment of the present disclosure.
Figure 8:
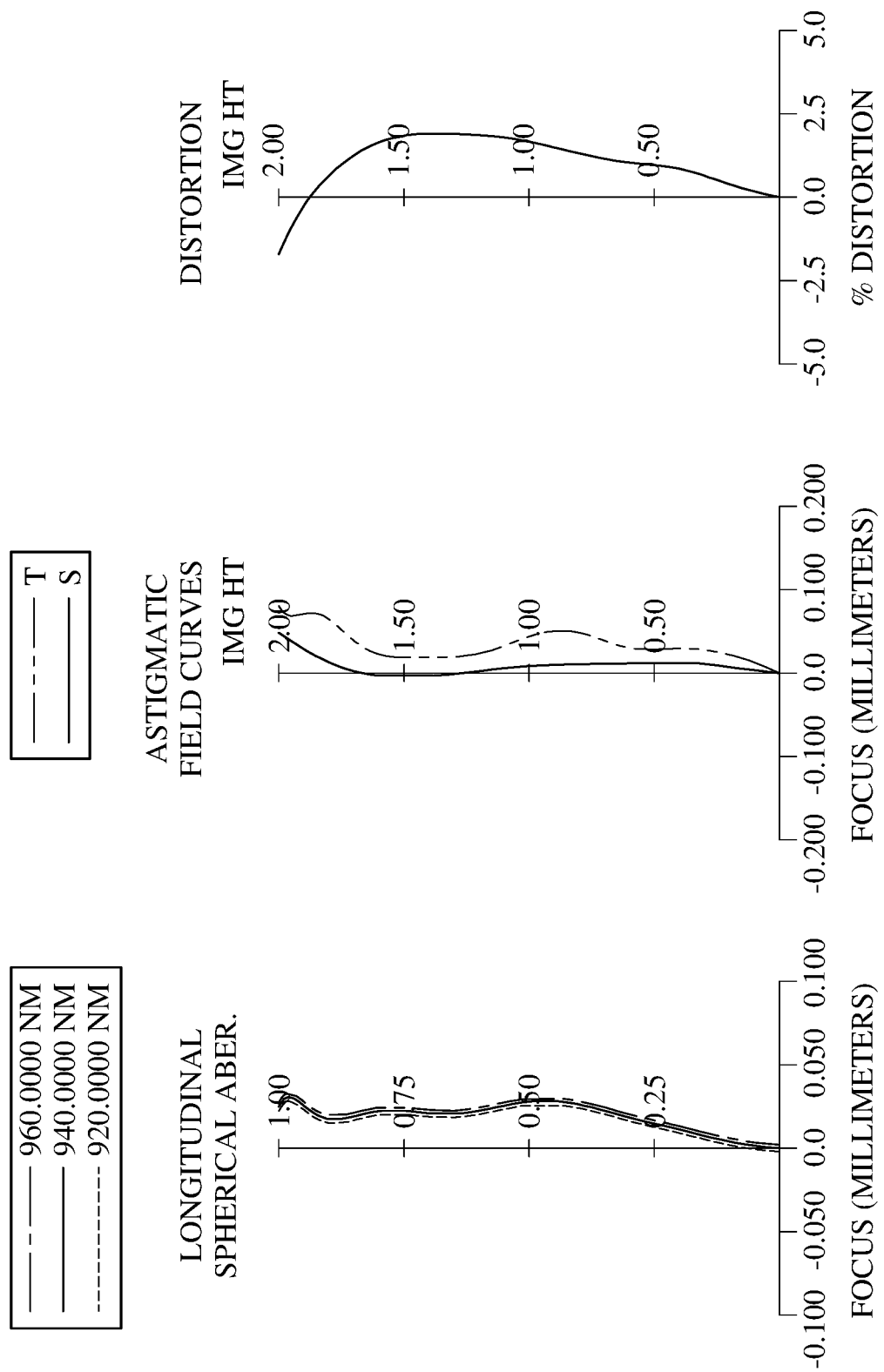
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical lens assembly (its reference numeral is omitted) of the present disclosure and an image sensor 470. The optical lens assembly includes, in order from an object side to an image side along an imaging optical path, an aperture stop 400, a first lens element 410, a stop 401, a second lens element 420, a stop 402, a third lens element 430, a fourth lens element 440, a filter 450 and an image surface 460. The optical lens assembly includes four lens elements (410, 420, 430 and 440) with no additional lens element disposed between each of the adjacent four lens elements.

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric. The object-side surface 411 of the first lens element 410 has at least one inflection point in an off-axis region thereof. The image-side surface 412 of the first lens element 410 has at least one inflection point and at least one critical point in an off-axis region thereof.

The second lens element 420 with positive refractive power has an object-side surface 421 being convex in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has at least one inflection point in an off-axis region thereof. The image-side surface 422 of the second lens element 420 has at least one inflection point in an off-axis region thereof. The object-side surface 421 of the second lens element 420 has at least one critical point in the off-axis region thereof. The image-side surface 422 of the second lens element 420 has at least one critical point in the off-axis region thereof.

The third lens element 430 with positive refractive power has an object-side surface 431 being concave in a paraxial region thereof and an image-side surface 432 being convex in a paraxial region thereof. The third lens element 430 is made of plastic material and has the object-side surface 431 and the image-side surface 432 being both aspheric. The object-side surface 431 of the third lens element 430 has at least one inflection point in an off-axis region thereof. The image-side surface 432 of the third lens element 430 has at least one inflection point and at least one critical point in an off-axis region thereof.

The fourth lens element 440 with negative refractive power has an object-side surface 441 being convex in a paraxial region thereof and an image-side surface 442 being concave in a paraxial region thereof. The fourth lens element 440 is made of plastic material and has the object-side surface 441 and the image-side surface 442 being both aspheric. The object-side surface 441 of the fourth lens element 440 has at least one inflection point in an off-axis region thereof. The image-side surface 442 of the fourth lens element 440 has at least one inflection point in an off-axis region thereof. The object-side surface 441 of the fourth lens element 440 has at least one concave critical point in the off-axis region thereof. The image-side surface 442 of the fourth lens element 440 has at least one convex critical point in the off-axis region thereof.

The filter 450 is made of glass material and located between the fourth lens element 440 and the image surface 460, and will not affect the focal length of the optical lens assembly. The image sensor 470 is disposed on or near the image surface 460 of the optical lens assembly.

In this embodiment, when a vertical distance between the critical point on the object-side surface 421 of the second lens element 420 and an optical axis is Yc21, and a vertical distance between the critical point on the image-side surface 422 of the second lens element 420 and the optical axis is Yc22, the following condition is satisfied: Yc21/Yc22=0.73.

Figure 30:
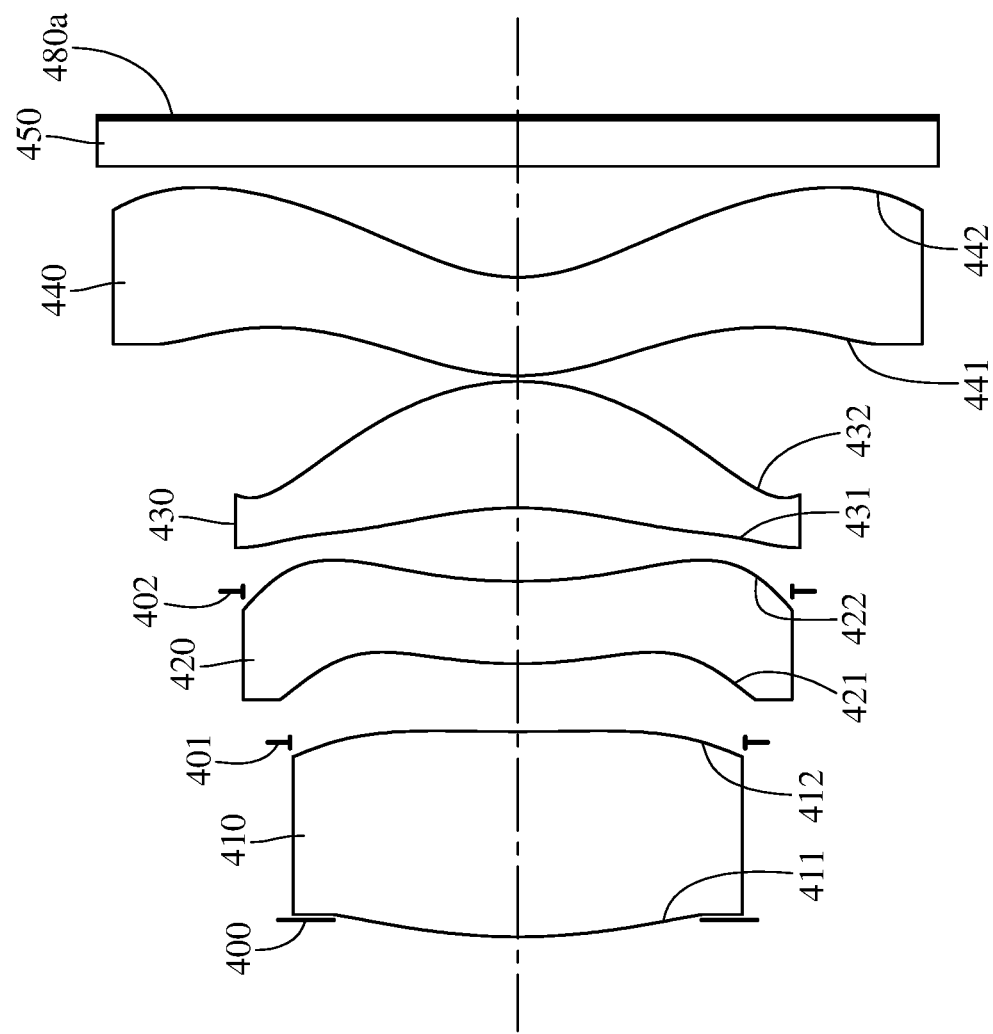
FIG. 30 shows a schematic view of a configuration of a VIS-cut filter disposed on the image-side surface of the filter according to the 4th embodiment of the present disclosure.
Figure 31:
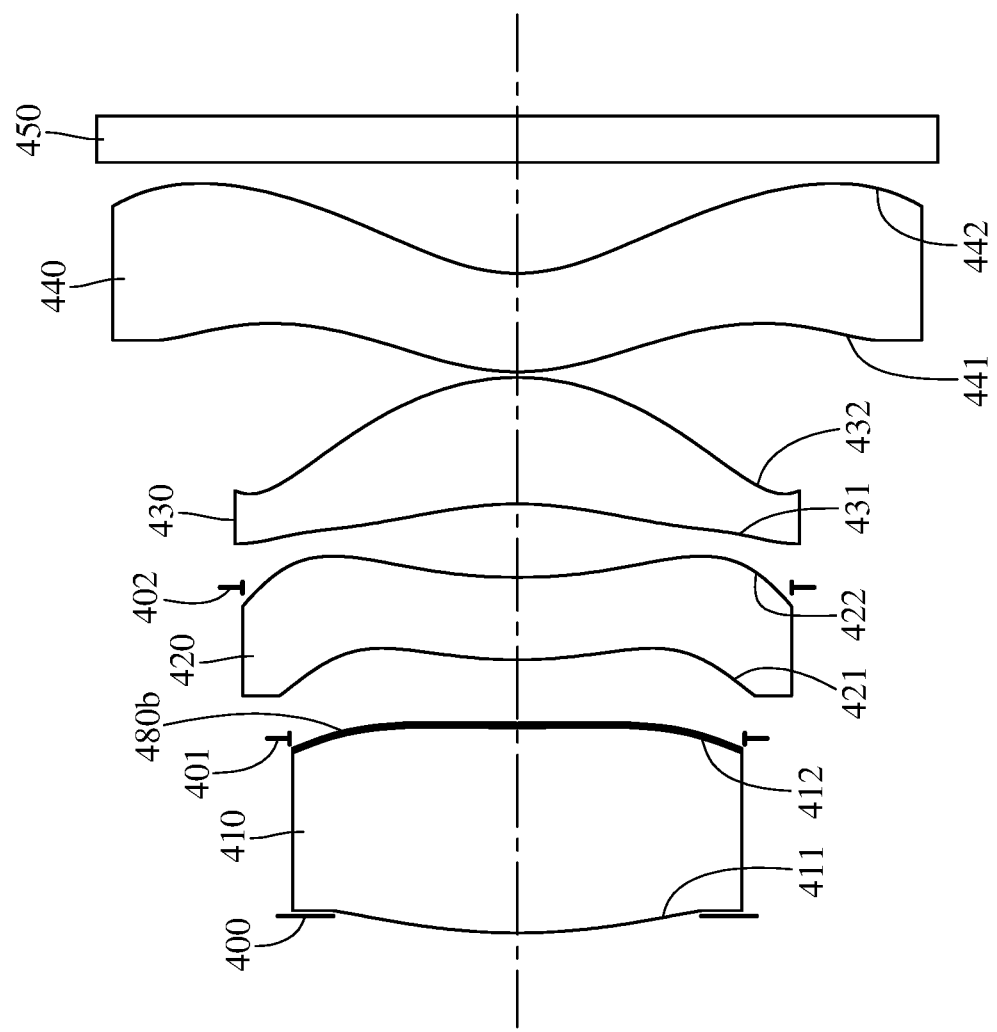
FIG. 31 shows a schematic view of another configuration of a VIS-cut filter disposed on the image-side surface of the first lens element according to the 4th embodiment of the present disclosure.
Figure 32:
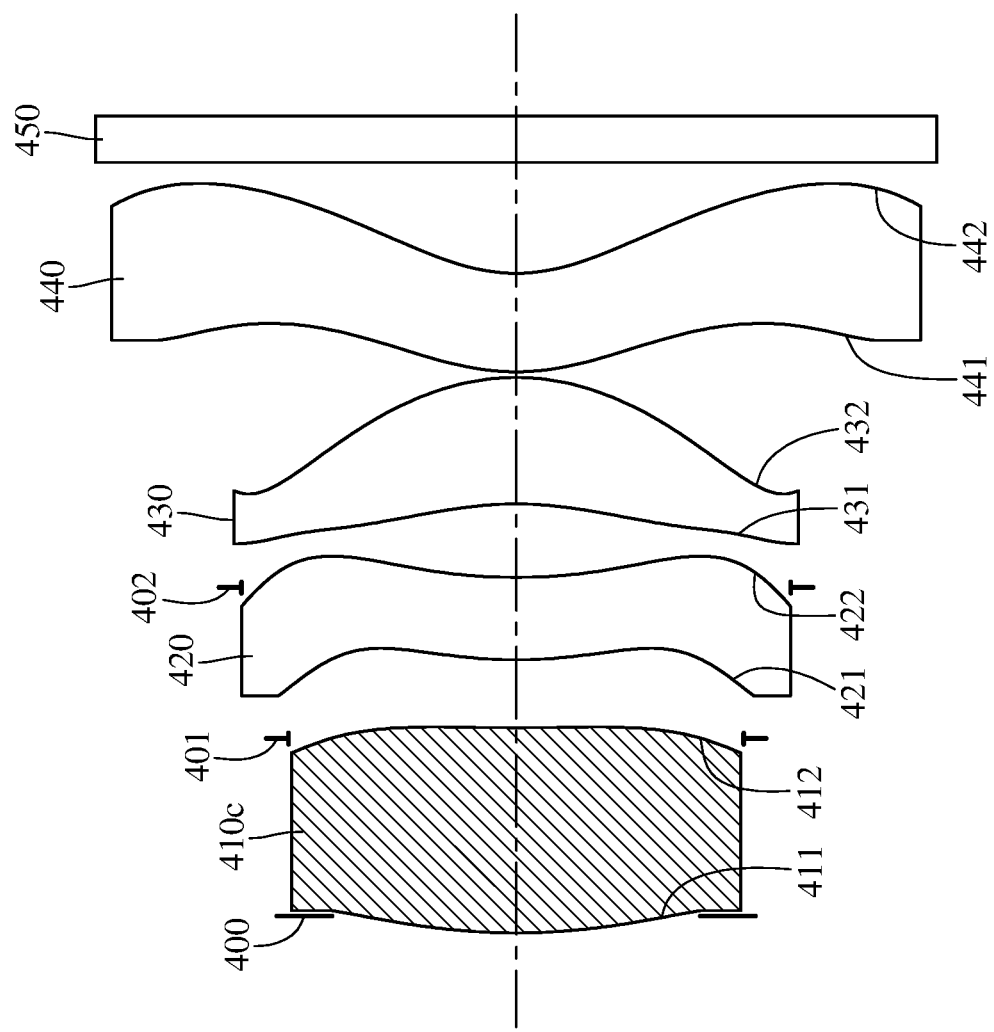
FIG. 32 shows a schematic view of another configuration where the first lens element is made of VIS-cut material according to the 4th embodiment of the present disclosure.

The optical lens assembly in this embodiment is an infrared system, which can be operated within an infrared wavelength range, and the operating wavelength range thereof is 920-960 nm. The optical lens assembly can further include a VIS-cut filter for blocking wavelengths of visible light of the incoming light. For example, please refer to FIG. 30, FIG. 31 and FIG. 32. FIG. 30 shows a schematic view of a configuration of a VIS-cut filter disposed on the image-side surface of the filter according to the 4th embodiment of the present disclosure, FIG. 31 shows a schematic view of another configuration of a VIS-cut filter disposed on the image-side surface of the first lens element according to the 4th embodiment of the present disclosure, and FIG. 32 shows a schematic view of another configuration where the first lens element is made of VIS-cut material according to the 4th embodiment of the present disclosure. In the configuration as shown in FIG. 30, a VIS-cut filter 480a is disposed on an image-side surface of the filter 450, but the present disclosure is not limited thereto. In some configurations, the VIS-cut filter can be disposed on an object-side surface of the filter 450 or any of the object-side surfaces and image-side surfaces of the lens elements according to actual requirements. For instance, in the configuration as shown in FIG. 31, a VIS-cut filter 480b is disposed on the image-side surface 412 of the first lens element 410. In addition, besides the abovementioned configurations where the optical lens assembly is additionally provided with a VIS-cut filter, the configuration as shown in FIG. 32 is also provided. As seen in FIG. 32, the first lens element 410c is made of black plastic material, so the first lens element 410c can be configured as a VIS-cut filter of the optical lens assembly as well. Furthermore, in other configurations, it can be one or more of the first lens element, the second lens element, the third lens element and the fourth lens element being made of black plastic material so as to be configured as a VIS-cut filter of the optical lens assembly. The optical lens assembly in this embodiment being provided with a VIS-cut filter as shown in FIG. 30, FIG. 31 and FIG. 32 is only exemplary. The optical lens assembly of other embodiments of the present disclosure can also be provided with any one of the VIS-cut filters as described above, and the present disclosure is not limited thereto.

The detailed optical data of the 4th embodiment are shown in Table 7 and the aspheric surface data are shown in Table 8 below.

TABLE 7

4th Embodiment
fd = 2.39 mm, EPD = 1.66 mm, HFOV = 39.2 deg.

| Surface # | | Curvature Radius | Thickness | Material | Index d-line | Index 940 nm | Abbe # | Focal Length d-line | Focal Length 940 nm |
|---|---|---|---|---|---|---|---|---|---|
| 0 | Object | Plano | Infinity | | | | | | |
| 1 | Ape. Stop | Plano | −0.076 | | | | | | |
| 2 | Lens 1 | 2.821 (ASP) | 0.925 | Plastic | 1.639 | 1.617 | 23.5 | 5.67 | 5.87 |
| 3 | | 11.151 (ASP) | −0.049 | | | | | | |
| 4 | Stop | Plano | 0.355 | | | | | | |
| 5 | Lens 2 | 2.066 (ASP) | 0.372 | Plastic | 1.639 | 1.617 | 23.5 | 11.70 | 12.16 |
| 6 | | 2.655 (ASP) | −0.046 | | | | | | |
| 7 | Stop | Plano | 0.377 | Plastic | 1.639 | 1.617 | 23.5 | 3.47 | 3.61 |
| 8 | Lens 3 | −1.513 (ASP) | 0.570 | | | | | | |
| 9 | | −1.031 (ASP) | 0.025 | Plastic | 1.639 | 1.617 | 23.5 | −11.46 | −11.47 |

TABLE 7-continued

4th Embodiment
fd = 2.39 mm, EPD = 1.66 mm, HFOV = 39.2 deg.

| Surface # | | Curvature Radius | Thickness | Material | Index d-line | 940 nm | Abbe # | Focal Length d-line | 940 nm |
|---|---|---|---|---|---|---|---|---|---|
| 10 | Lens 4 | 1.029 (ASP) | 0.444 | | | | | | |
| 11 | | 0.750 (ASP) | 0.500 | Glass | 1.517 | 1.508 | 64.2 | — | — |
| 12 | Filter | Plano | 0.210 | | | | | | |
| 13 | | Plano | 0.460 | | | | | | |
| 14 | Image | Plano | 0.000 | | | | | | |

Note:
Operating wavelength range is 920–960 nm (infrared light), reference wavelength is 940 nm, and d-line wavelength is 587.6 nm.
An effective radius of the stop 401 (Surface 4) is 1.025 mm.
An effective radius of the stop 402 (Surface 7) is 1.237 mm.

TABLE 8

Aspheric Coefficients

| Surface # | 2 | 3 | 5 | 6 |
|---|---|---|---|---|
| k = | −9.0000E+01 | 0.0000E+00 | 0.0000E+00 | 0.0000E+00 |
| A4 = | 4.5739E−01 | −1.3957E−01 | −1.8954E−01 | 1.2092E−01 |
| A6 = | −2.2316E+00 | −2.3018E−01 | −1.2826E−01 | −4.9615E−01 |
| A8 = | 8.3529E+00 | 8.5363E−01 | −1.2274E+00 | 6.7390E−01 |
| A10 = | −2.1009E+01 | −1.8403E+00 | 5.3471E+00 | −1.4331E+00 |
| A12 = | 3.1917E+01 | 2.3741E+00 | −1.4885E+01 | 2.6981E+00 |
| A14 = | −2.6312E+01 | −1.6473E+00 | 2.5441E+01 | −3.2378E+00 |
| A16 = | 8.9949E+00 | 4.7612E−01 | −2.4502E+01 | 2.2195E+00 |
| A18 = | — | — | 1.2267E+01 | −7.9097E−01 |
| A20 = | — | — | −2.4889E+00 | 1.1387E−01 |

| Surface # | 8 | 9 | 10 | 11 |
|---|---|---|---|---|
| k = | −1.4855E+00 | −1.0000E+00 | −1.0112E+00 | −1.0000E+00 |
| A4 = | 4.9219E−01 | 8.7713E−02 | −4.2366E−01 | −6.6561E−01 |
| A6 = | −1.1529E+00 | −3.5640E−01 | 2.1169E−01 | 6.5493E−01 |
| A8 = | 2.6526E+00 | 1.2725E+00 | −6.1561E−02 | −5.7574E−01 |
| A10 = | −4.2271E+00 | −2.8927E+00 | −6.1103E−04 | 3.9065E−01 |
| A12 = | 4.8228E+00 | 4.1134E+00 | −6.5668E−04 | −1.9100E−01 |
| A14 = | −4.1241E+00 | −3.5247E+00 | 7.3803E−03 | 6.3595E−02 |
| A16 = | 2.3979E+00 | 1.7700E+00 | −4.3599E−03 | −1.3531E−02 |
| A18 = | −7.9322E−01 | −4.7432E−01 | 1.0238E−03 | 1.6467E−03 |
| A20 = | 1.0937E−01 | 5.1562E−02 | −8.9490E−05 | −8.6705E−05 |

In the 4th embodiment, the equation of the aspheric surface profiles of the aforementioned lens elements is the same as the equation of the 1st embodiment. Also, the definitions of these parameters shown in the following table are the same as those stated in the above embodiments with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| fd [mm] | 2.39 | TD/CT1 | 3.21 |
| fr [mm] | 2.49 | TD/BL | 2.54 |
| EPD [mm] | 1.66 | TL/ImgH | 2.071 |
| fd/EPD | 1.44 | fd/R4 | 0.90 |
| HFOV [deg.] | 39.2 | fd/R7 | 2.33 |
| Vd1 + Vd2 + Vd3 + Vd4 | 94.0 | \|fd/fd1\| | 0.42 |
| Vdmax − Vdmin | 0.0 | \|fd/fd2\| | 0.20 |
| CT1/(T12 + CT2) | 1.36 | \|fd/fd3\| | 0.69 |
| CT1/CT2 | 2.49 | \|fd/fd4\| | 0.21 |
| CT1/CT3 | 1.62 | fd/ET1 | 3.37 |
| CT1/CT4 | 2.08 | Yc21 [mm] | 0.61 |
| CT1/ET1 | 1.30 | Yc22 [mm] | 0.83 |
| T12/T23 | 0.92 | 2 × Yc22/EPD | 1.00 |
| EPD/TD | 0.56 | Yc21/Yc22 | 0.73 |

5th Embodiment

Figure 9:
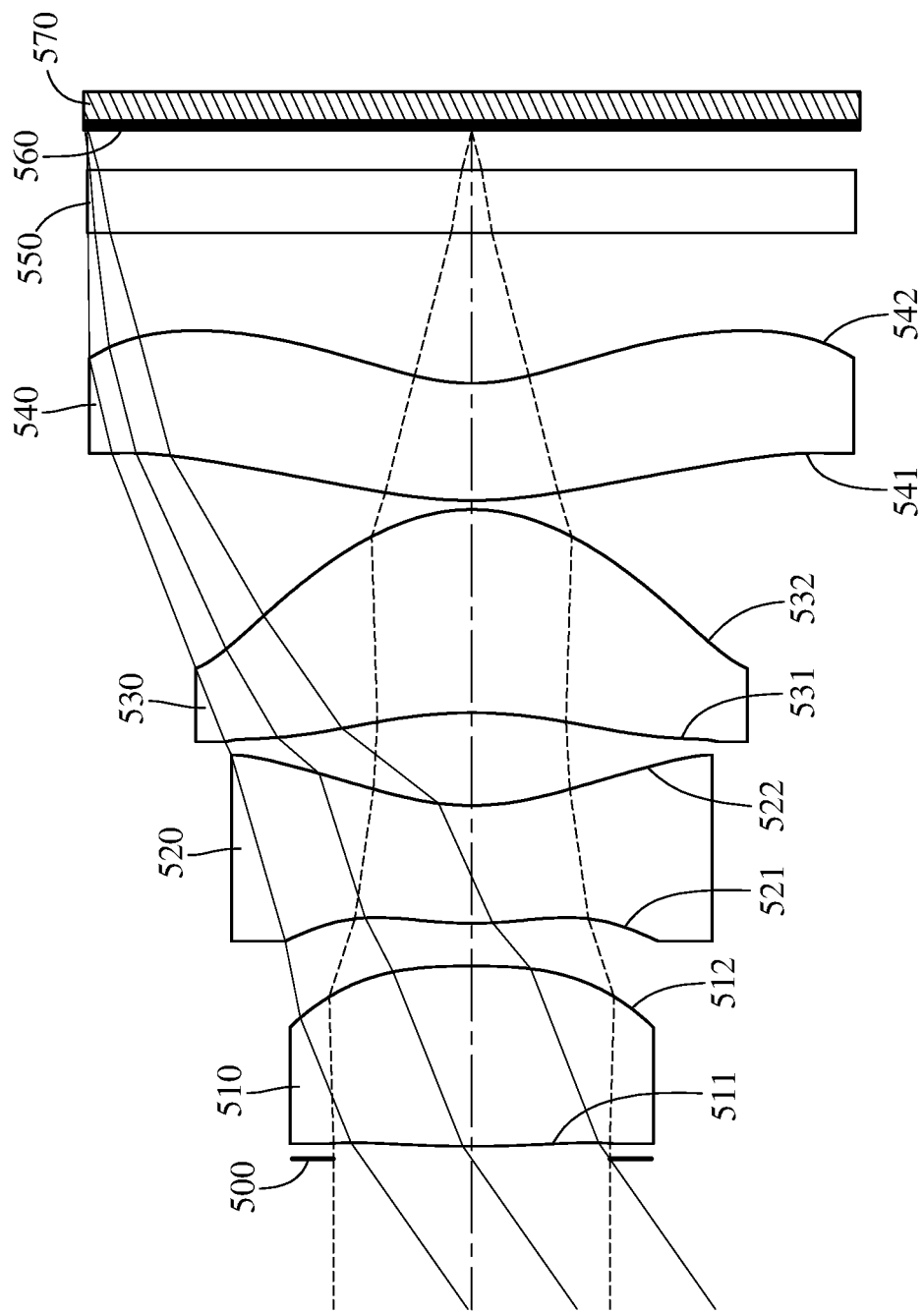
FIG. 9 is a schematic view of an image capturing unit according to the 5th embodiment of the present disclosure.
Figure 10:
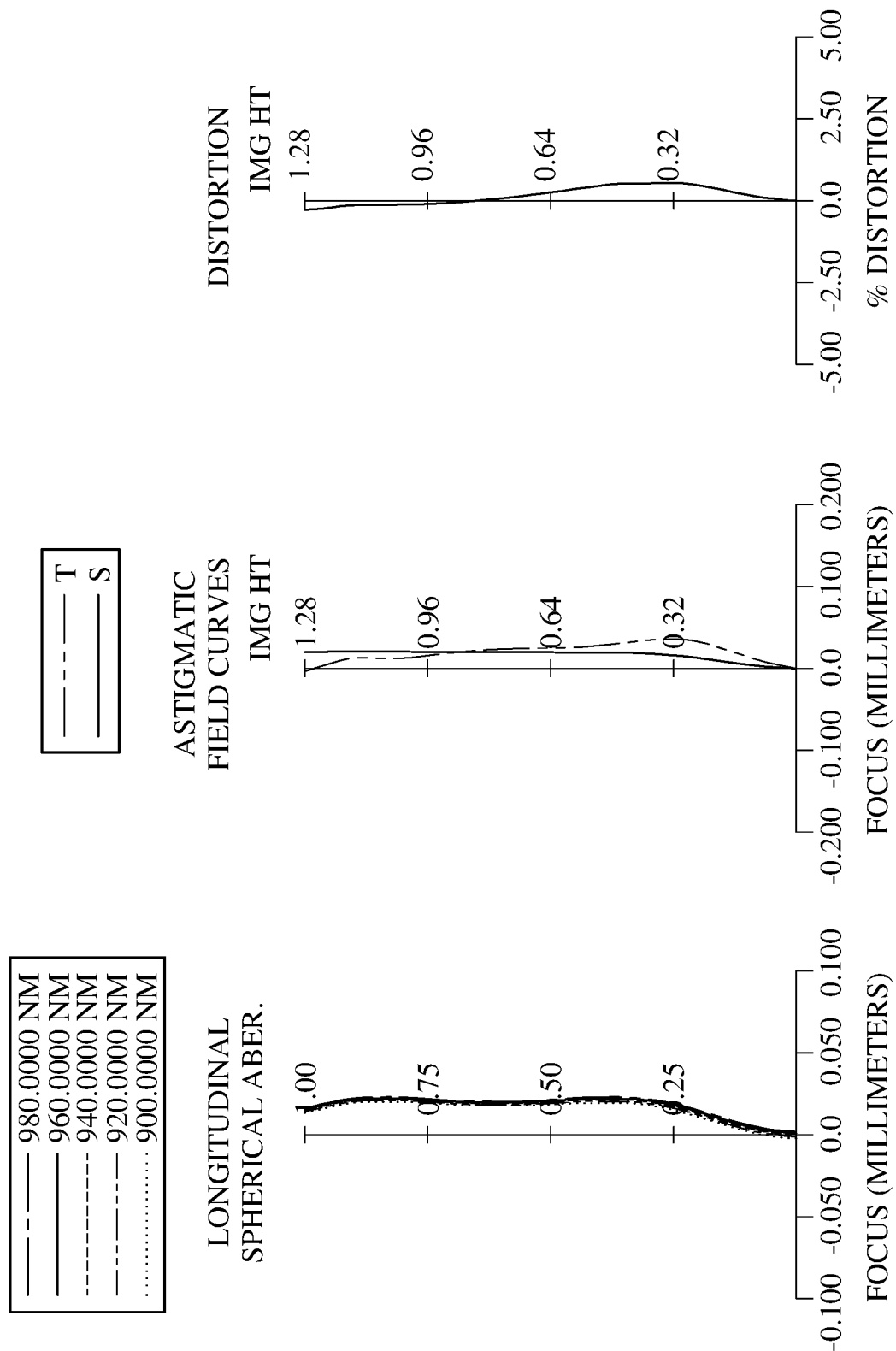
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical lens assembly (its reference numeral is omitted) of the present disclosure and an image sensor 570. The optical lens assembly includes, in order from an object side to an image side along an imaging optical path, an aperture stop 500, a first lens element 510, a second lens element 520, a third lens element 530, a fourth lens element 540, a filter 550 and an image surface 560. The optical lens assembly includes four lens elements (510, 520, 530 and 540) with no additional lens element disposed between each of the adjacent four lens elements.

The first lens element 510 with positive refractive power has an object-side surface 511 being convex in a paraxial region thereof and an image-side surface 512 being convex in a paraxial region thereof. The first lens element 510 is made of plastic material and has the object-side surface 511 and the image-side surface 512 being both aspheric. The object-side surface 511 of the first lens element 510 has at least one inflection point and at least one critical point in an off-axis region thereof.

The second lens element 520 with negative refractive power has an object-side surface 521 being convex in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point in an off-axis region thereof. The image-side surface 522 of the second lens element 520 has at least one inflection point in an off-axis region thereof. The object-side surface 521 of the second lens element 520 has at least one critical point in the off-axis region thereof. The image-side surface 522 of the second lens element 520 has at least one critical point in the off-axis region thereof.

The third lens element 530 with positive refractive power has an object-side surface 531 being concave in a paraxial region thereof and an image-side surface 532 being convex in a paraxial region thereof. The third lens element 530 is made of plastic material and has the object-side surface 531 and the image-side surface 532 being both aspheric. The object-side surface 531 of the third lens element 530 has at least one inflection point in an off-axis region thereof. The image-side surface 532 of the third lens element 530 has at least one inflection point in an off-axis region thereof.

The fourth lens element 540 with negative refractive power has an object-side surface 541 being convex in a paraxial region thereof and an image-side surface 542 being concave in a paraxial region thereof. The fourth lens element 540 is made of plastic material and has the object-side surface 541 and the image-side surface 542 being both aspheric. The object-side surface 541 of the fourth lens element 540 has at least one inflection point in an off-axis region thereof. The image-side surface 542 of the fourth lens element 540 has at least one inflection point in an off-axis region thereof. The object-side surface 541 of the fourth lens element 540 has at least one concave critical point in the off-axis region thereof. The image-side surface 542 of the fourth lens element 540 has at least one convex critical point in the off-axis region thereof.

The filter 550 is made of glass material and located between the fourth lens element 540 and the image surface 560, and will not affect the focal length of the optical lens assembly. The image sensor 570 is disposed on or near the image surface 560 of the optical lens assembly.

The detailed optical data of the 5th embodiment are shown in Table 9 and the aspheric surface data are shown in Table 10 below.

TABLE 9

5th Embodiment
fd = 1.78 mm, EPD = 0.92 mm, HFOV = 35.0 deg.

| | | | | | Index | | | Focal Length | |
|---|---|---|---|---|---|---|---|---|---|
| Surface # | | Curvature Radius | Thickness | Material | d-line | 940 nm | Abbe # | d-line | 940 nm |
| 0 | Object | Plano | Infinity | | | | | | |
| 1 | Ape. Stop | Plano | 0.042 | | | | | | |
| 2 | Lens 1 | 3.739 (ASP) | 0.600 | Plastic | 1.545 | 1.536 | 56.1 | 3.14 | 3.19 |
| 3 | | −2.979 (ASP) | 0.142 | | | | | | |
| 4 | Lens 2 | 1.214 (ASP) | 0.392 | Plastic | 1.669 | 1.641 | 19.5 | −6.54 | −6.71 |
| 5 | | 0.827 (ASP) | 0.309 | | | | | | |
| 6 | Lens 3 | −1.410 (ASP) | 0.676 | Plastic | 1.639 | 1.617 | 23.5 | 1.19 | 1.23 |
| 7 | | −0.585 (ASP) | 0.030 | | | | | | |
| 8 | Lens 4 | 1.350 (ASP) | 0.390 | Plastic | 1.660 | 1.634 | 20.4 | −2.38 | −2.46 |
| 9 | | 0.642 (ASP) | 0.500 | | | | | | |
| 10 | Filter | Plano | 0.210 | Glass | 1.517 | 1.508 | 64.2 | — | — |
| 11 | | Plano | 0.133 | | | | | | |
| 12 | Image | Plano | 0.000 | | | | | | |

Note:
Operating wavelength range is 920–960 nm (infrared light), reference wavelength is 940 nm, and d-line wavelength is 587.6 nm.
An effective radius of the object-side surface 521 (Surface 4) is 0.620 mm.

TABLE 10

Aspheric Coefficients

| Surface # | 2 | 3 | 4 | 5 |
|---|---|---|---|---|
| k = | −9.9000E+01 | 1.8952E+01 | −3.2031E+01 | −2.8963E−01 |
| A4 = | −3.3430E−02 | −2.0564E+00 | −5.8698E−01 | −1.0592E+00 |
| A6 = | −1.2886E+00 | 6.3286E+00 | −8.5441E+00 | −1.1965E−01 |

TABLE 10-continued

| Aspheric Coefficients | | | | |
|---|---|---|---|---|
| A8 = | 2.3483E+00 | −1.3365E+01 | 4.8786E+01 | 5.2840E+00 |
| A10 = | −7.7954E+00 | 1.3120E+01 | −1.3391E+02 | −1.4433E+01 |
| A12 = | — | — | 2.0132E+02 | 1.7027E+01 |
| A14 = | — | — | −1.2636E+02 | −8.2658E+00 |

| Surface # | 6 | 7 | 8 | 9 |
|---|---|---|---|---|
| k = | 8.4258E−01 | −2.2961E+00 | −5.3720E−01 | −5.2195E+00 |
| A4 = | 5.0770E−01 | −3.5068E−01 | −7.1456E−01 | −5.3751E−01 |
| A6 = | −7.5861E−02 | 2.6282E−01 | 1.3929E+00 | 9.9759E−01 |
| A8 = | −8.9120E−01 | 7.1284E−01 | −2.1589E+00 | −1.4041E+00 |
| A10 = | 6.2184E+00 | −3.4333E+00 | 2.2301E+00 | 1.2903E+00 |
| A12 = | −1.6401E+01 | 6.4016E+00 | −1.4194E+00 | −7.2436E−01 |
| A14 = | 2.0165E+01 | −5.1806E+00 | 4.9114E−01 | 2.1879E−01 |
| A16 = | −1.0001E+01 | 1.5925E+00 | −6.9761E−02 | −2.6861E−02 |

In the 5th embodiment, the equation of the aspheric surface profiles of the aforementioned lens elements is the same as the equation of the 1st embodiment. Also, the definitions of these parameters shown in the following table are the same as those stated in the above embodiments with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| fd [mm] | 1.78 | TD/CT1 | 4.23 |
| fr [mm] | 1.84 | TD/BL | 3.01 |
| EPD [mm] | 0.92 | TL/ImgH | 2.632 |
| fd/EPD | 1.94 | fd/R4 | 2.15 |
| HFOV [deg.] | 35.0 | fd/R7 | 1.32 |
| Vd1 + Vd2 + Vd3 + Vd4 | 119.4 | |fd/fd1| | 0.57 |
| Vdmax − Vdmin | 36.6 | |fd/fd2| | 0.27 |
| CT1/(T12 + CT2) | 1.12 | |fd/fd3| | 1.50 |
| CT1/CT2 | 1.53 | |fd/fd4| | 0.75 |
| CT1/CT3 | 0.89 | fd/ET1 | 4.60 |
| CT1/CT4 | 1.54 | Yc21 [mm] | 0.32 |
| CT1/ET1 | 1.55 | Yc22 [mm] | 0.79 |
| T12/T23 | 0.46 | 2 × Yc22/EPD | 1.72 |
| EPD/TD | 0.36 | Yc21/Yc22 | 0.40 |

6th Embodiment

Figure 11:
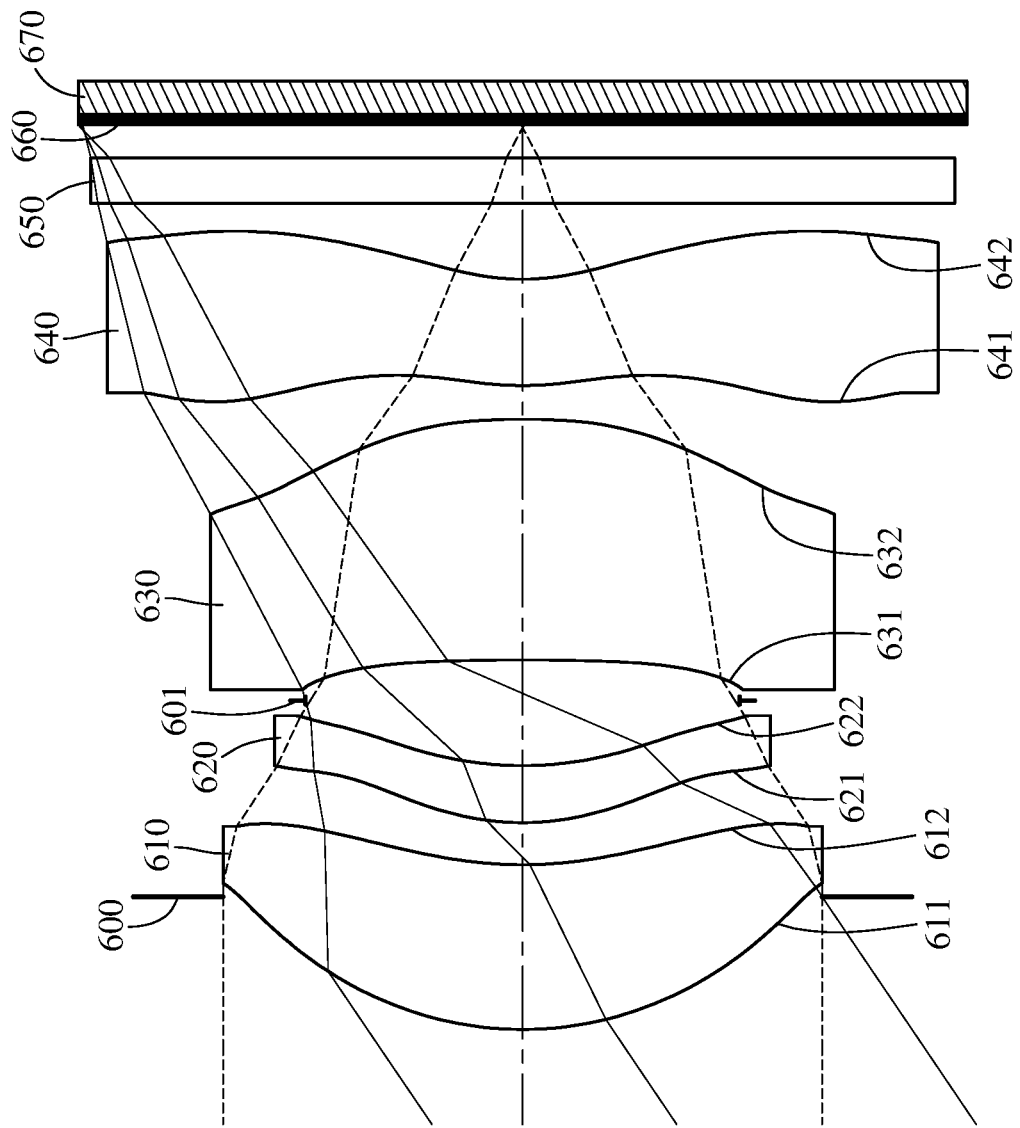
FIG. 11 is a schematic view of an image capturing unit according to the 6th embodiment of the present disclosure.
Figure 12:
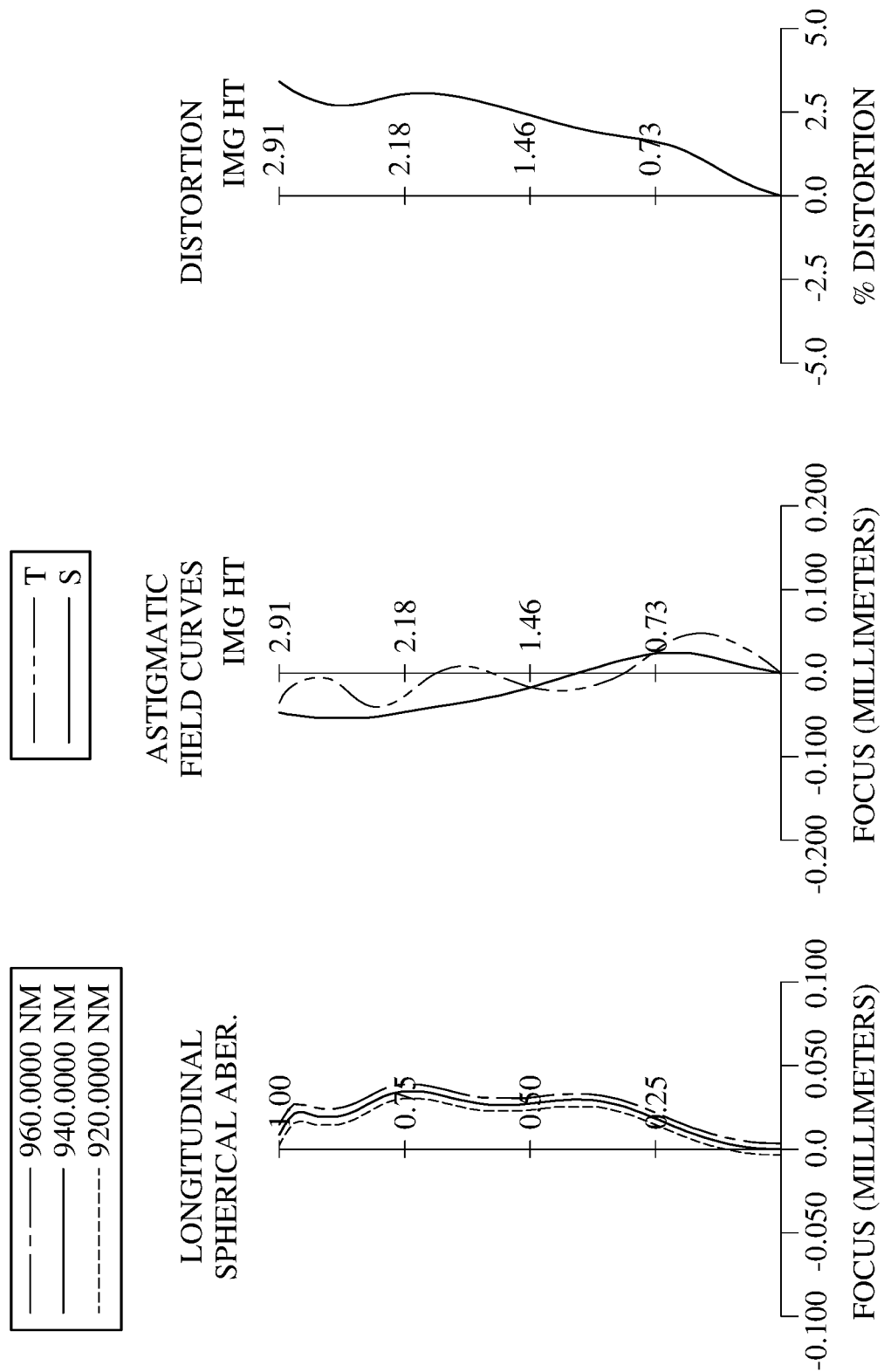
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical lens assembly (its reference numeral is omitted) of the present disclosure and an image sensor 670. The optical lens assembly includes, in order from an object side to an image side along an imaging optical path, an aperture stop 600, a first lens element 610, a second lens element 620, a stop 601, a third lens element 630, a fourth lens element 640, a filter 650 and an image surface 660. The optical lens assembly includes four lens elements (610, 620, 630 and 640) with no additional lens element disposed between each of the adjacent four lens elements.

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric. The object-side surface 611 of the first lens element 610 has at least one inflection point in an off-axis region thereof. The image-side surface 612 of the first lens element 610 has at least one inflection point and at least one critical point in an off-axis region thereof.

The second lens element 620 with positive refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point in an off-axis region thereof. The image-side surface 622 of the second lens element 620 has at least one inflection point in an off-axis region thereof.

The third lens element 630 with positive refractive power has an object-side surface 631 being concave in a paraxial region thereof and an image-side surface 632 being convex in a paraxial region thereof. The third lens element 630 is made of plastic material and has the object-side surface 631 and the image-side surface 632 being both aspheric. The image-side surface 632 of the third lens element 630 has at least one inflection point in an off-axis region thereof.

The fourth lens element 640 with negative refractive power has an object-side surface 641 being convex in a paraxial region thereof and an image-side surface 642 being concave in a paraxial region thereof. The fourth lens element 640 is made of plastic material and has the object-side surface 641 and the image-side surface 642 being both aspheric. The object-side surface 641 of the fourth lens element 640 has at least one inflection point in an off-axis region thereof. The image-side surface 642 of the fourth lens element 640 has at least one inflection point in an off-axis region thereof. The object-side surface 641 of the fourth lens element 640 has at least one convex critical point and at least one concave critical point in the off-axis region thereof. The image-side surface 642 of the fourth lens element 640 has at least one convex critical point in the off-axis region thereof.

The filter 650 is made of glass material and located between the fourth lens element 640 and the image surface 660, and will not affect the focal length of the optical lens assembly. The image sensor 670 is disposed on or near the image surface 660 of the optical lens assembly.

The detailed optical data of the 6th embodiment are shown in Table 11 and the aspheric surface data are shown in Table 12 below.

TABLE 11

6th Embodiment
fd = 3.95 mm, EPD = 3.94 mm, HFOV = 34.1 deg.

| Surface # | | Curvature Radius | Thickness | Material | Index d-line | 940 nm | Abbe # | Focal Length d-line | 940 nm |
|---|---|---|---|---|---|---|---|---|---|
| 0 | Object | Plano | Infinity | | | | | | |
| 1 | Ape. Stop | Plano | −0.875 | | | | | | |
| 2 | Lens 1 | 2.294 (ASP) | 1.086 | Plastic | 1.660 | 1.634 | 20.4 | 11.19 | 11.79 |
| 3 | | 2.700 (ASP) | 0.277 | | | | | | |
| 4 | Lens 2 | 1.737 (ASP) | 0.377 | Plastic | 1.660 | 1.634 | 20.4 | 7.55 | 7.89 |
| 5 | | 2.436 (ASP) | 0.429 | | | | | | |
| 6 | Stop | Plano | 0.267 | | | | | | |
| 7 | Lens 3 | −20.628 (ASP) | 1.587 | Plastic | 1.660 | 1.634 | 20.4 | 12.86 | 13.40 |
| 8 | | −6.197 (ASP) | 0.222 | | | | | | |
| 9 | Lens 4 | 1.889 (ASP) | 0.701 | Plastic | 1.660 | 1.634 | 20.4 | −28.39 | −28.27 |
| 10 | | 1.463 (ASP) | 0.500 | | | | | | |
| 11 | Filter | Plano | 0.300 | Glass | 1.517 | 1.508 | 64.2 | — | — |
| 12 | | Plano | 0.218 | | | | | | |
| 13 | Image | Plano | 0.000 | | | | | | |

Note:
Operating wavelength range is 920–960 nm (infrared light), reference wavelength is 940 nm, and d-line wavelength is 587.6 nm.
An effective radius of the stop 601 (Surface 6) is 1.430 mm.

TABLE 12

Aspheric Coefficients

| Surface # | 2 | 3 | 4 | 5 |
|---|---|---|---|---|
| k = | −1.7224E+00 | 6.4882E−01 | −1.8361E+00 | 1.1972E+00 |
| A4 = | 2.1342E−02 | −4.0973E−02 | 6.1946E−03 | 1.5280E−02 |
| A6 = | −1.3507E−02 | −1.1611E−02 | −3.4356E−02 | −4.6947E−02 |
| A8 = | 1.3721E−02 | 1.3662E−02 | 3.0616E−02 | 7.6292E−03 |
| A10 = | −6.9393E−03 | −7.6821E−03 | −4.7089E−02 | −8.9709E−03 |
| A12 = | 1.8835E−03 | 2.0811E−03 | 2.9626E−02 | 1.7539E−03 |
| A14 = | −2.4687E−04 | −2.6579E−04 | −7.6548E−03 | 3.1117E−03 |
| A16 = | 9.9218E−06 | 1.0391E−05 | 7.0805E−04 | −1.0363E−03 |

| Surface # | 7 | 8 | 9 | 10 |
|---|---|---|---|---|
| k = | 8.8407E+01 | −1.9039E+01 | −1.3413E+01 | −1.4493E+00 |
| A4 = | −4.7687E−02 | −2.4662E−01 | −1.8612E−01 | −2.0607E−01 |
| A6 = | 2.8385E−01 | 3.2101E−01 | 1.1153E−01 | 1.2070E−01 |
| A8 = | −1.0376E+00 | −2.9921E−01 | −4.3055E−02 | −5.1327E−02 |
| A10 = | 2.0485E+00 | 1.9371E−01 | 1.0472E−02 | 1.5427E−02 |
| A12 = | −2.4330E+00 | −8.4965E−02 | −1.2301E−03 | −3.1964E−03 |
| A14 = | 1.7797E+00 | 2.4540E−02 | −1.9921E−05 | 4.3905E−04 |
| A16 = | −7.8523E−01 | −4.4050E−03 | 2.2946E−05 | −3.7590E−05 |
| A18 = | 1.9182E−01 | 4.4013E−04 | −2.4015E−06 | 1.7965E−06 |
| A20 = | −1.9946E−02 | −1.8561E−05 | 8.2522E−08 | −3.6391E−08 |

In the 6th embodiment, the equation of the aspheric surface profiles of the aforementioned lens elements is the same as the equation of the 1st embodiment. Also, the definitions of these parameters shown in the following table are the same as those stated in the above embodiments with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| fd [mm] | 3.95 | T12/T23 | 0.40 |
| fr [mm] | 4.14 | EPD/TD | 0.80 |
| EPD [mm] | 3.94 | TD/CT1 | 4.55 |
| fd/EPD | 1.00 | TD/BL | 4.86 |

| 6th Embodiment | | | |
|---|---|---|---|
| HFOV [deg.] | 34.1 | TL/ImgH | 2.049 |
| Vd1 + Vd2 + Vd3 + Vd4 | 81.6 | fd/R4 | 1.62 |
| Vdmax − Vdmin | 0.0 | fd/R7 | 2.09 |
| CT1/(T12 + T2) | 1.66 | |fd/fd1| | 0.35 |
| CT1/CT2 | 2.88 | |fd/fd2| | 0.52 |
| CT1/CT3 | 0.68 | |fd/fd3| | 0.31 |
| CT1/CT4 | 1.55 | |fd/fd4| | 0.14 |
| CT1/ET1 | 2.92 | fd/ET1 | 10.62 |

7th Embodiment

Figure 13:
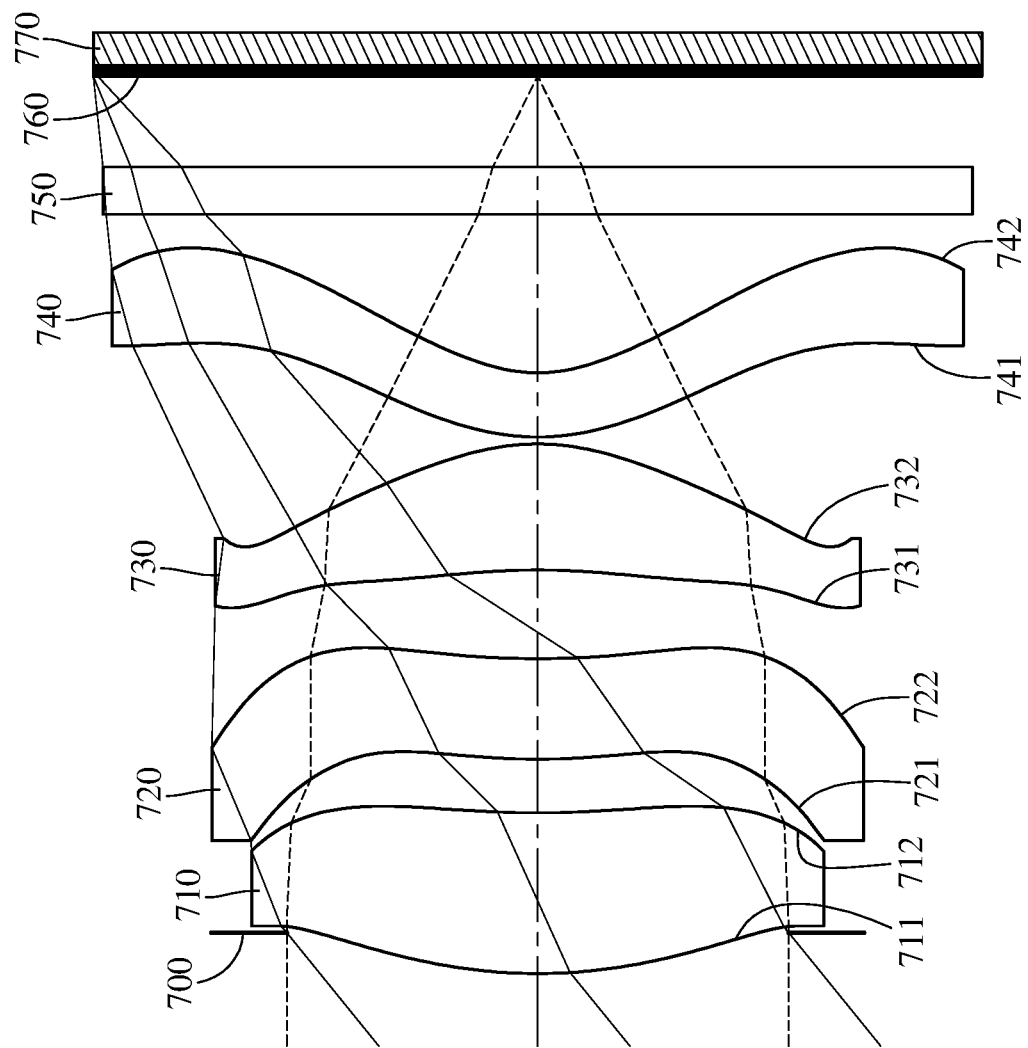
FIG. 13 is a schematic view of an image capturing unit according to the 7th embodiment of the present disclosure.
Figure 14:
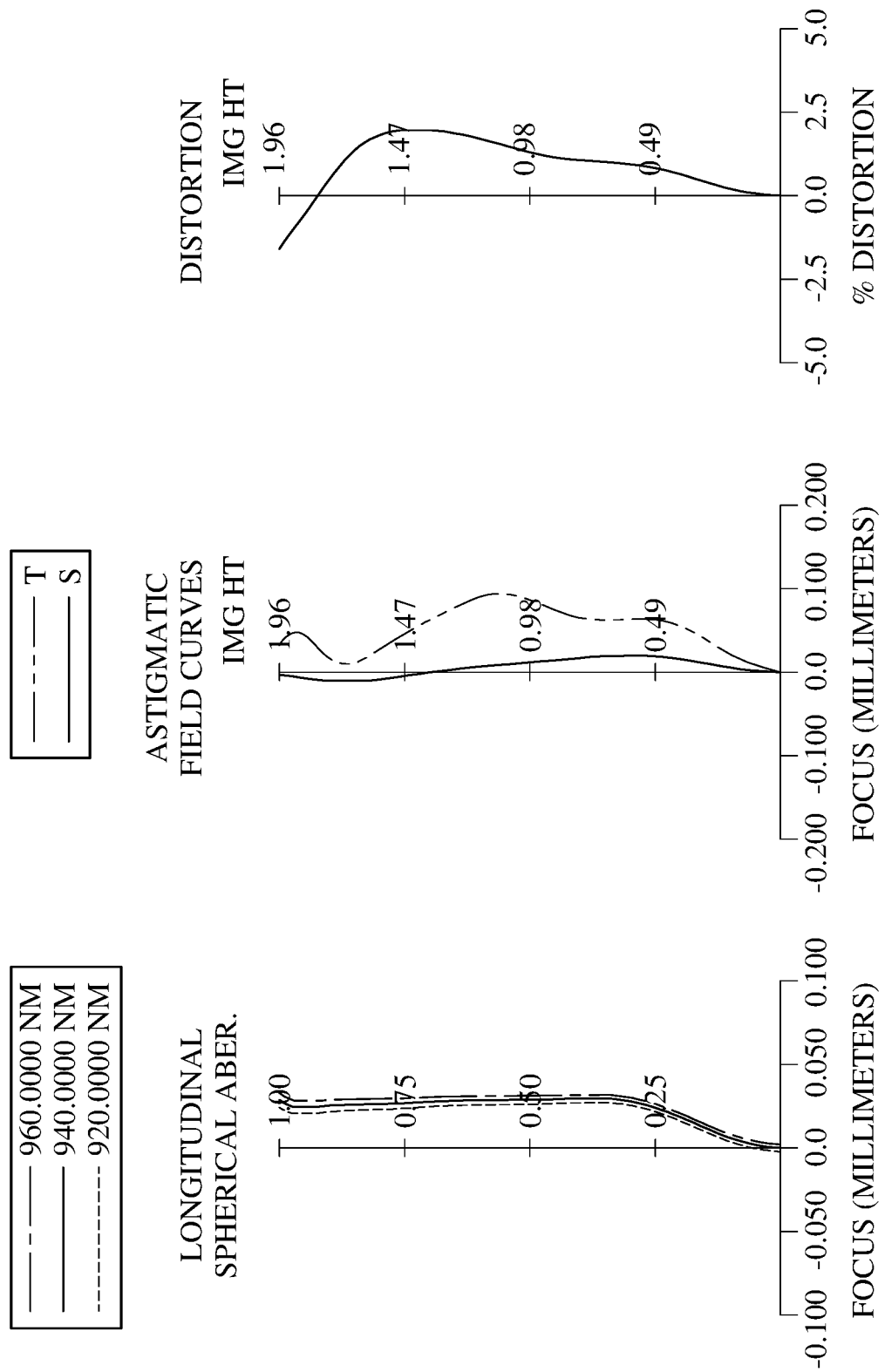
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical lens assembly (its reference numeral is omitted) of the present disclosure and an image sensor 770. The optical lens assembly includes, in order from an object side to an image side along an imaging optical path, an aperture stop 700, a first lens element 710, a second lens element 720, a third lens element 730, a fourth lens element 740, a filter 750 and an image surface 760. The optical lens assembly includes four lens elements (710, 720, 730 and 740) with no additional lens element disposed between each of the adjacent four lens elements.

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric. The object-side surface 711 of the first lens element 710 has at least one inflection point in an off-axis region thereof. The image-side surface 712 of the first lens element 710 has at least one inflection point and at least one critical point in an off-axis region thereof.

The second lens element 720 with positive refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one inflection point in an off-axis region thereof. The image-side surface 722 of the second lens element 720 has at least one inflection point in an off-axis region thereof. The object-side surface 721 of the second lens element 720 has at least one critical point in the off-axis region thereof. The image-side surface 722 of the second lens element 720 has at least one critical point in the off-axis region thereof.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric. The object-side surface 731 of the third lens element 730 has at least one inflection point in an off-axis region thereof. The image-side surface 732 of the third lens element 730 has at least one inflection point in an off-axis region thereof. The object-side surface 731 of the third lens element 730 has at least one critical point in the off-axis region thereof. The image-side surface 732 of the third lens element 730 has at least one critical point in the off-axis region thereof.

The fourth lens element 740 with negative refractive power has an object-side surface 741 being convex in a paraxial region thereof and an image-side surface 742 being concave in a paraxial region thereof. The fourth lens element 740 is made of plastic material and has the object-side surface 741 and the image-side surface 742 being both aspheric. The object-side surface 741 of the fourth lens element 740 has at least one inflection point in an off-axis region thereof. The image-side surface 742 of the fourth lens element 740 has at least one inflection point in an off-axis region thereof. The object-side surface 741 of the fourth lens element 740 has at least one concave critical point in the off-axis region thereof. The image-side surface 742 of the fourth lens element 740 has at least one convex critical point in the off-axis region thereof.

The filter 750 is made of glass material and located between the fourth lens element 740 and the image surface 760, and will not affect the focal length of the optical lens assembly. The image sensor 770 is disposed on or near the image surface 760 of the optical lens assembly.

The detailed optical data of the 7th embodiment are shown in Table 13 and the aspheric surface data are shown in Table 14 below.

TABLE 13

7th Embodiment
fd = 2.33 mm, EPD = 2.21 mm, HFOV = 39.1 deg.

| Surface # | | Curvature Radius | Thickness | Material | Index d-line | Index 940 nm | Abbe # | Focal Length d-line | Focal Length 940 nm |
|---|---|---|---|---|---|---|---|---|---|
| 0 | Object | Plano | Infinity | | | | | | |
| 1 | Ape. Stop | Plano | −0.180 | | | | | | |
| 2 | Lens 1 | 2.307 (ASP) | 1.710 | Plastic | 1.669 | 1.641 | 19.4 | 6.70 | 7.02 |
| 3 | | 4.163 (ASP) | 0.237 | | | | | | |
| 4 | Lens 2 | 2.881 (ASP) | 0.444 | Plastic | 1.534 | 1.525 | 55.9 | 18.53 | 18.87 |
| 5 | | 3.847 (ASP) | 0.392 | | | | | | |
| 6 | Lens 3 | −3.027 (ASP) | 0.557 | Plastic | 1.669 | 1.641 | 19.4 | 1.98 | 2.07 |
| 7 | | −0.988 (ASP) | 0.030 | | | | | | |
| 8 | Lens 4 | 1.002 (ASP) | 0.284 | Plastic | 1.669 | 1.641 | 19.4 | −4.15 | −4.28 |
| 9 | | 0.653 (ASP) | 0.700 | | | | | | |
| 10 | Filter | Plano | 0.210 | Glass | 1.517 | 1.508 | 64.2 | — | — |
| 11 | | Plano | 0.400 | | | | | | |
| 12 | Image | Plano | 0.000 | | | | | | |

Note:
Operating wavelength range is 920–960 nm (infrared light), reference wavelength is 940 nm, and d-line wavelength is 587.6 nm.

TABLE 14

| Aspheric Coefficients | | | | |
|---|---|---|---|---|
| Surface # | 2 | 3 | 4 | 5 |
| k = | −1.0723E+01 | 5.5006E+00 | −5.5290E+00 | −3.1530E+01 |
| A4 = | 9.0456E−02 | −1.0708E−01 | −1.8077E−01 | 5.0465E−02 |
| A6 = | −1.2260E−01 | −1.7611E−01 | 8.5599E−02 | −3.5996E−02 |
| A8 = | 1.6164E−01 | 5.6662E−01 | −7.9517E−01 | −5.4881E−01 |
| A10 = | −3.2653E−01 | −1.1933E+00 | 1.4670E+00 | 1.0040E+00 |
| A12 = | 6.2346E−01 | 1.5372E+00 | −1.5582E+00 | −9.3447E−01 |
| A14 = | −8.0614E−01 | −1.2135E+00 | 1.2843E+00 | 5.4003E−01 |
| A16 = | 6.0881E−01 | 5.7584E−01 | −7.7512E−01 | −1.9667E−01 |
| A18 = | −2.4293E−01 | −1.5258E−01 | 2.6800E−01 | 4.1045E−02 |
| A20 = | 3.9020E−02 | 1.7515E−02 | −3.7395E−02 | −3.6739E−03 |
| Surface # | 6 | 7 | 8 | 9 |
| k = | 1.5023E+00 | −2.8257E+00 | −5.8916E+00 | −4.1376E+00 |
| A4 = | 1.3172E−01 | 1.9422E−01 | 2.1168E−01 | 1.0988E−01 |
| A6 = | 3.3549E−01 | −4.6980E−01 | −2.9867E−01 | −1.1349E−01 |
| A8 = | −1.2312E+00 | 8.4539E−01 | 1.5342E−01 | −4.3882E−02 |
| A10 = | 2.0983E+00 | −1.1166E+00 | −2.7256E−02 | 1.2172E−01 |
| A12 = | −2.2914E+00 | 1.0645E+00 | −1.0666E−02 | −8.6860E−02 |
| A14 = | 1.5530E+00 | −7.2196E−01 | 7.7164E−03 | 3.2593E−02 |
| A16 = | −6.1609E−01 | 3.1970E−01 | −2.0021E−03 | −6.9486E−03 |
| A18 = | 1.3054E−01 | −7.8486E−02 | 2.5034E−04 | 7.9478E−04 |
| A20 = | −1.1399E−02 | 7.8712E−03 | −1.2478E−05 | −3.7802E−05 |

In the 7th embodiment, the equation of the aspheric surface profiles of the aforementioned lens elements is the same as the equation of the 1st embodiment. Also, the definitions of these parameters shown in the following table are the same as those stated in the above embodiments with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| fd [mm] | 2.34 | TD/CT1 | 3.74 |
| fr [mm] | 2.44 | TD/BL | 2.03 |
| EPD [mm] | 2.21 | TL/ImgH | 2.023 |
| fd/EPD | 1.05 | fd/R4 | 0.61 |
| HFOV [deg.] | 39.1 | fd/R7 | 2.33 |
| Vd1 + Vd2 + Vd3 + Vd4 | 114.2 | |fd/fd1| | 0.35 |
| Vdmax − Vdmin | 36.5 | |fd/fd2| | 0.13 |
| CT1/(T12 + CT2) | 1.04 | |fd/fd3| | 1.18 |
| CT1/CT2 | 1.60 | |fd/fd4| | 0.56 |
| CT1/CT3 | 1.27 | fd/ET1 | 7.04 |
| CT1/CT4 | 2.50 | Yc21 [mm] | 0.59 |
| CT1/ET1 | 2.14 | Yc22 [mm] | 0.75 |
| T12/T23 | 0.60 | 2 × Yc22/EPD | 0.68 |
| EPD/TD | 0.83 | Yc21/Yc22 | 0.79 |

8th Embodiment

Figure 15:
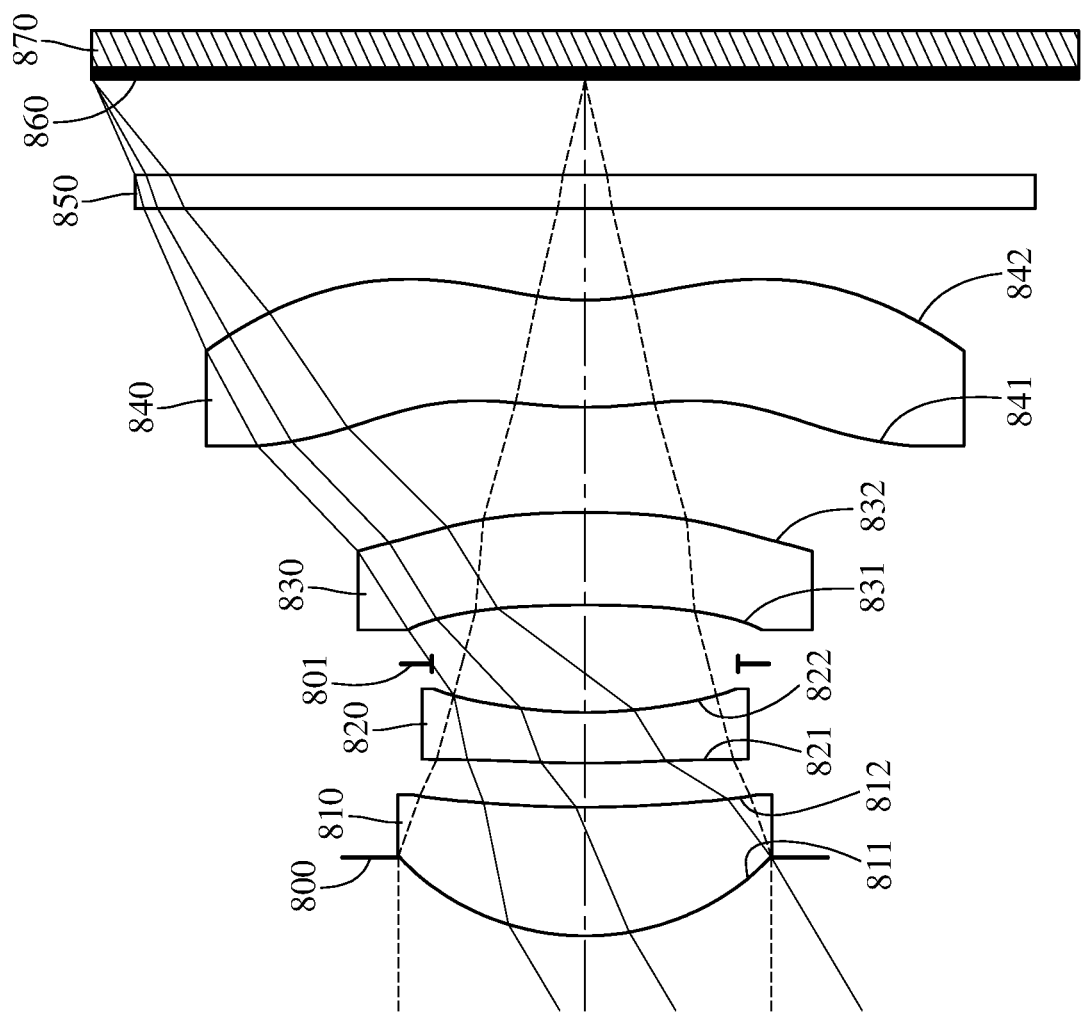
FIG. 15 is a schematic view of an image capturing unit according to the 8th embodiment of the present disclosure.
Figure 16:
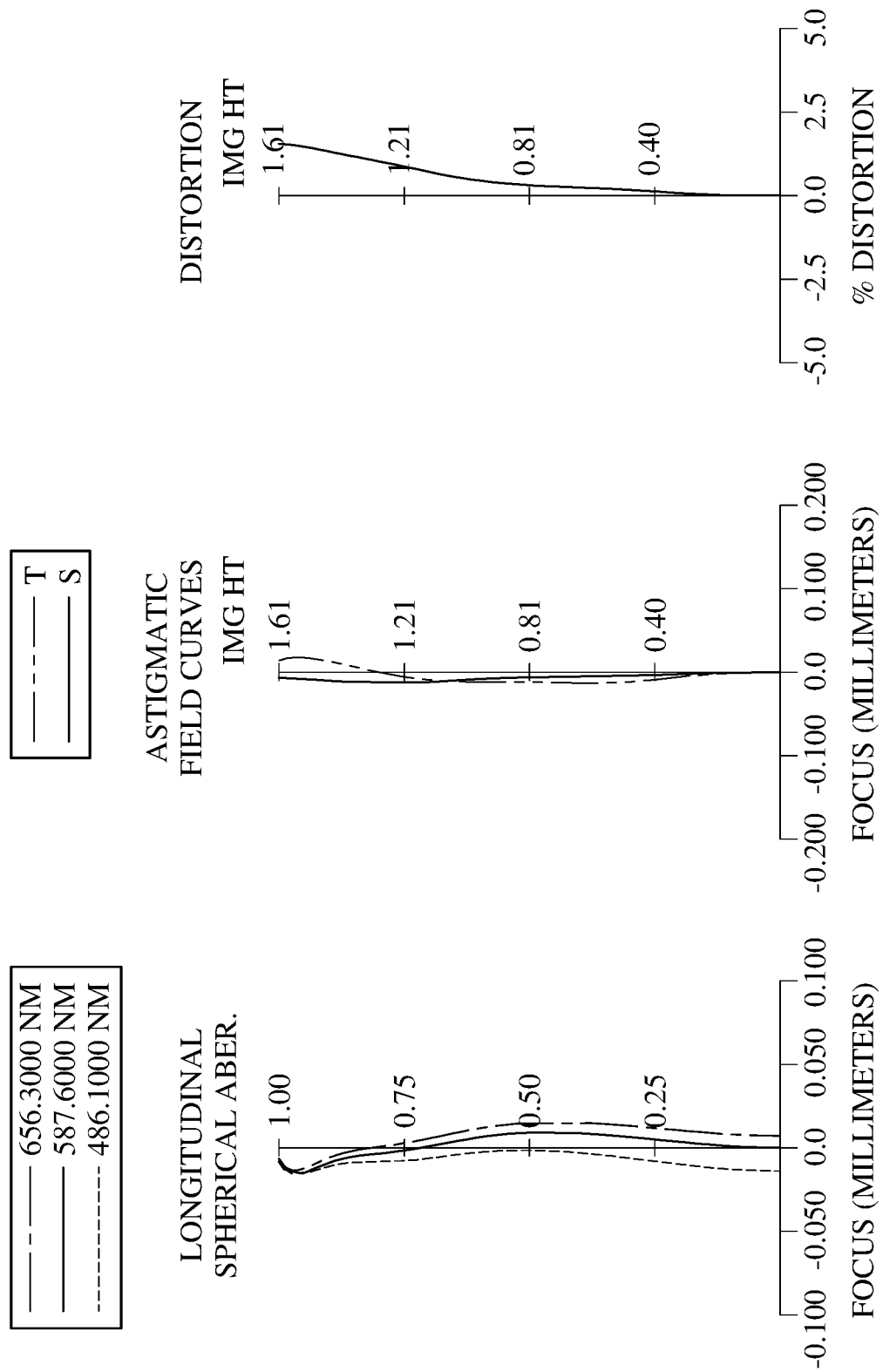
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical lens assembly (its reference numeral is omitted) of the present disclosure and an image sensor 870. The optical lens assembly includes, in order from an object side to an image side along an imaging optical path, an aperture stop 800, a first lens element 810, a second lens element 820, a stop 801, a third lens element 830, a fourth lens element 840, a filter 850 and an image surface 860. The optical lens assembly includes four lens elements (810, 820, 830 and 840) with no additional lens element disposed between each of the adjacent four lens elements.

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with negative refractive power has an object-side surface 821 being convex in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has at least one inflection point in an off-axis region thereof.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric. The image-side surface 832 of the third lens element 830 has at least one inflection point in an off-axis region thereof.

The fourth lens element 840 with negative refractive power has an object-side surface 841 being convex in a paraxial region thereof and an image-side surface 842 being concave in a paraxial region thereof. The fourth lens element 840 is made of plastic material and has the object-side surface 841 and the image-side surface 842 being both aspheric. The object-side surface 841 of the fourth lens element 840 has at least one inflection point in an off-axis region thereof. The image-side surface 842 of the fourth lens element 840 has at least one inflection point in an off-axis region thereof. The object-side surface 841 of the fourth lens element 840 has at least one concave critical point in the off-axis region thereof. The image-side surface 842 of the fourth lens element 840 has at least one convex critical point in the off-axis region thereof.

The filter 850 is made of glass material and located between the fourth lens element 840 and the image surface 860, and will not affect the focal length of the optical lens assembly. The image sensor 870 is disposed on or near the image surface 860 of the optical lens assembly.

The detailed optical data of the 8th embodiment are shown in Table 15 and the aspheric surface data are shown in Table 16 below.

TABLE 15

8th Embodiment
fd = 2.68 mm, EPD = 1.22 mm, HFOV = 30.6 deg.

| Surface # | | Curvature Radius | Thickness | Material | Index (d-line) | Abbe # | Focal Length (d-line) |
|---|---|---|---|---|---|---|---|
| 0 | Object | Plano | Infinity | | | | |
| 1 | Ape. Stop | Plano | −0.256 | | | | |
| 2 | Lens 1 | 0.852 (ASP) | 0.421 | Plastic | 1.544 | 55.9 | 1.97 |
| 3 | | 3.467 (ASP) | 0.144 | | | | |
| 4 | Lens 2 | 3.203 (ASP) | 0.166 | Plastic | 1.669 | 19.4 | −4.36 |
| 5 | | 1.496 (ASP) | 0.159 | | | | |
| 6 | Stop | Plano | 0.192 | | | | |
| 7 | Lens 3 | −5.397 (ASP) | 0.303 | Plastic | 1.669 | 19.4 | 17.68 |
| 8 | | −3.789 (ASP) | 0.344 | | | | |
| 9 | Lens 4 | 1.308 (ASP) | 0.350 | Plastic | 1.592 | 29.4 | −5.95 |
| 10 | | 0.859 (ASP) | 0.300 | | | | |
| 11 | Filter | Plano | 0.110 | Glass | 1.517 | 64.2 | — |
| 12 | | Plano | 0.313 | | | | |
| 13 | Image | Plano | 0.000 | | | | |

Note:
Operating wavelength range is a wavelength range of visible light, and reference wavelength is 587.6 nm (d-line).
An effective radius of the stop 801 (Surface 6) is 0.501 mm.

TABLE 16

Aspheric Coefficients

| Surface # | 2 | 3 | 4 | 5 |
|---|---|---|---|---|
| k= | −9.4288E−01 | 1.2813E+01 | −8.2143E+01 | −6.5369E+00 |
| A4= | 1.7245E−01 | −2.1314E−01 | −5.2676E−01 | −4.8301E−01 |
| A6= | 4.4411E−01 | 3.4514E−02 | 1.6402E+00 | 6.2861E+00 |
| A8= | −2.2665E+00 | 1.2996E+00 | −7.0001E+00 | −5.6951E+01 |
| A10= | 1.2308E+01 | 3.1044E+00 | 4.0904E+01 | 3.6354E+02 |
| A12= | −3.0302E+01 | −3.2444E+01 | −1.2940E+02 | −1.1781E+03 |
| A14= | 3.2641E+01 | 6.1845E+01 | 1.6207E+02 | 1.5328E+03 |

| Surface # | 7 | 8 | 9 | 10 |
|---|---|---|---|---|
| k= | −4.9819E+01 | −6.6259E+00 | −1.0135E+01 | −7.1654E+00 |
| A4= | −7.8174E−01 | −1.1490E+00 | −1.6448E+00 | −9.3988E−01 |
| A6= | 3.3425E+00 | 5.4504E+00 | 3.1184E+00 | 1.8102E+00 |
| A8= | −1.8535E+01 | −1.9975E+01 | −3.9865E+00 | −3.0154E+00 |
| A10= | 8.0868E+01 | 5.4070E+01 | 4.5533E+00 | 3.8655E+00 |
| A12= | −2.5179E+02 | −8.6555E+01 | −4.0407E+00 | −3.4624E+00 |
| A14= | 4.8281E+02 | 7.0847E+01 | 2.2663E+00 | 1.9833E+00 |
| A16= | −4.5762E+02 | −2.3037E+01 | −6.8774E−01 | −6.4325E−01 |
| A18= | — | — | 8.5796E−02 | 8.9132E−02 |

In the 8th embodiment, the equation of the aspheric surface profiles of the aforementioned lens elements is the same as the equation of the 1st embodiment. Also, the definitions of these parameters shown in the following table are the same as those stated in the above embodiments with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| fd [mm] | 2.68 | T12/T23 | 0.41 |
| fr [mm] | 2.68 | EPD/TD | 0.59 |
| EPD [mm] | 1.22 | TD/CT1 | 4.94 |
| fd/EPD | 2.20 | TD/BL | 2.88 |
| HFOV [deg.] | 30.6 | TL/ImgH | 1.740 |
| Vd1 + Vd2 + Vd3 + Vd4 | 124.2 | fd/R4 | 1.79 |
| Vdmax − Vdmin | 36.5 | fd/R7 | 2.05 |

| 8th Embodiment | | | |
|---|---|---|---|
| CT1/(T12 + CT2) | 1.36 | |fd/fd1| | 1.36 |
| CT1/CT2 | 2.54 | |fd/fd2| | 0.61 |
| CT1/CT3 | 1.39 | |fd/fd3| | 0.15 |
| CT1/CT4 | 1.20 | |fd/fd4| | 0.45 |
| CT1/ET1 | 2.13 | fd/ET1 | 13.59 |

9th Embodiment

Figure 17:
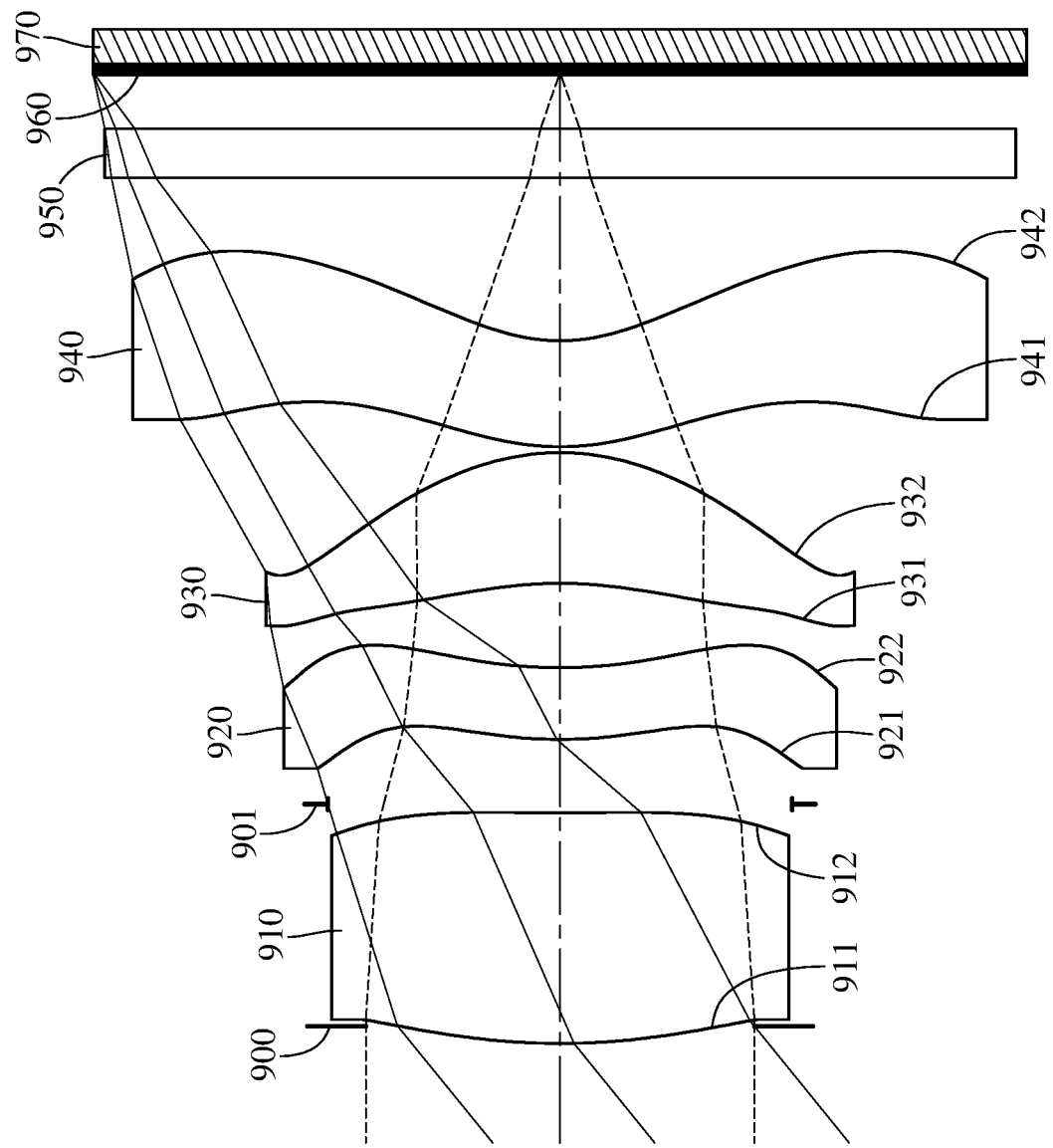
FIG. 17 is a schematic view of an image capturing unit according to the 9th embodiment of the present disclosure.
Figure 18:
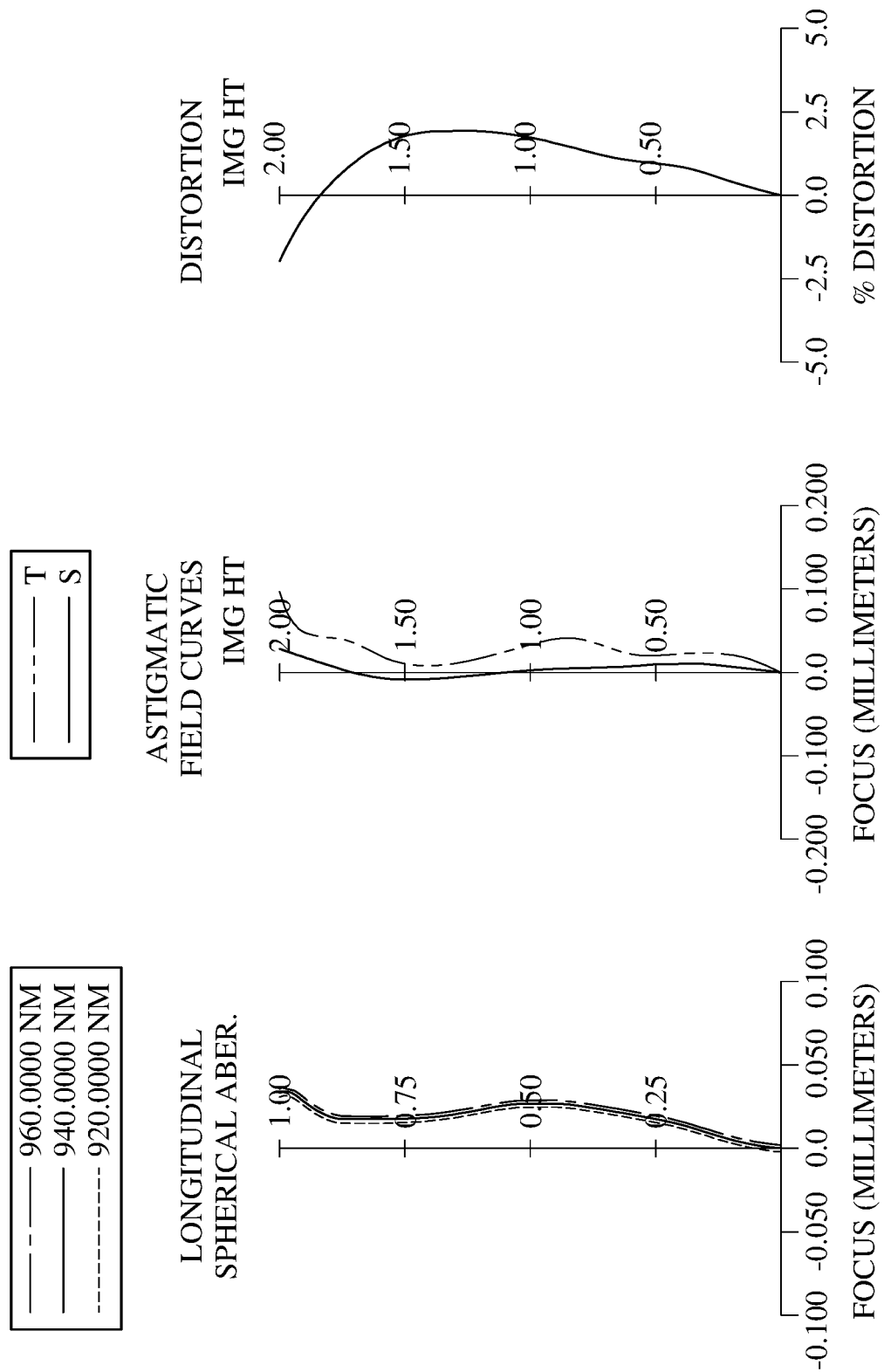
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical lens assembly (its reference numeral is omitted) of the present disclosure and an image sensor 970. The optical lens assembly includes, in order from an object side to an image side along an imaging optical path, an aperture stop 900, a first lens element 910, a stop 901, a second lens element 920, a third lens element 930, a fourth lens element 940, a filter 950 and an image surface 960. The optical lens assembly includes four lens elements (910, 920, 930 and 940) with no additional lens element disposed between each of the adjacent four lens elements.

The first lens element 910 with positive refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric. The object-side surface 911 of the first lens element 910 has at least one inflection point in an off-axis region thereof. The image-side surface 912 of the first lens element 910 has at least one inflection point and at least one critical point in an off-axis region thereof.

The second lens element 920 with positive refractive power has an object-side surface 921 being convex in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one inflection point in an off-axis region thereof. The image-side surface 922 of the second lens element 920 has at least one inflection point in an off-axis region thereof. The object-side surface 921 of the second lens element 920 has at least one critical point in the off-axis region thereof. The image-side surface 922 of the second lens element 920 has at least one critical point in the off-axis region thereof.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric. The object-side surface 931 of the third lens element 930 has at least one inflection point in an off-axis region thereof. The image-side surface 932 of the third lens element 930 has at least one inflection point in an off-axis region thereof. The object-side surface 931 of the third lens element 930 has at least one critical point in the off-axis region thereof. The image-side surface 932 of the third lens element 930 has at least one critical point in the off-axis region thereof.

The fourth lens element 940 with negative refractive power has an object-side surface 941 being convex in a paraxial region thereof and an image-side surface 942 being concave in a paraxial region thereof. The fourth lens element 940 is made of plastic material and has the object-side surface 941 and the image-side surface 942 being both aspheric. The object-side surface 941 of the fourth lens element 940 has at least one inflection point in an off-axis region thereof. The image-side surface 942 of the fourth lens element 940 has at least one inflection point in an off-axis region thereof. The object-side surface 941 of the fourth lens element 940 has at least one concave critical point in the off-axis region thereof. The image-side surface 942 of the fourth lens element 940 has at least one convex critical point in the off-axis region thereof.

The filter 950 is made of glass material and located between the fourth lens element 940 and the image surface 960, and will not affect the focal length of the optical lens assembly. The image sensor 970 is disposed on or near the image surface 960 of the optical lens assembly.

The detailed optical data of the 9th embodiment are shown in Table 17 and the aspheric surface data are shown in Table 18 below.

TABLE 17

9th Embodiment
fd = 2.41 mm, EPD = 1.67 mm, HFOV = 39.1 deg.

| Surface # | | Curvature Radius | Thickness | Material | Index | | Abbe # | Focal Length | |
| --- | --- | --- | --- | --- | --- | --- | --- | --- | --- |
| | | | | | d-line | 940 nm | | d-line | 940 nm |
| 0 | Object | Plano | Infinity | | | | | | |
| 1 | Ape. Stop | Plano | −0.074 | | | | | | |
| 2 | Lens 1 | 2.877 (ASP) | 0.990 | Plastic | 1.639 | 1.617 | 23.5 | 5.32 | 5.51 |
| 3 | | 16.263 (ASP) | 0.037 | | | | | | |
| 4 | Stop | Plano | 0.278 | | | | | | |
| 5 | Lens 2 | 1.882 (ASP) | 0.308 | Plastic | 1.639 | 1.617 | 23.5 | 16.01 | 16.67 |
| 6 | | 2.159 (ASP) | 0.362 | | | | | | |
| 7 | Lens 3 | −1.693 (ASP) | 0.561 | Plastic | 1.639 | 1.617 | 23.5 | 3.12 | 3.25 |
| 8 | | −1.034 (ASP) | 0.025 | | | | | | |
| 9 | Lens 4 | 1.102 (ASP) | 0.455 | Plastic | 1.639 | 1.617 | 23.5 | −8.26 | −8.35 |
| 10 | | 0.765 (ASP) | 0.700 | | | | | | |
| 11 | Filter | Plano | 0.210 | Glass | 1.517 | 1.508 | 64.2 | — | — |
| 12 | | Plano | 0.230 | | | | | | |
| 13 | Image | Plano | 0.000 | | | | | | |

Note:
Operating wavelength range is 920–960 nm (infrared light), reference wavelength is 940 nm, and d-line wavelength is 587.6 nm.
An effective radius of the stop 901 (Surface 4) is 0.995 mm.

TABLE 18

Aspheric Coefficients

| Surface # | 2 | 3 | 5 | 6 |
|---|---|---|---|---|
| k= | −9.0000E+01 | 0.0000E+00 | 0.0000E+00 | 0.0000E+00 |
| A4= | 4.0583E−01 | −1.5843E−01 | −2.2043E−01 | 5.4948E−02 |
| A6= | −1.7338E+00 | −1.1178E−02 | −1.2233E−01 | −4.5173E−01 |
| A8= | 5.7624E+00 | 5.5219E−02 | −1.7282E+00 | 4.6281E−02 |
| A10= | −1.3296E+01 | −9.5718E−02 | 8.8233E+00 | 1.2246E+00 |
| A12= | 1.8965E+01 | 2.3511E−01 | −2.5672E+01 | −2.9423E+00 |
| A14= | −1.4894E+01 | −2.9093E−01 | 4.4158E+01 | 3.5126E+00 |
| A16= | 4.8942E+00 | 1.3105E−01 | −4.3036E+01 | −2.3623E+00 |
| A18= | — | — | 2.1989E+01 | 8.4933E−01 |
| A20= | — | — | −4.5766E+00 | −1.2560E−01 |

| Surface # | 7 | 8 | 9 | 10 |
|---|---|---|---|---|
| k= | −9.6517E−01 | −1.0000E+00 | −1.0000E+00 | −1.0000E+00 |
| A4= | 4.0683E−01 | 1.0402E−01 | −3.9442E−01 | −6.5853E−01 |
| A6= | −6.7892E−01 | −4.4571E−01 | 1.6296E−01 | 6.5064E−01 |
| A8= | 8.6181E−01 | 1.8552E+00 | −1.1473E−02 | −5.7940E−01 |
| A10= | −1.7179E−01 | −4.9037E+00 | −2.8894E−02 | 3.9954E−01 |
| A12= | −7.7729E−01 | 7.9281E+00 | 3.9280E−03 | −1.9869E−01 |
| A14= | 5.3285E−01 | −7.6605E+00 | 1.1314E−02 | 6.7168E−02 |
| A16= | 1.5092E−01 | 4.2986E+00 | −6.7672E−03 | −1.4468E−02 |
| A18= | −2.1950E−01 | −1.2811E+00 | 1.5374E−03 | 1.7788E−03 |
| A20= | 5.0276E−02 | 1.5574E−01 | −1.2885E−04 | −9.4549E−05 |

In the 9th embodiment, the equation of the aspheric surface profiles of the aforementioned lens elements is the same as the equation of the 1st embodiment. Also, the definitions of these parameters shown in the following table are the same as those stated in the above embodiments with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| fd [mm] | 2.41 | TD/CT1 | 3.05 |
| fr [mm] | 2.50 | TD/BL | 2.65 |
| EPD [mm] | 1.67 | TL/ImgH | 2.078 |
| fd/EPD | 1.44 | fd/R4 | 1.11 |
| HFOV [deg.] | 39.1 | fd/R7 | 2.18 |
| Vd1 + Vd2 + Vd3 + Vd4 | 94.0 | |fd/fd1| | 0.45 |
| Vdmax − Vdmin | 0.0 | |fd/fd2| | 0.15 |
| CT1/(T12 + CT2) | 1.59 | |fd/fd3| | 0.77 |
| CT1/CT2 | 3.21 | |fd/fd4| | 0.29 |
| CT1/CT3 | 1.76 | fd/ET1 | 3.05 |
| CT1/CT4 | 2.18 | Yc21 [mm] | 0.61 |
| CT1/ET1 | 1.26 | Yc22 [mm] | 0.80 |
| T12/T23 | 0.87 | 2 × Yc22/EPD | 0.96 |
| EPD/TD | 0.55 | Yc21/Yc22 | 0.77 |

10th Embodiment

Figure 19:
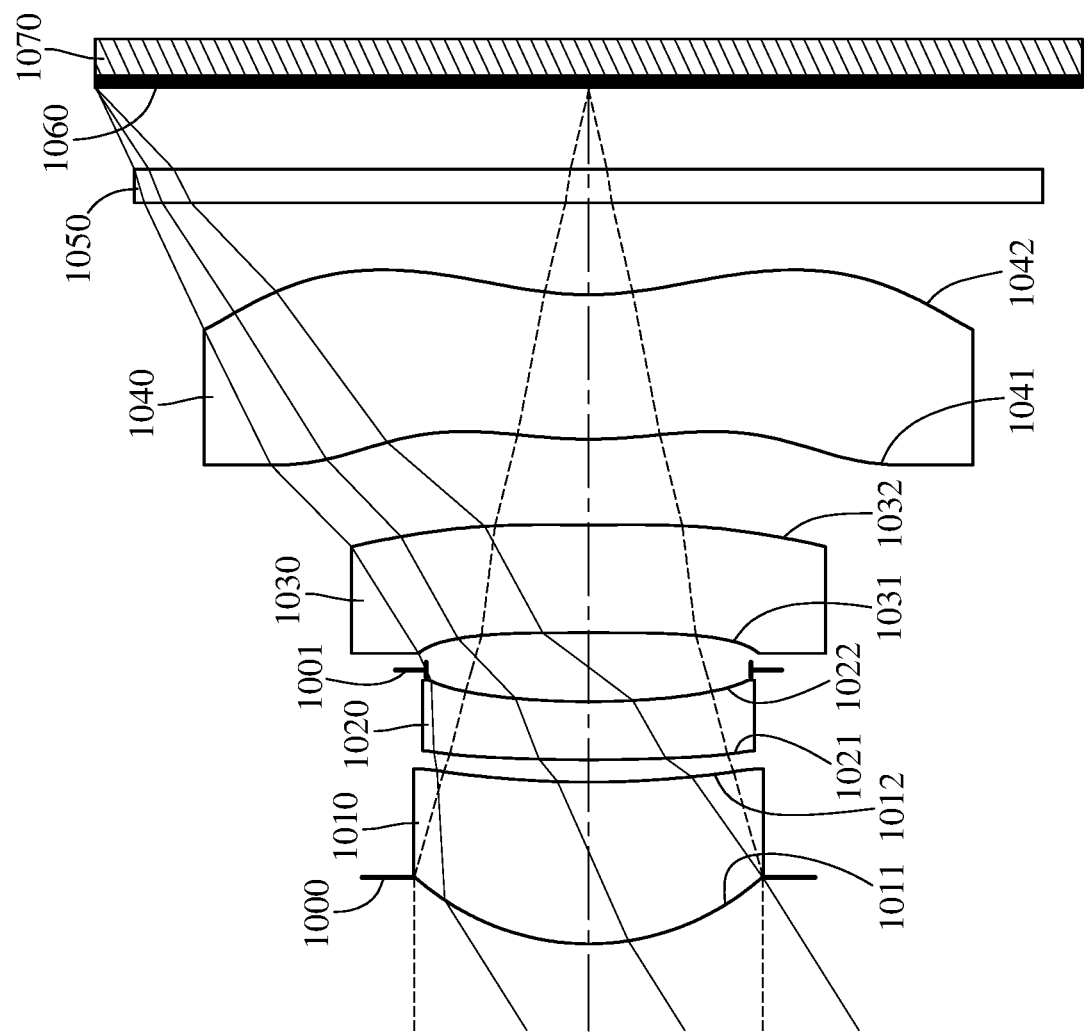
FIG. 19 is a schematic view of an image capturing unit according to the 10th embodiment of the present disclosure.
Figure 20:
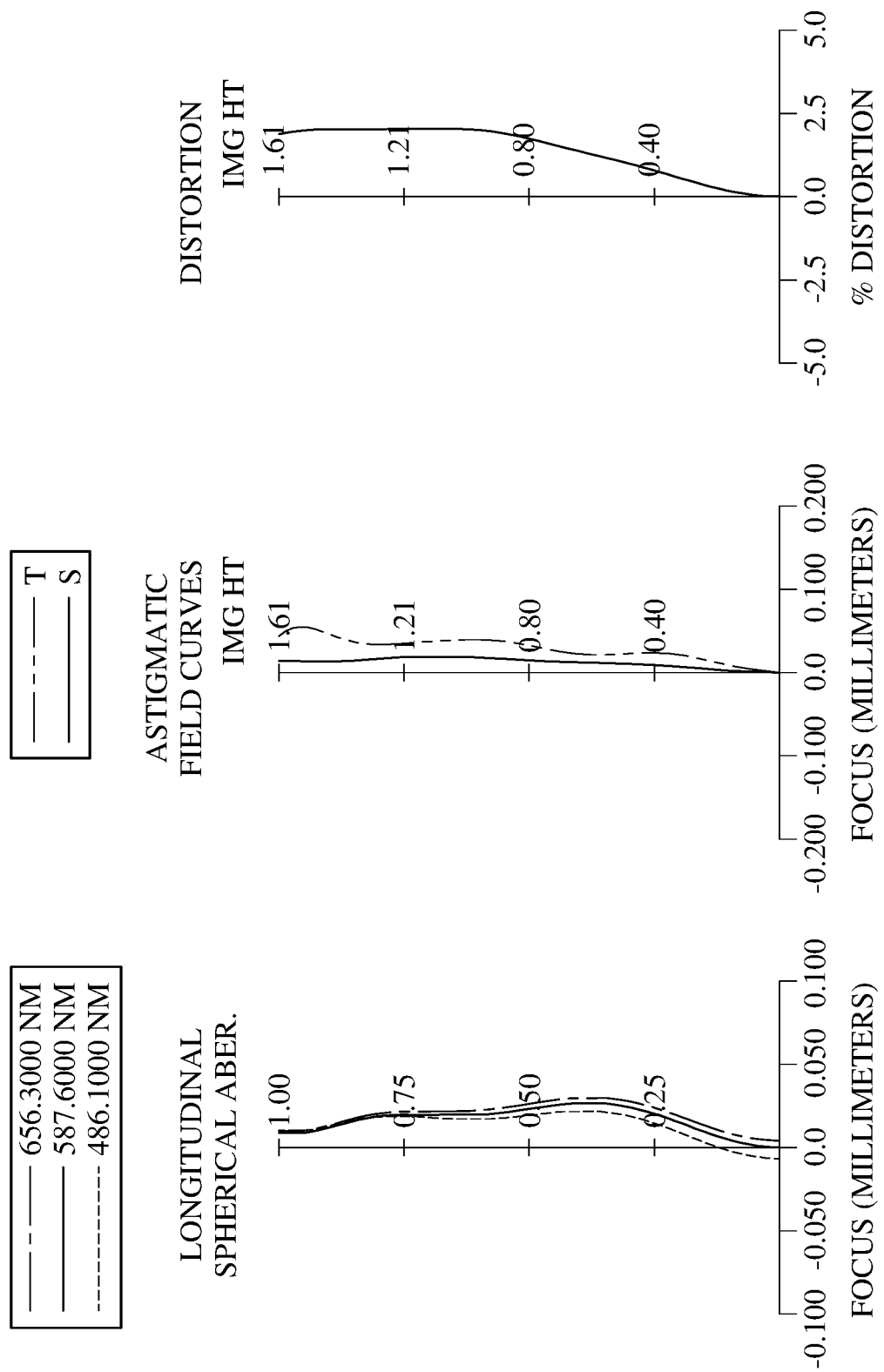
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical lens assembly (its reference numeral is omitted) of the present disclosure and an image sensor 1070. The optical lens assembly includes, in order from an object side to an image side, an aperture stop 1000, a first lens element 1010, a second lens element 1020, a stop 1001, a third lens element 1030, a fourth lens element 1040, a filter 1050 and an image surface 1060. The optical lens assembly includes four lens elements (1010, 1020, 1030 and 1040) with no additional lens element disposed between each of the adjacent four lens elements.

The first lens element 1010 with positive refractive power has an object-side surface 1011 being convex in a paraxial region thereof and an image-side surface 1012 being concave in a paraxial region thereof. The first lens element 1010 is made of plastic material and has the object-side surface 1011 and the image-side surface 1012 being both aspheric. The image-side surface 1012 of the first lens element 1010 has at least one inflection point in an off-axis region thereof.

The second lens element 1020 with negative refractive power has an object-side surface 1021 being convex in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has at least one inflection point in an off-axis region thereof.

The third lens element 1030 with negative refractive power has an object-side surface 1031 being concave in a paraxial region thereof and an image-side surface 1032 being concave in a paraxial region thereof. The third lens element 1030 is made of plastic material and has the object-side surface 1031 and the image-side surface 1032 being both aspheric. The image-side surface 1032 of the third lens element 1030 has at least one inflection point and at least one critical point in an off-axis region thereof.

The fourth lens element 1040 with negative refractive power has an object-side surface 1041 being convex in a paraxial region thereof and an image-side surface 1042 being concave in a paraxial region thereof. The fourth lens element 1040 is made of plastic material and has the object-side surface 1041 and the image-side surface 1042 being both aspheric. The object-side surface 1041 of the fourth lens element 1040 has at least one inflection point in an off-axis region thereof. The image-side surface 1042 of the fourth lens element 1040 has at least one inflection point in an off-axis region thereof. The object-side surface 1041 of the fourth lens element 1040 has at least one convex critical point and at least one concave critical point in the off-axis region thereof. The image-side surface 1042 of the fourth lens element 1040 has at least one convex critical point in the off-axis region thereof.

The filter 1050 is made of glass material and located between the fourth lens element 1040 and the image surface 1060, and will not affect the focal length of the optical lens assembly. The image sensor 1070 is disposed on or near the image surface 1060 of the optical lens assembly.

The detailed optical data of the 10th embodiment are shown in Table 19 and the aspheric surface data are shown in Table 20 below.

TABLE 19

10th Embodiment
fd = 2.50 mm, EPD = 1.14 mm, HFOV = 32.1 deg.

| Surface # | | Curvature Radius | Thickness | Material | Index (d-line) | Abbe # | Focal Length (d-line) |
|---|---|---|---|---|---|---|---|
| 0 | Object | Plano | Infinity | | | | |
| 1 | Ape. Stop | Plano | −0.217 | | | | |
| 2 | Lens 1 | 0.834 (ASP) | 0.528 | Plastic | 1.515 | 56.6 | 2.06 |
| 3 | | 3.044 (ASP) | 0.073 | | | | |
| 4 | Lens 2 | 5.533 (ASP) | 0.190 | Plastic | 1.705 | 14.0 | −7.66 |
| 5 | | 2.695 (ASP) | 0.103 | | | | |
| 6 | Stop | Plano | 0.122 | | | | |
| 7 | Lens 3 | −64.663 (ASP) | 0.352 | Plastic | 1.698 | 16.3 | −16.74 |
| 8 | | 14.290 (ASP) | 0.280 | | | | |
| 9 | Lens 4 | 1.410 (ASP) | 0.472 | Plastic | 1.559 | 40.4 | −14.29 |
| 10 | | 1.055 (ASP) | 0.300 | | | | |
| 11 | Filter | Plano | 0.110 | Glass | 1.517 | 64.2 | — |
| 12 | | Plano | 0.266 | | | | |
| 13 | Image | Plano | 0.000 | | | | |

Note:
Operating wavelength range is a wavelength range of visible light, and reference wavelength is 587.6 nm (d-line).
An effective radius of the stop 1001 (Surface 6) is 0.530 mm.

TABLE 20

Aspheric Coefficients

| Surface # | 2 | 3 | 4 | 5 |
|---|---|---|---|---|
| k= | −9.7323E−01 | 2.3658E+01 | 6.5424E+01 | 9.1170E+00 |
| A4= | 1.0672E−01 | −3.0258E−01 | −3.4332E−01 | −1.3472E−01 |
| A6= | 1.3641E+00 | 2.1364E+00 | 3.4012E+00 | 9.9311E−01 |
| A8= | −8.6971E+00 | −2.1697E+01 | −2.4619E+01 | 4.0601E+00 |
| A10= | 3.0697E+01 | 9.7932E+01 | 1.0303E+02 | −4.2578E+01 |
| A12= | −4.7696E+01 | −1.5268E+02 | −1.4802E+02 | 1.6582E+02 |
| A14= | 2.3746E+01 | −2.9026E+01 | −3.3107E+01 | −1.9638E+02 |

| Surface # | 7 | 8 | 9 | 10 |
|---|---|---|---|---|
| k= | −9.0000E+01 | −7.9074E+01 | −7.2111E+00 | −2.8691E+00 |
| A4= | −6.8277E−01 | −9.7471E−01 | −1.3787E+00 | −9.4160E−01 |
| A6= | 3.3801E+00 | 4.0196E+00 | 3.2470E+00 | 1.7795E+00 |
| A8= | −3.6384E+01 | −1.3257E+01 | −7.9143E+00 | −2.7886E+00 |
| A10= | 2.7893E+02 | 2.9285E+01 | 1.4694E+01 | 2.9366E+00 |
| A12= | −1.3982E+03 | −3.6853E+01 | −1.6222E+01 | −1.9434E+00 |
| A14= | 3.7798E+03 | 2.2691E+01 | 1.0158E+01 | 7.5315E−01 |
| A16= | −4.2606E+03 | −4.9970E+00 | −3.3564E+00 | −1.4683E−01 |
| A18= | — | — | 4.5468E−01 | 9.5841E−03 |

In the 10th embodiment, the equation of the aspheric surface profiles of the aforementioned lens elements is the same as the equation of the 1st embodiment. Also, the definitions of these parameters shown in the following table are the same as those stated in the above embodiments with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| fd [mm] | 2.50 | T12/T23 | 0.32 |
| fr [mm] | 2.50 | EPD/TD | 0.54 |
| EPD [mm] | 1.14 | TD/CT1 | 4.02 |
| fd/EPD | 2.20 | TD/BL | 3.14 |
| HFOV [deg.] | 32.1 | TL/ImgH | 1.737 |
| Vd1 + Vd2 + Vd3 + Vd4 | 127.3 | fd/R4 | 0.93 |
| Vdmax − Vdmin | 42.5 | fd/R7 | 1.77 |
| CT1/(T12 + CT2) | 2.01 | |fd/fd1| | 1.21 |
| CT1/CT2 | 2.78 | |fd/fd2| | 0.33 |
| CT1/CT3 | 1.50 | |fd/fd3| | 0.15 |
| CT1/CT4 | 1.12 | |fd/fd4| | 0.18 |
| CT1/ET1 | 1.51 | fd/ET1 | 7.15 |

11th Embodiment

Figure 21:
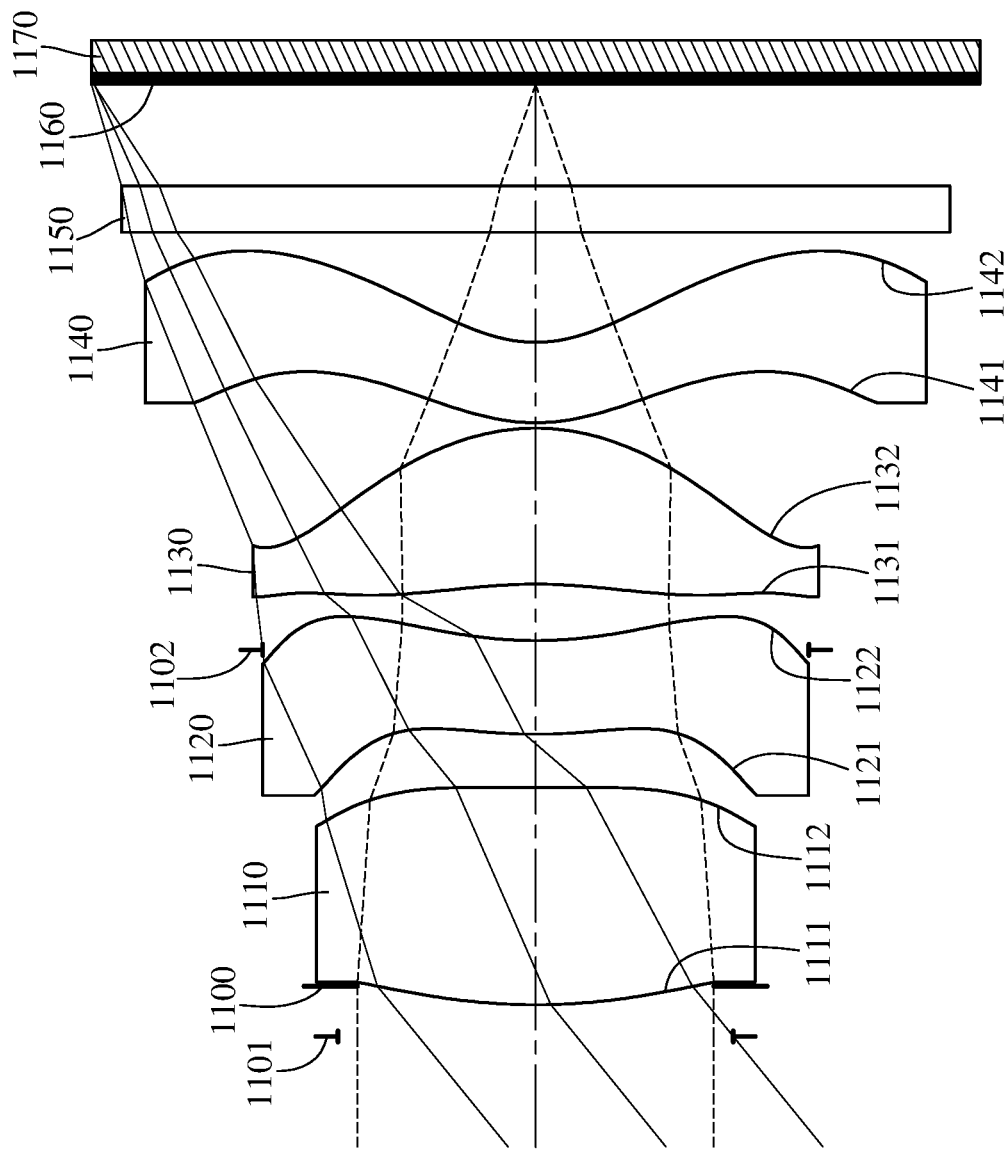
FIG. 21 is a schematic view of an image capturing unit according to the 11th embodiment of the present disclosure.
Figure 22:
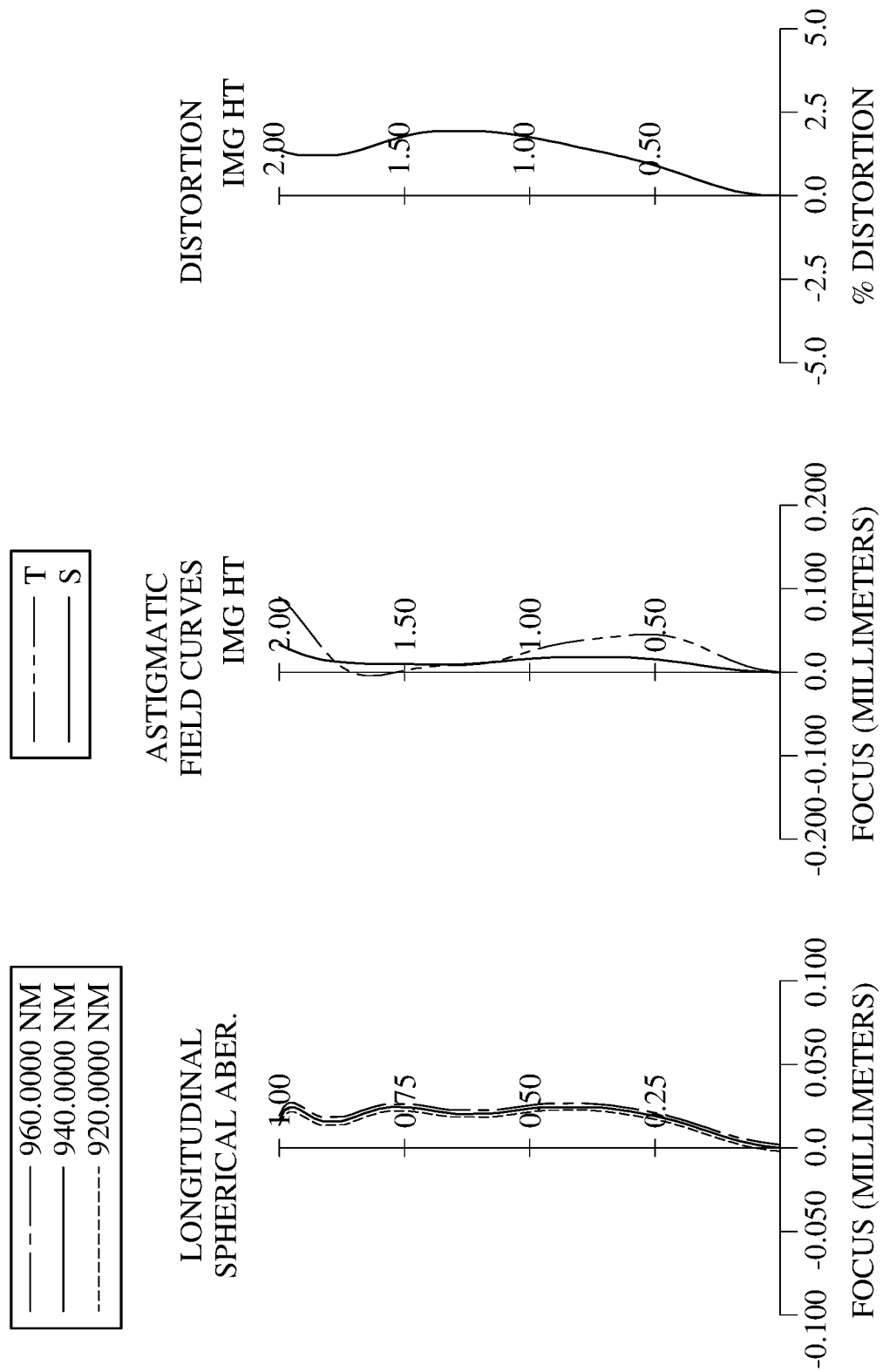
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical lens assembly (its reference numeral is omitted) of the present disclosure and an image sensor 1170. The optical lens assembly includes, in order from an object side to an image side along an imaging optical path, a stop 1101, an aperture stop 1100, a first lens element 1110, a second lens element 1120, a stop 1102, a third lens element 1130, a fourth lens element 1140, a filter 1150 and an image surface 1160. The optical lens assembly includes four lens elements (1110, 1120, 1130 and 1140) with no additional lens element disposed between each of the adjacent four lens elements.

The first lens element 1110 with positive refractive power has an object-side surface 1111 being convex in a paraxial region thereof and an image-side surface 1112 being concave in a paraxial region thereof. The first lens element 1110 is made of plastic material and has the object-side surface 1111 and the image-side surface 1112 being both aspheric. The object-side surface 1111 of the first lens element 1110 has at least one inflection point in an off-axis region thereof. The image-side surface 1112 of the first lens element 1110 has at least one inflection point and at least one critical point in an off-axis region thereof.

The second lens element 1120 with negative refractive power has an object-side surface 1121 being convex in a paraxial region thereof and an image-side surface 1122 being concave in a paraxial region thereof. The second lens element 1120 is made of plastic material and has the object-side surface 1121 and the image-side surface 1122 being both aspheric. The object-side surface 1121 of the second lens element 1120 has at least one inflection point in an off-axis region thereof. The image-side surface 1122 of the second lens element 1120 has at least one inflection point in an off-axis region thereof. The object-side surface 1121 of the second lens element 1120 has at least one critical point in the off-axis region thereof. The image-side surface 1122 of the second lens element 1120 has at least one critical point in the off-axis region thereof.

The third lens element 1130 with positive refractive power has an object-side surface 1131 being concave in a paraxial region thereof and an image-side surface 1132 being convex in a paraxial region thereof. The third lens element 1130 is made of plastic material and has the object-side surface 1131 and the image-side surface 1132 being both aspheric. The object-side surface 1131 of the third lens element 1130 has at least one inflection point in an off-axis region thereof. The image-side surface 1132 of the third lens element 1130 has at least one inflection point in an off-axis region thereof. The object-side surface 1131 of the third lens element 1130 has at least one critical point in the off-axis region thereof. The image-side surface 1132 of the third lens element 1130 has at least one critical point in the off-axis region thereof.

The fourth lens element 1140 with negative refractive power has an object-side surface 1141 being convex in a paraxial region thereof and an image-side surface 1142 being concave in a paraxial region thereof. The fourth lens element 1140 is made of plastic material and has the object-side surface 1141 and the image-side surface 1142 being both aspheric. The object-side surface 1141 of the fourth lens element 1140 has at least one inflection point in an off-axis region thereof. The image-side surface 1142 of the fourth lens element 1140 has at least one inflection point in an off-axis region thereof. The object-side surface 1141 of the fourth lens element 1140 has at least one concave critical point in the off-axis region thereof. The image-side surface 1142 of the fourth lens element 1140 has at least one convex critical point in the off-axis region thereof.

The filter 1150 is made of glass material and located between the fourth lens element 1140 and the image surface 1160, and will not affect the focal length of the optical lens assembly. The image sensor 1170 is disposed on or near the image surface 1160 of the optical lens assembly.

The detailed optical data of the 11th embodiment are shown in Table 21 and the aspheric surface data are shown in Table 22 below.

TABLE 21

11th Embodiment
fd = 2.42 mm, EPD = 1.61 mm, HFOV = 39.1 deg.

| Surface # | | Curvature Radius | Thickness | Material | Index d-line | Index 940 nm | Abbe # | Focal Length d-line | Focal Length 940 nm |
|---|---|---|---|---|---|---|---|---|---|
| 0 | Object | Plano | Infinity | | | | | | |
| 1 | Stop | Plano | 0.228 | | | | | | |
| 2 | Ape. Stop | Plano | −0.084 | | | | | | |
| 3 | Lens 1 | 2.753 (ASP) | 0.985 | Plastic | 1.639 | 1.617 | 23.5 | 5.01 | 5.19 |
| 4 | | 16.970 (ASP) | 0.242 | | | | | | |
| 5 | Lens 2 | 2.279 (ASP) | 0.425 | Plastic | 1.639 | 1.617 | 23.5 | −80.94 | −80.64 |
| 6 | | 2.024 (ASP) | −0.042 | | | | | | |
| 7 | Stop | Plano | 0.298 | | | | | | |
| 8 | Lens 3 | −2.208 (ASP) | 0.707 | Plastic | 1.639 | 1.617 | 23.5 | 2.33 | 2.42 |
| 9 | | −1.000 (ASP) | 0.025 | | | | | | |
| 10 | Lens 4 | 0.885 (ASP) | 0.364 | Plastic | 1.639 | 1.617 | 23.5 | −6.52 | −6.60 |
| 11 | | 0.613 (ASP) | 0.500 | | | | | | |
| 12 | Filter | Plano | 0.210 | Glass | 1.517 | 1.508 | 64.2 | — | — |
| 13 | | Plano | 0.461 | | | | | | |
| 14 | Image | Plano | 0.000 | | | | | | |

Note:
Operating wavelength range is 920–960 nm (infrared light), reference wavelength is 940 nm, and d-line wavelength is 587.6 nm.
An effective radius of the stop 1101 (Surface 1) is 0.895 mm.
An effective radius of the stop 1102 (Surface 7) is 1.237 mm.

TABLE 22

Aspheric Coefficients

| Surface # | 3 | 4 | 5 | 6 |
|---|---|---|---|---|
| k= | −9.0000E+01 | 0.0000E+00 | 0.0000E+00 | 0.0000E+00 |
| A4= | 4.8382E−01 | −2.4217E−01 | −4.6794E−01 | 8.5934E−03 |
| A6= | −2.3425E+00 | −8.7664E−02 | 4.9288E−01 | −6.0770E−01 |
| A8= | 9.0716E+00 | 7.4431E−01 | −5.0324E+00 | 1.3577E+00 |
| A10= | −2.4117E+01 | −2.3052E+00 | 2.0331E+01 | −2.5393E+00 |
| A12= | 3.9143E+01 | 3.7989E+00 | −5.3942E+01 | 3.6152E+00 |
| A14= | −3.4622E+01 | −3.1783E+00 | 9.3336E+01 | −3.4311E+00 |
| A16= | 1.2693E+01 | 1.0627E+00 | −9.6947E+01 | 1.9126E+00 |
| A18= | — | — | 5.4136E+01 | −5.5664E−01 |
| A20= | — | — | −1.2413E+01 | 6.5208E−02 |

| Surface # | 8 | 9 | 10 | 11 |
|---|---|---|---|---|
| k= | −1.3375E+00 | −1.0000E+00 | −1.1446E+00 | −1.0000E+00 |
| A4= | 4.5704E−01 | 2.1805E−02 | −4.8268E−01 | −9.3113E−01 |
| A6= | −1.0633E+00 | 1.8551E−01 | 1.7206E−01 | 9.6307E−01 |
| A8= | 2.6577E+00 | −1.0533E+00 | 9.8051E−02 | −8.3737E−01 |
| A10= | −4.2629E+00 | 2.9234E+00 | −1.3740E−01 | 5.5233E−01 |
| A12= | 3.9566E+00 | −4.7022E+00 | 1.5263E−02 | −2.6805E−01 |
| A14= | −1.8929E+00 | 4.6598E+00 | 4.8949E−02 | 9.1253E−02 |
| A16= | 2.1065E−01 | −2.7433E+00 | −3.1245E−02 | −2.0289E−02 |
| A18= | 1.6799E−01 | 8.7299E−01 | 7.7768E−03 | 2.6143E−03 |
| A20= | −4.9083E−02 | −1.1521E−01 | −7.2120E−04 | −1.4688E−04 |

In the 11th embodiment, the equation of the aspheric surface profiles of the aforementioned lens elements is the same as the equation of the 1st embodiment. Also, the definitions of these parameters shown in the following table are the same as those stated in the above embodiments with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| fd [mm] | 2.33 | TD/CT1 | 3.05 |
| fr [mm] | 2.42 | TD/BL | 2.56 |
| EPD [mm] | 1.61 | TL/ImgH | 2.088 |
| fd/EPD | 1.44 | fd/R4 | 1.15 |
| HFOV [deg.] | 39.1 | fd/R7 | 2.63 |
| Vd1 + Vd2 + Vd3 + Vd4 | 94.0 | |fd/fd1| | 0.46 |
| Vdmax − Vdmin | 0.0 | |fd/fd2| | 0.03 |
| CT1/(T12 + CT2) | 1.48 | |fd/fd3| | 1.00 |
| CT1/CT2 | 2.32 | |fd/fd4| | 0.36 |
| CT1/CT3 | 1.39 | fd/ET1 | 3.27 |
| CT1/CT4 | 2.71 | Yc21 [mm] | 0.47 |
| CT1/ET1 | 1.39 | Yc22 [mm] | 0.86 |
| T12/T23 | 0.95 | 2 × Yc22/EPD | 1.07 |
| EPD/TD | 0.54 | Yc21/Yc22 | 0.55 |

12th Embodiment

Figure 23:
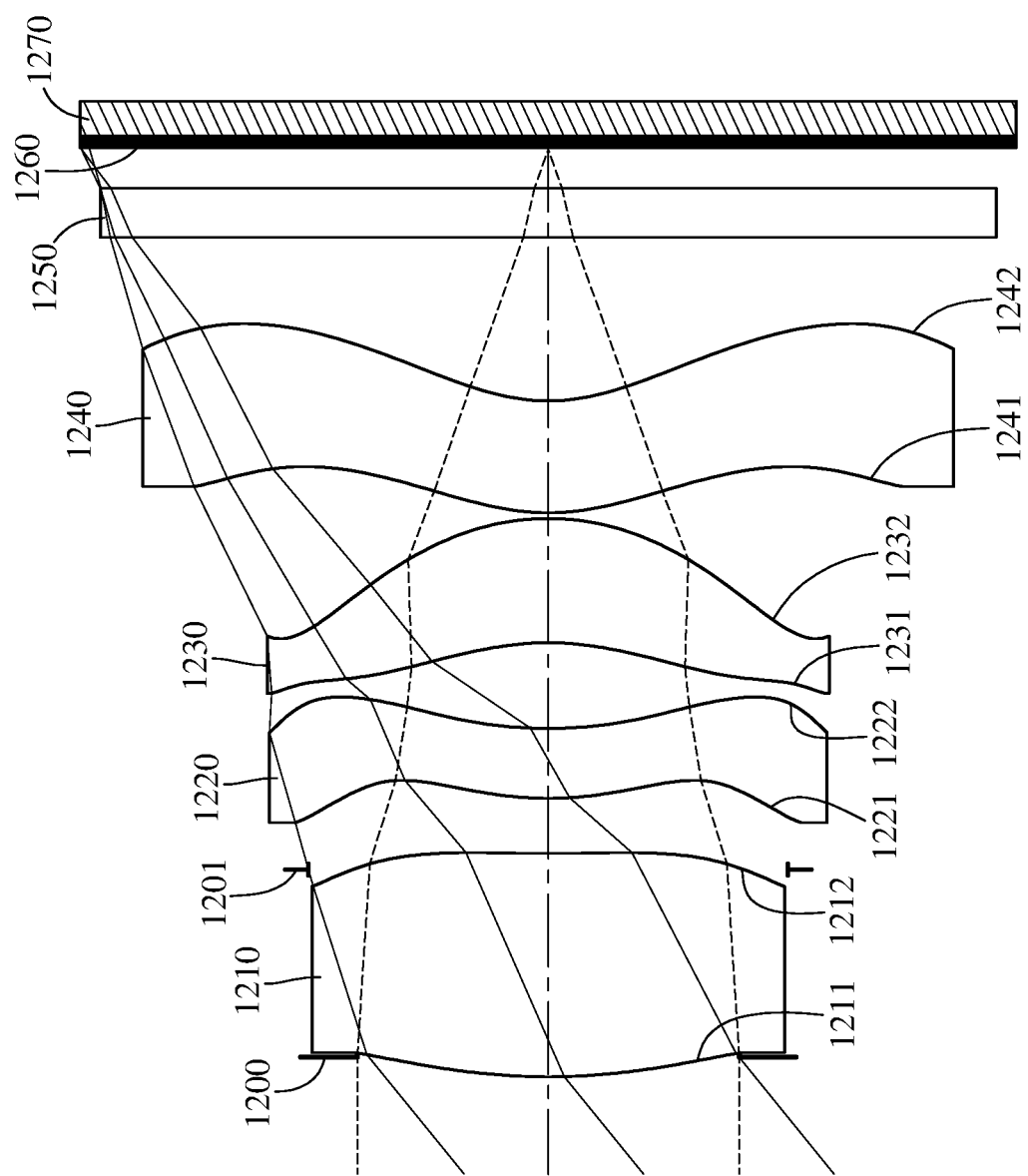
FIG. 23 is a schematic view of an image capturing unit according to the 12th embodiment of the present disclosure.
Figure 24:
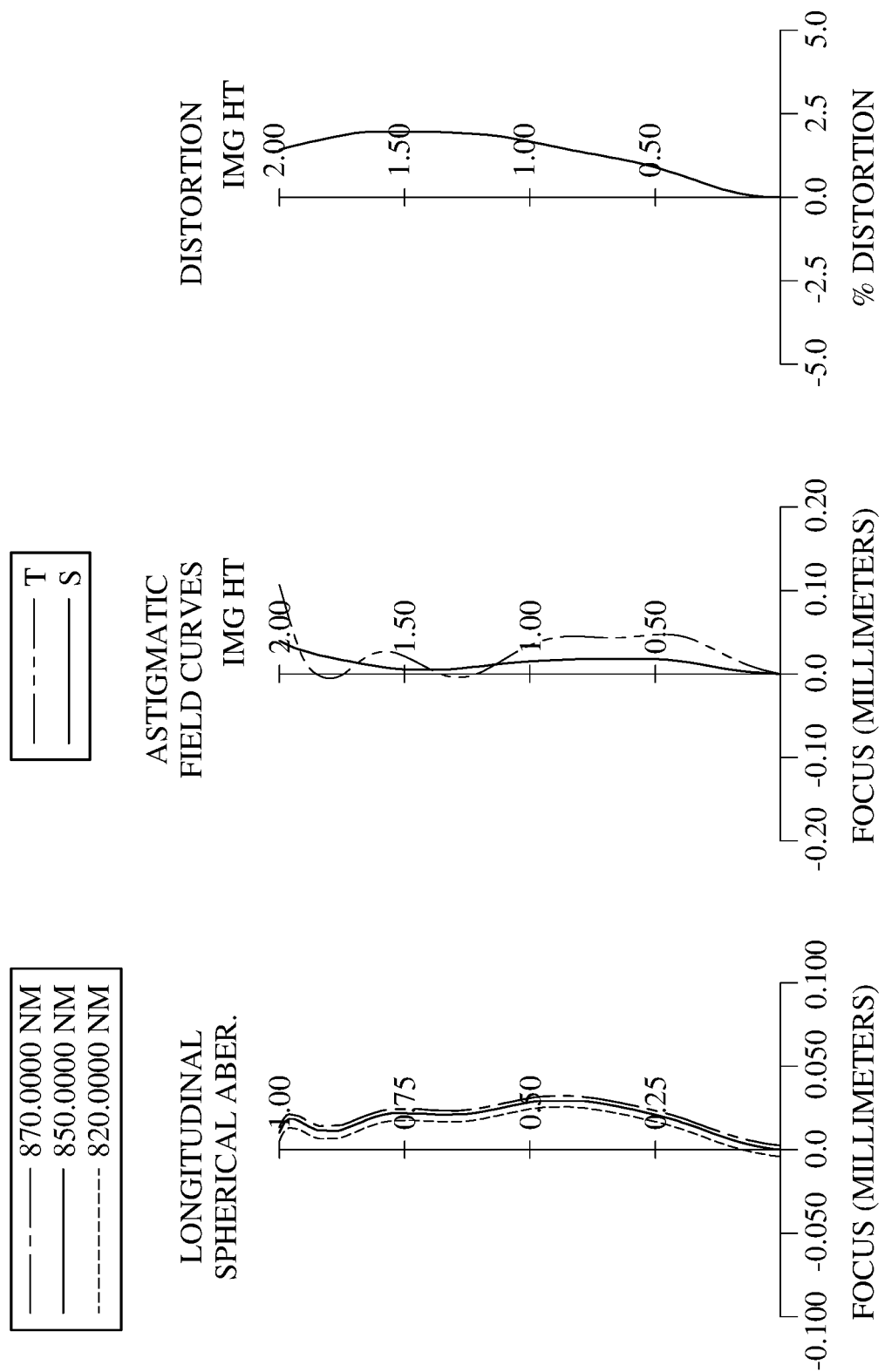
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the optical lens assembly (its reference numeral is omitted) of the present disclosure and an image sensor 1270. The optical lens assembly includes, in order from an object side to an image side along an imaging optical path, an aperture stop 1200, a first lens element 1210, a stop 1201, a second lens element 1220, a third lens element 1230, a fourth lens element 1240, a filter 1250 and an image surface 1260. The optical lens assembly includes four lens elements (1210, 1220, 1230 and 1240) with no additional lens element disposed between each of the adjacent four lens elements.

The first lens element 1210 with positive refractive power has an object-side surface 1211 being convex in a paraxial region thereof and an image-side surface 1212 being concave in a paraxial region thereof. The first lens element 1210 is made of plastic material and has the object-side surface 1211 and the image-side surface 1212 being both aspheric. The object-side surface 1211 of the first lens element 1210 has at least one inflection point in an off-axis region thereof. The image-side surface 1212 of the first lens element 1210 has at least one inflection point and at least one critical point in an off-axis region thereof.

The second lens element 1220 with positive refractive power has an object-side surface 1221 being convex in a paraxial region thereof and an image-side surface 1222 being concave in a paraxial region thereof. The second lens element 1220 is made of plastic material and has the object-side surface 1221 and the image-side surface 1222 being both aspheric. The object-side surface 1221 of the second lens element 1220 has at least one inflection point in an off-axis region thereof. The image-side surface 1222 of the second lens element 1220 has at least one inflection point in an off-axis region thereof. The object-side surface 1221 of the second lens element 1220 has at least one critical point in the off-axis region thereof. The image-side surface 1222 of the second lens element 1220 has at least one critical point in the off-axis region thereof.

The third lens element 1230 with positive refractive power has an object-side surface 1231 being concave in a paraxial region thereof and an image-side surface 1232 being convex in a paraxial region thereof. The third lens element 1230 is made of plastic material and has the object-side surface 1231 and the image-side surface 1232 being both aspheric. The object-side surface 1231 of the third lens element 1230 has at least one inflection point in an off-axis region thereof. The image-side surface 1232 of the third lens element 1230 has at least one inflection point and at least one critical point in an off-axis region thereof.

The fourth lens element 1240 with positive refractive power has an object-side surface 1241 being convex in a paraxial region thereof and an image-side surface 1242 being concave in a paraxial region thereof. The fourth lens element 1240 is made of plastic material and has the object-side surface 1241 and the image-side surface 1242 being both aspheric. The object-side surface 1241 of the fourth lens element 1240 has at least one inflection point in an off-axis region thereof. The image-side surface 1242 of the fourth lens element 1240 has at least one inflection point in an off-axis region thereof. The object-side surface 1241 of the fourth lens element 1240 has at least one concave critical point in the off-axis region thereof. The image-side surface 1242 of the fourth lens element 1240 has at least one convex critical point in the off-axis region thereof.

The filter 1250 is made of glass material and located between the fourth lens element 1240 and the image surface 1260, and will not affect the focal length of the optical lens assembly. The image sensor 1270 is disposed on or near the image surface 1260 of the optical lens assembly.

The detailed optical data of the 12th embodiment are shown in Table 23 and the aspheric surface data are shown in Table 24 below.

TABLE 23

12th Embodiment
fd = 2.34 mm, EPD = 1.63 mm, HFOV = 39.1 deg.

| | | | | | Index | | | Focal Length | |
|---|---|---|---|---|---|---|---|---|---|
| Surface # | | Curvature Radius | Thickness | Material | d–line | 940 nm | Abbe # | d-line | 940 nm |
| 0 | Object | Plano | Infinity | | | | | | |
| 1 | Ape. Stop | Plano | −0.084 | | | | | | |
| 2 | Lens 1 | 2.694 (ASP) | 0.956 | Plastic | 1.639 | 1.620 | 23.5 | 5.70 | 5.88 |
| 3 | | 8.930 (ASP) | −0.069 | | | | | | |
| 4 | Stop | Plano | 0.305 | | | | | | |
| 5 | Lens 2 | 1.483 (ASP) | 0.299 | Plastic | 1.639 | 1.620 | 23.5 | 7.55 | 7.80 |
| 6 | | 1.974 (ASP) | 0.367 | | | | | | |
| 7 | Lens 3 | −1.205 (ASP) | 0.531 | Plastic | 1.639 | 1.620 | 23.5 | 5.99 | 6.23 |
| 8 | | −1.074 (ASP) | 0.025 | | | | | | |

TABLE 23-continued

12th Embodiment
fd = 2.34 mm, EPD = 1.63 mm, HFOV = 39.1 deg.

| Surface # | | Curvature Radius | Thickness | Material | Index d-line | Index 940 nm | Abbe # | Focal Length d-line | Focal Length 940 nm |
|---|---|---|---|---|---|---|---|---|---|
| 9 | Lens 4 | 0.981 (ASP) | 0.479 | Plastic | 1.639 | 1.620 | 23.5 | 64.88 | 80.62 |
| 10 | | 0.814 (ASP) | 0.700 | | | | | | |
| 11 | Filter | Plano | 0.210 | Glass | 1.517 | 1.510 | 64.2 | — | — |
| 12 | | Plano | 0.174 | | | | | | |
| 13 | Image | Plano | 0.000 | | | | | | |

Note:
Operating wavelength range is 820–870 nm (infrared light), reference wavelength is 850 nm, and d-line wavelength is 587.6 nm.
An effective radius of the stop 901 (Surface 4) is 1.025 mm.

TABLE 24

Aspheric Coefficients

| Surface # | 2 | 3 | 5 | 6 |
|---|---|---|---|---|
| k= | −9.0000E+01 | 0.0000E+00 | 0.0000E+00 | 0.0000E+00 |
| A4= | 4.9954E−01 | −2.4225E−01 | −2.4083E−01 | 1.8888E−01 |
| A6= | −2.4496E+00 | −1.6115E−01 | −2.5721E−01 | −8.4217E−01 |
| A8= | 9.2981E+00 | 9.9775E−01 | −1.2573E+00 | 1.1428E+00 |
| A10= | −2.4095E+01 | −2.4531E+00 | 5.4059E+00 | −2.1601E+00 |
| A12= | 3.8024E+01 | 3.3328E+00 | −1.6311E+01 | 4.1170E+00 |
| A14= | −3.2692E+01 | −2.3311E+00 | 3.0885E+01 | −4.6313E+00 |
| A16= | 1.1675E+01 | 6.6337E−01 | −3.1588E+01 | 2.7257E+00 |
| A18= | — | — | 1.6195E+01 | −7.7751E−01 |
| A20= | — | — | −3.2859E+00 | 8.3794E−02 |

| Surface # | 7 | 8 | 9 | 10 |
|---|---|---|---|---|
| k= | −1.9618E+00 | −1.0000E+00 | −1.1286E+00 | −1.0000E+00 |
| A4= | 5.0961E−01 | −1.7437E−01 | −6.3617E−01 | −6.3431E−01 |
| A6= | −1.4618E+00 | 5.8118E−01 | 8.6517E−01 | 6.2532E−01 |
| A8= | 3.4624E+00 | −1.3322E+00 | −1.1973E+00 | −5.5813E−01 |
| A10= | −4.2105E+00 | 2.4488E+00 | 1.2556E+00 | 3.8112E−01 |
| A12= | 1.6314E+00 | −3.5787E+00 | −9.0551E−01 | −1.8641E−01 |
| A14= | 2.0773E+00 | 3.8429E+00 | 4.2681E−01 | 6.1787E−02 |
| A16= | −3.1191E+00 | −2.5947E+00 | −1.2427E−01 | −1.3023E−02 |
| A18= | 1.6064E+00 | 9.6193E−01 | 2.0213E−02 | 1.5658E−03 |
| A20= | −3.0129E−01 | −1.4892E−01 | −1.4039E−03 | −8.1471E−05 |

In the 12th embodiment, the equation of the aspheric surface profiles of the aforementioned lens elements is the same as the equation of the 1st embodiment. Also, the definitions of these parameters shown in the following table are the same as those stated in the above embodiments with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| fd [mm] | 2.34 | TD/CT1 | 3.03 |
| fr [mm] | 2.41 | TD/BL | 2.67 |
| EPD [mm] | 1.63 | TL/ImgH | 1.989 |
| fd/EPD | 1.43 | fd/R4 | 1.18 |
| HFOV [deg.] | 39.1 | fd/R7 | 2.38 |
| Vd1 + Vd2 + Vd3 + Vd4 | 94.0 | |fd/fd1| | 0.41 |
| Vdmax − Vdmin | 0.0 | |fd/fd2| | 0.31 |
| CT1/(T12 + CT2) | 1.79 | |fd/fd3| | 0.39 |
| CT1/CT2 | 3.20 | |fd/fd4| | 0.04 |
| CT1/CT3 | 1.80 | fd/ET1 | 3.28 |
| CT1/CT4 | 2.00 | Yc21 [mm] | 0.62 |
| CT1/ET1 | 1.34 | Yc22 [mm] | 0.89 |
| T12/T23 | 0.64 | 2 × Yc22/EPD | 1.09 |
| EPD/TD | 0.56 | Yc21/Yc22 | 0.70 |

13th Embodiment

Figure 25:
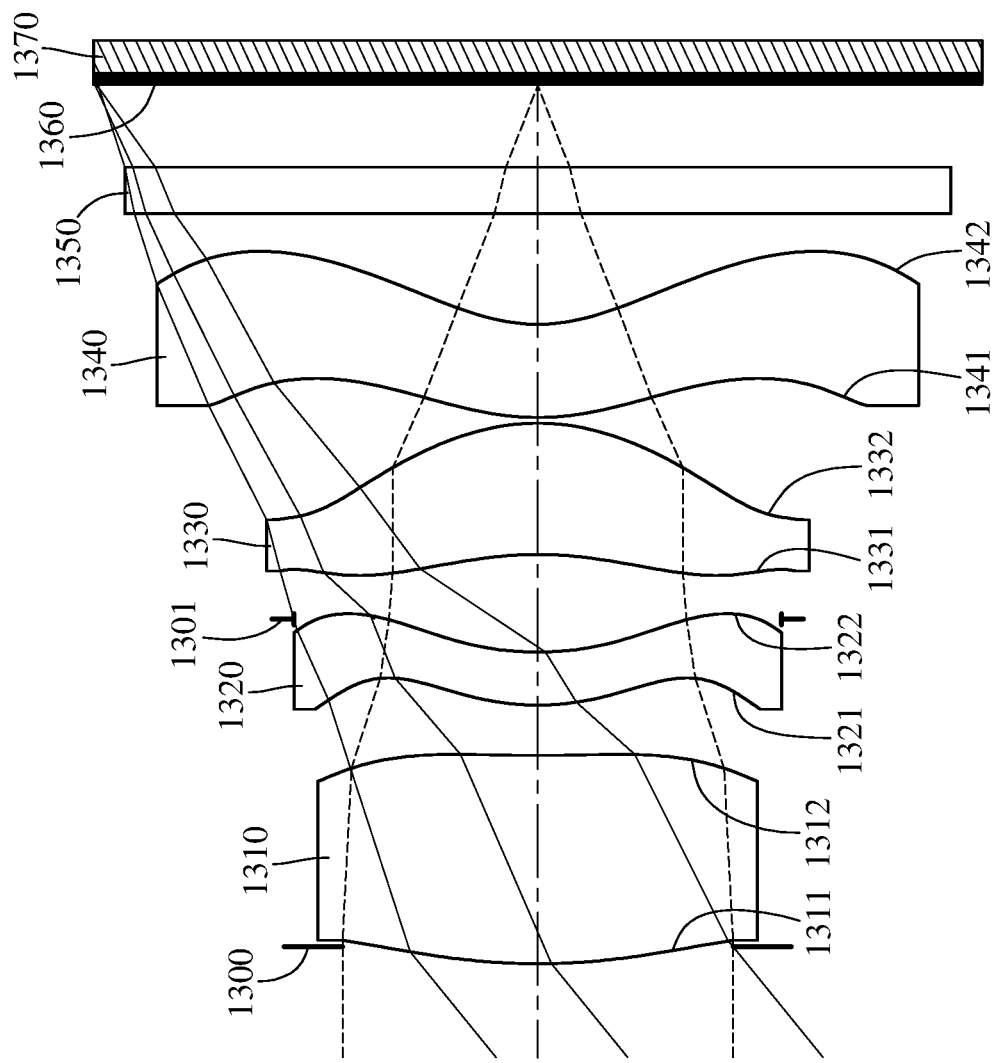
FIG. 25 is a schematic view of an image capturing unit according to the 13th embodiment of the present disclosure.
Figure 26:
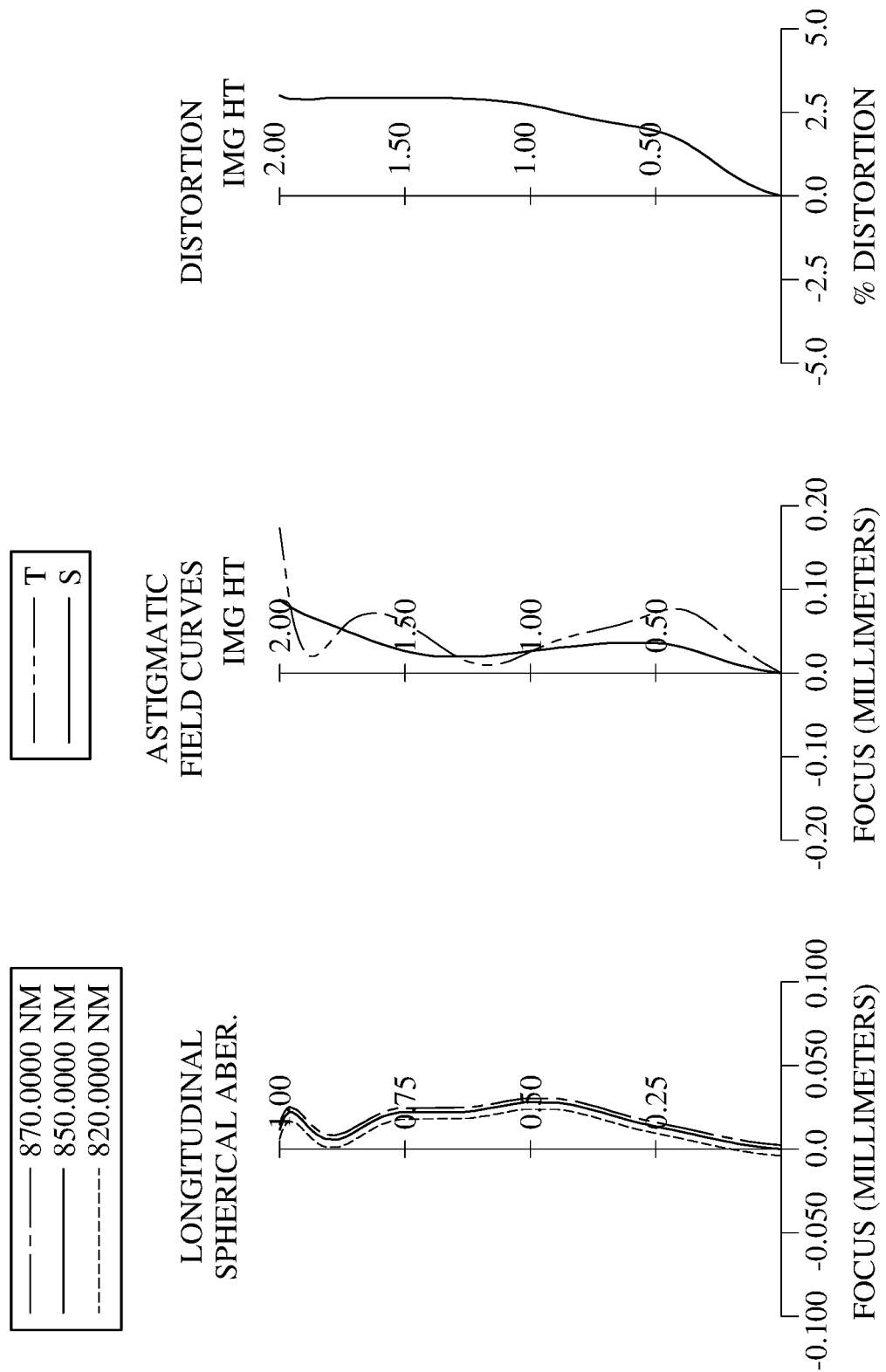
FIG. 26 shows spherical aberration curves, astigmatic field curves and a distortion curve of the image capturing unit according to the 13th embodiment.

FIG. 25 is a schematic view of an image capturing unit according to the 13th embodiment of the present disclosure. FIG. 26 shows, in order from left to right, spherical aberration curves, astigmatic field curves and a distortion curve of the image capturing unit according to the 13th embodiment. In FIG. 25, the image capturing unit includes the optical lens assembly (its reference numeral is omitted) of the present disclosure and an image sensor 1370. The optical lens assembly includes, in order from an object side to an image side along an imaging optical path, an aperture stop 1300, a first lens element 1310, a second lens element 1320, a stop 1301, a third lens element 1330, a fourth lens element 1340, a filter 1350 and an image surface 1360. The optical lens assembly includes four lens elements (1310, 1320, 1330 and 1340) with no additional lens element disposed between each of the adjacent four lens elements.

The first lens element 1310 with positive refractive power has an object-side surface 1311 being convex in a paraxial region thereof and an image-side surface 1312 being concave in a paraxial region thereof. The first lens element 1310 is made of plastic material and has the object-side surface 1311 and the image-side surface 1312 being both aspheric. The object-side surface 1311 of the first lens element 1310 has at least one inflection point in an off-axis region thereof. The image-side surface 1312 of the first lens element 1310 has at least one inflection point and at least one critical point in an off-axis region thereof.

The second lens element 1320 with positive refractive power has an object-side surface 1321 being convex in a paraxial region thereof and an image-side surface 1322 being concave in a paraxial region thereof. The second lens element 1320 is made of plastic material and has the object-side surface 1321 and the image-side surface 1322 being both aspheric. The object-side surface 1321 of the second lens element 1320 has at least one inflection point in an off-axis region thereof. The image-side surface 1322 of the second lens element 1320 has at least one inflection point in an off-axis region thereof. The object-side surface 1321 of the second lens element 1320 has at least one critical point in the off-axis region thereof. The image-side surface 1322 of the second lens element 1320 has at least one critical point in the off-axis region thereof.

The third lens element 1330 with positive refractive power has an object-side surface 1331 being concave in a paraxial region thereof and an image-side surface 1332 being convex in a paraxial region thereof. The third lens element 1330 is made of plastic material and has the object-side surface 1331 and the image-side surface 1332 being both aspheric. The object-side surface 1331 of the third lens element 1330 has at least one inflection point in an off-axis region thereof. The image-side surface 1332 of the third lens element 1330 has at least one inflection point in an off-axis region thereof. The object-side surface 1331 of the third lens element 1330 has at least one critical point in the off-axis region thereof. The image-side surface 1332 of the third lens element 1330 has at least one critical point in the off-axis region thereof.

The fourth lens element 1340 with negative refractive power has an object-side surface 1341 being convex in a paraxial region thereof and an image-side surface 1342 being concave in a paraxial region thereof. The fourth lens element 1340 is made of plastic material and has the object-side surface 1341 and the image-side surface 1342 being both aspheric. The object-side surface 1341 of the fourth lens element 1340 has at least one inflection point in an off-axis region thereof. The image-side surface 1342 of the fourth lens element 1340 has at least one inflection point in an off-axis region thereof. The object-side surface 1341 of the fourth lens element 1340 has at least one concave critical point in the off-axis region thereof. The image-side surface 1342 of the fourth lens element 1340 has at least one convex critical point in the off-axis region thereof.

The filter 1350 is made of glass material and located between the fourth lens element 1340 and the image surface 1360, and will not affect the focal length of the optical lens assembly. The image sensor 1370 is disposed on or near the image surface 1360 of the optical lens assembly.

The detailed optical data of the 13th embodiment are shown in Table 25 and the aspheric surface data are shown in Table 26 below.

TABLE 26

| Aspheric Coefficients | | | | |
|---|---|---|---|---|
| Surface # | 2 | 3 | 4 | 5 |
| k= | −9.0000E+01 | 0.0000E+00 | 0.0000E+00 | 0.0000E+00 |
| A4= | 4.4267E−01 | −2.9181E−01 | −2.9253E−01 | 2.1555E−01 |
| A6= | −2.1593E+00 | 1.8166E−03 | 3.4066E−01 | −8.0070E−01 |
| A8= | 7.7369E+00 | 6.1810E−01 | −6.7219E+00 | −1.3542E+00 |
| A10= | −1.8121E+01 | −1.5611E+00 | 2.6023E+01 | 6.1767E+00 |
| A12= | 2.5214E+01 | 1.9832E+00 | −6.1569E+01 | −9.6871E+00 |
| A14= | −1.8869E+01 | −1.3104E+00 | 9.1688E+01 | 8.4526E+00 |
| A16= | 5.8258E+00 | 3.6346E−01 | −8.1397E+01 | −4.4194E+00 |
| A18= | — | — | 3.9135E+01 | 1.3081E+00 |
| A20= | — | — | −7.8492E+00 | −1.6782E−01 |
| Surface # | 7 | 8 | 9 | 10 |
| k= | −2.2569E+00 | −1.0000E+00 | −9.5685E−01 | −1.0000E+00 |
| A4= | 2.7742E−01 | 2.5187E−01 | −2.9633E−01 | −7.3286E−01 |
| A6= | −8.4258E−02 | −6.1894E−01 | −1.9506E−01 | 8.4000E−01 |
| A8= | −1.0119E+00 | 7.8350E−01 | 7.9593E−01 | −8.8777E−01 |
| A10= | 4.3433E+00 | 9.0423E−01 | −1.1966E+00 | 7.0844E−01 |
| A12= | −7.7697E+00 | −4.7763E+00 | 1.0567E+00 | −3.9903E−01 |
| A14= | 7.3840E+00 | 7.4693E+00 | −5.7315E−01 | 1.5156E−01 |
| A16= | −3.8263E+00 | −5.7560E+00 | 1.8534E−01 | −3.6716E−02 |
| A18= | 9.6695E−01 | 2.1950E+00 | −3.2375E−02 | 5.1003E−03 |
| A20= | −8.0741E−02 | −3.3027E−01 | 2.3224E−03 | −3.0762E−04 |

In the 13th embodiment, the equation of the aspheric surface profiles of the aforementioned lens elements is the same as the equation of the 1st embodiment. Also, the definitions of these parameters shown in the following table are the same as those stated in the above embodiments with corresponding values for the 13th embodiment, so an explanation in this regard will not be provided again.

TABLE 25

13th Embodiment
fd = 2.30 mm, EPD = 1.76 mm, HFOV = 39.1 deg.

| Surface # | | Curvature Radius | Thickness | Material | Index d−line | Index 940 nm | Abbe # | Focal Length d−line | Focal Length 940 nm |
|---|---|---|---|---|---|---|---|---|---|
| 0 | Object | Plano | Infinity | | | | | | |
| 1 | Ape. Stop | Plano | −0.077 | | | | | | |
| 2 | Lens 1 | 2.885 (ASP) | 0.941 | Plastic | 1.639 | 1.620 | 23.5 | 7.31 | 7.54 |
| 3 | | 6.592 (ASP) | 0.227 | | | | | | |
| 4 | Lens 2 | 1.110 (ASP) | 0.240 | Plastic | 1.639 | 1.620 | 23.5 | 6.45 | 6.67 |
| 5 | | 1.391 (ASP) | 0.149 | | | | | | |
| 6 | Stop | Plano | 0.292 | | | | | | |
| 7 | Lens 3 | −1.641 (ASP) | 0.594 | Plastic | 1.639 | 1.620 | 23.5 | 2.70 | 2.80 |
| 8 | | −0.960 (ASP) | 0.025 | | | | | | |
| 9 | Lens 4 | 1.171 (ASP) | 0.421 | Plastic | 1.639 | 1.620 | 23.5 | −5.88 | −5.98 |
| 10 | | 0.768 (ASP) | 0.500 | | | | | | |
| 11 | Filter | Plano | 0.210 | Glass | 1.517 | 1.510 | 64.2 | — | — |
| 12 | | Plano | 0.375 | | | | | | |
| 13 | Image | Plano | 0.000 | | | | | | |

Note:
Operating wavelength range is 820–870 nm (infrared light), reference wavelength is 850 nm, and d-line wavelength is 587.6 nm.
An effective radius of the stop 1301 (Surface 4) is 1.100 mm.

Moreover, these parameters can be calculated from Table 25 and Table 26 as the following values and satisfy the following conditions:

| 13th Embodiment | | | |
|---|---|---|---|
| fd [mm] | 2.30 | TD/CT1 | 3.07 |
| fr [mm] | 2.38 | TD/BL | 2.66 |
| EPD [mm] | 1.76 | TL/ImgH | 1.987 |
| fd/EPD | 1.31 | fd/R4 | 1.66 |
| HFOV [deg.] | 39.1 | fd/R7 | 1.97 |
| Vd1 + Vd2 + Vd3 + Vd4 | 94.0 | |fd/fd1| | 0.32 |
| Vdmax − Vdmin | 0.0 | |fd/fd2| | 0.36 |
| CT1/(T12 + CT2) | 2.01 | |fd/fd3| | 0.85 |
| CT1/CT2 | 3.92 | |fd/fd4| | 0.39 |
| CT1/CT3 | 1.58 | fd/ET1 | 3.21 |
| CT1/CT4 | 2.24 | Yc21 [mm] | 0.68 |
| CT1/ET1 | 1.31 | Yc22 [mm] | 0.86 |
| T12/T23 | 0.51 | 2 × Yc22/EPD | 0.97 |
| EPD/TD | 0.61 | Yc21/Yc22 | 0.79 |

14th Embodiment

Figure 27:
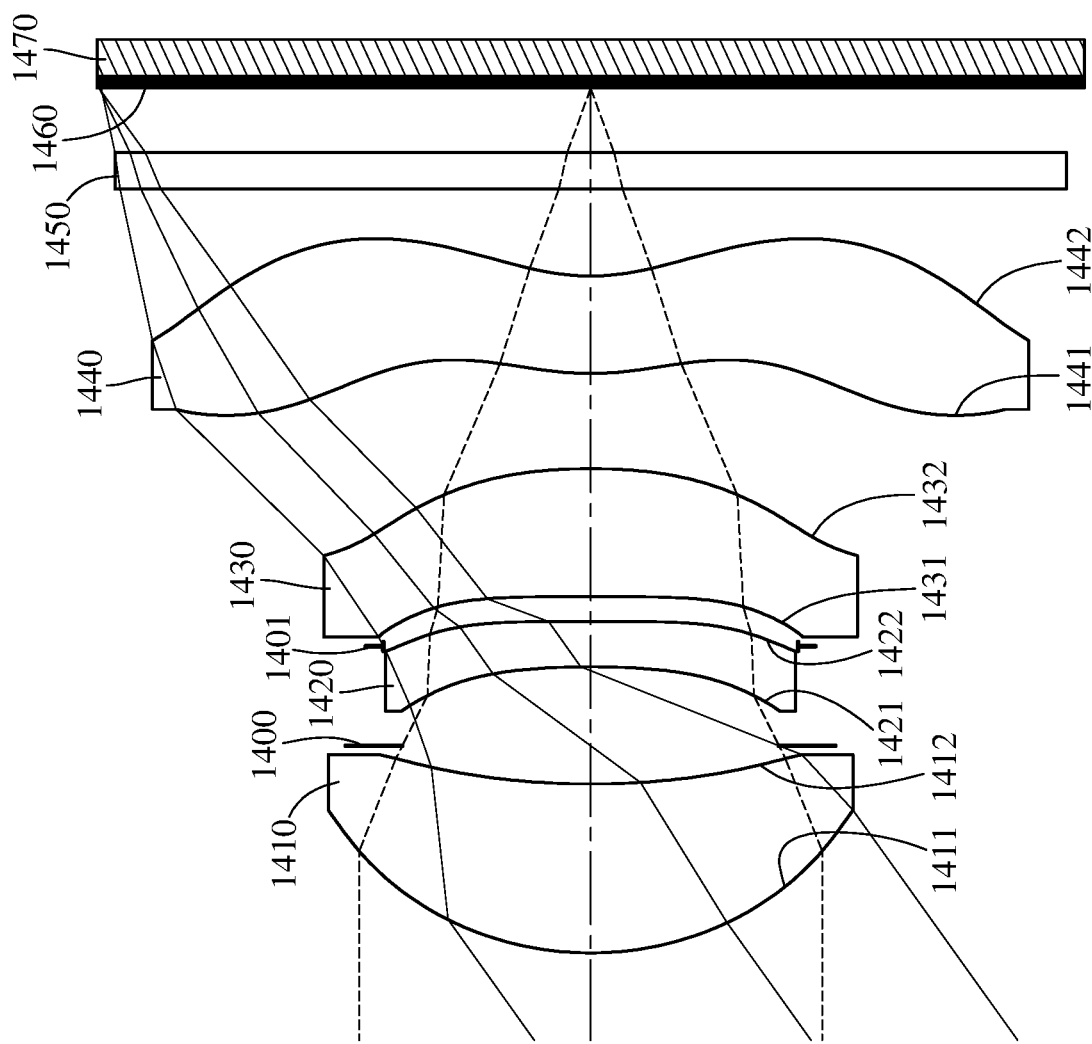
FIG. 27 is a schematic view of an image capturing unit according to the 14th embodiment of the present disclosure.
Figure 28:
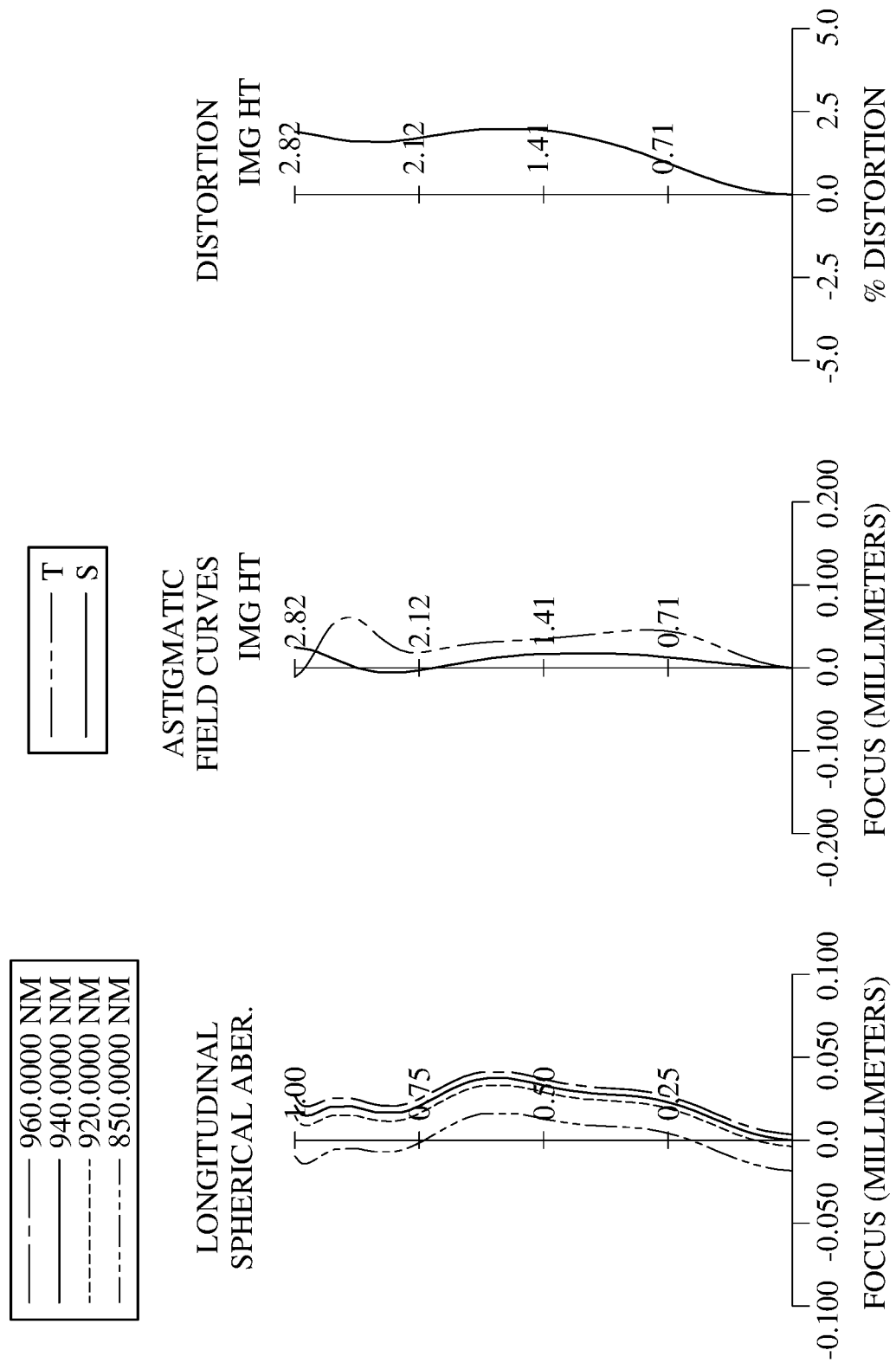
FIG. 28 shows spherical aberration curves, astigmatic field curves and a distortion curve of the image capturing unit according to the 14th embodiment.

FIG. 27 is a schematic view of an image capturing unit according to the 14th embodiment of the present disclosure. FIG. 28 shows, in order from left to right, spherical aberration curves, astigmatic field curves and a distortion curve of the image capturing unit according to the 14th embodiment. In FIG. 27, the image capturing unit includes the optical lens assembly (its reference numeral is omitted) of the present disclosure and an image sensor 1470. The optical lens assembly includes, in order from an object side to an image side along an imaging optical path, a first lens element 1410, an aperture stop 1400, a second lens element 1420, a stop 1401, a third lens element 1430, a fourth lens element 1440, a filter 1450 and an image surface 1460. The optical lens assembly includes four lens elements (1410, 1420, 1430 and 1440) with no additional lens element disposed between each of the adjacent four lens elements.

The first lens element 1410 with positive refractive power has an object-side surface 1411 being convex in a paraxial region thereof and an image-side surface 1412 being concave in a paraxial region thereof. The first lens element 1410 is made of plastic material and has the object-side surface 1411 and the image-side surface 1412 being both aspheric. The object-side surface 1411 of the first lens element 1410 has at least one inflection point in an off-axis region thereof. The image-side surface 1412 of the first lens element 1410 has at least one inflection point in an off-axis region thereof.

The second lens element 1420 with negative refractive power has an object-side surface 1421 being concave in a paraxial region thereof and an image-side surface 1422 being concave in a paraxial region thereof. The second lens element 1420 is made of plastic material and has the object-side surface 1421 and the image-side surface 1422 being both aspheric. The image-side surface 1422 of the second lens element 1420 has at least one inflection point and at least one critical point in an off-axis region thereof.

The third lens element 1430 with positive refractive power has an object-side surface 1431 being convex in a paraxial region thereof and an image-side surface 1432 being convex in a paraxial region thereof. The third lens element 1430 is made of plastic material and has the object-side surface 1431 and the image-side surface 1432 being both aspheric. The object-side surface 1431 of the third lens element 1430 has at least one inflection point in an off-axis region thereof. The image-side surface 1432 of the third lens element 1430 has at least one inflection point in an off-axis region thereof. The object-side surface 1431 of the third lens element 1430 has at least one critical point in the off-axis region thereof.

The fourth lens element 1440 with negative refractive power has an object-side surface 1441 being convex in a paraxial region thereof and an image-side surface 1442 being concave in a paraxial region thereof. The fourth lens element 1440 is made of plastic material and has the object-side surface 1441 and the image-side surface 1442 being both aspheric. The object-side surface 1441 of the fourth lens element 1440 has at least one inflection point in an off-axis region thereof. The image-side surface 1442 of the fourth lens element 1440 has at least one inflection point in an off-axis region thereof. The object-side surface 1441 of the fourth lens element 1440 has at least one convex critical point and at least one concave critical point in the off-axis region thereof. The image-side surface 1442 of the fourth lens element 1440 has at least one convex critical point in the off-axis region thereof.

The filter 1450 is made of glass material and located between the fourth lens element 1440 and the image surface 1460, and will not affect the focal length of the optical lens assembly. The image sensor 1470 is disposed on or near the image surface 1460 of the optical lens assembly.

Figure 33:
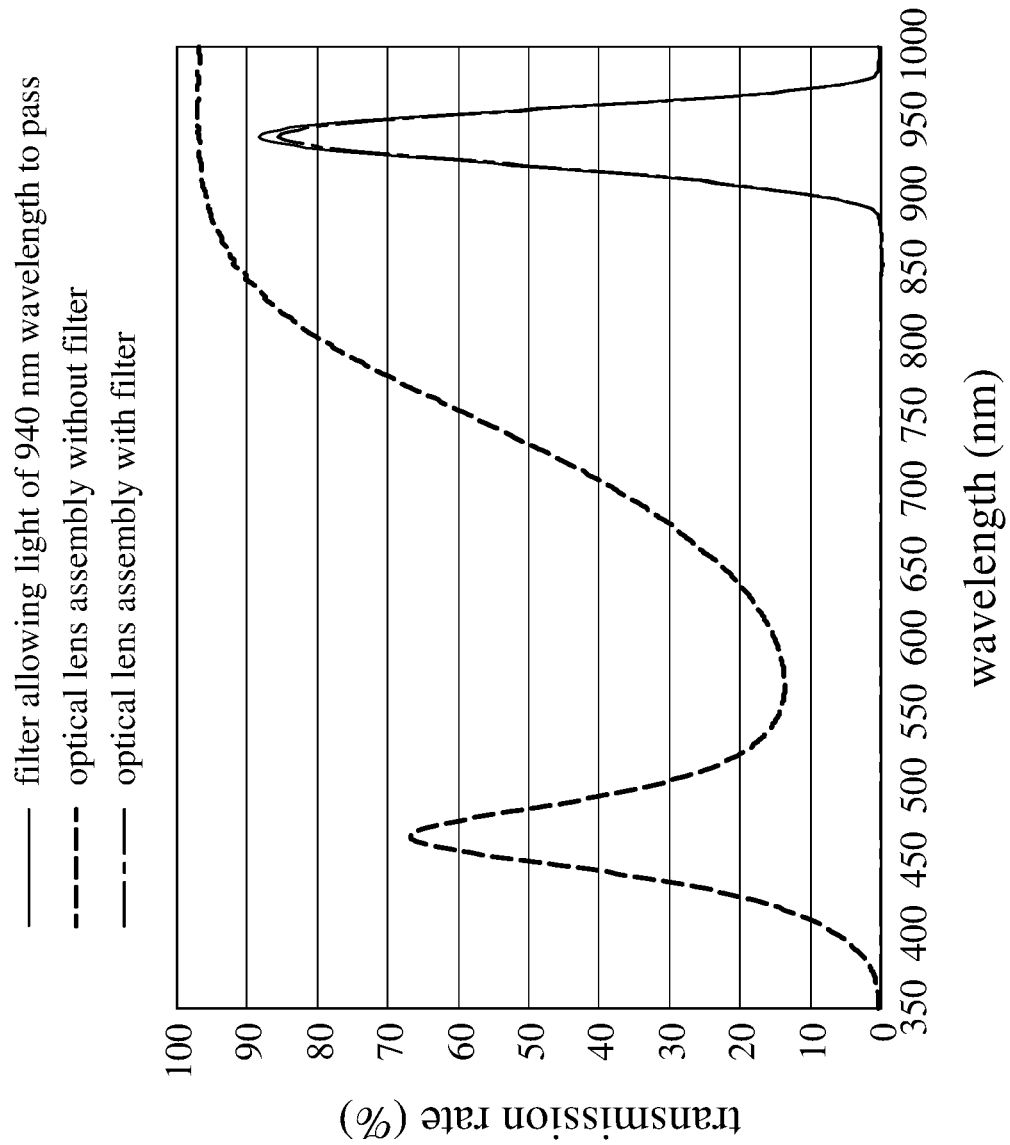
FIG. 33 is a comparison graph of light transmission rates at different wavelengths before and after the optical lens assembly disclosed in the 14th embodiment is provided with a filter.
Figure 34:
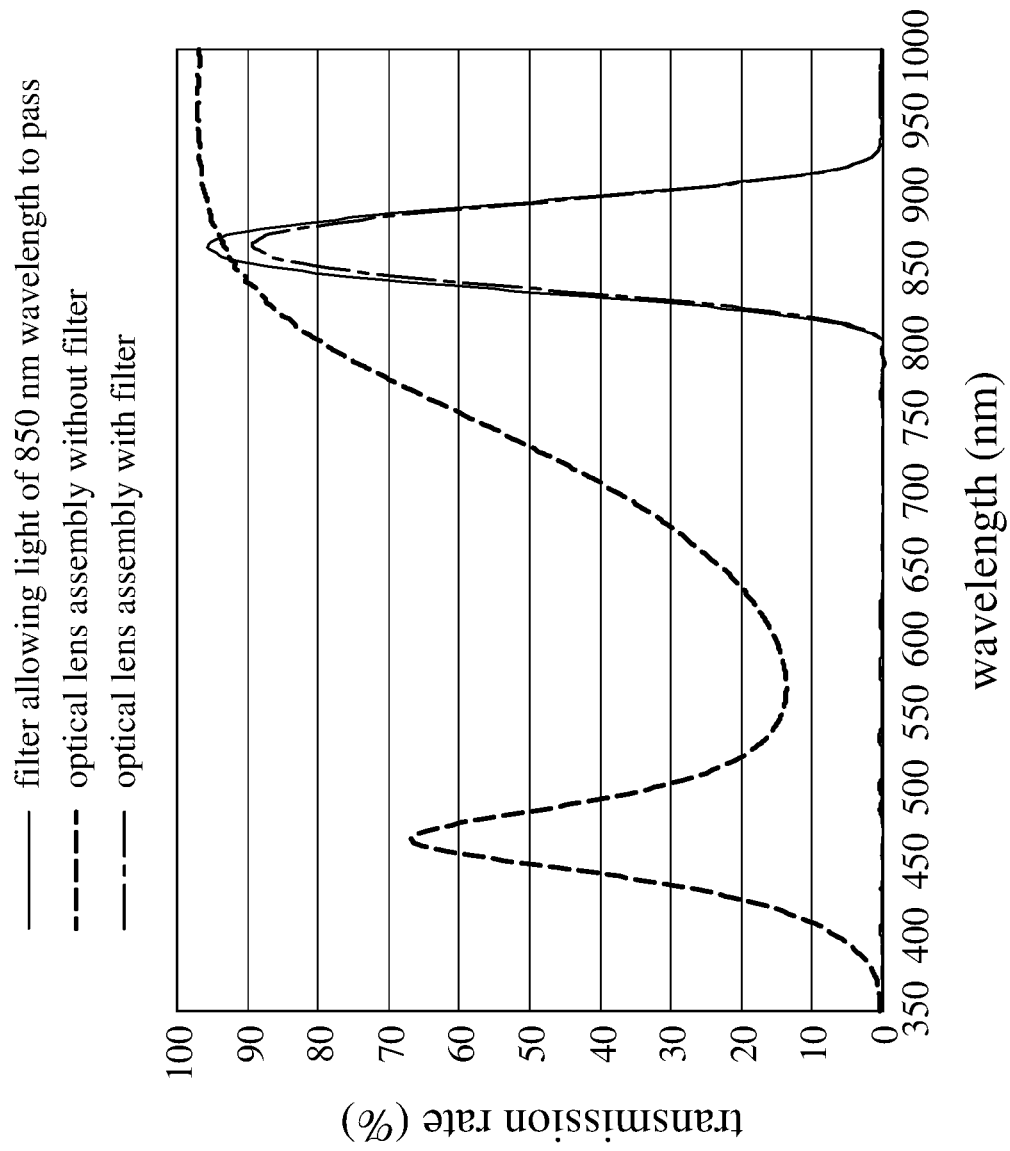
FIG. 34 is a comparison graph of light transmission rates at different wavelengths before and after the optical lens assembly disclosed in the 14th embodiment is provided with another filter.

The optical lens assembly of this embodiment is operated within a wavelength range of 850 nm to 960 nm, and the filter 1450 is configured to allow light in the wavelength range to pass and block light of other wavelengths. For example, please refer to FIG. 33 and FIG. 34. FIG. 33 is a comparison graph of light transmission rates at different wavelengths before and after the optical lens assembly disclosed in the 14th embodiment is provided with a filter, and FIG. 34 is a comparison graph of light transmission rates at different wavelengths before and after the optical lens assembly disclosed in the 14th embodiment is provided with another filter.

In the configuration as shown in FIG. 33, the filter 1450 can allow light of 940 nm wavelength to pass and block light of other wavelengths. FIG. 33 shows the transmission rates of light at different wavelengths passing through the filter 1450, the transmission rates of light at different wavelengths passing through the optical lens assembly without a filter, and the transmission rates of light at different wavelengths passing through the optical lens assembly provided with the filter 1450. In the configuration as shown in FIG. 34, the filter 1450 can allow light of 850 nm wavelength to pass and block light of other wavelengths. FIG. 34 shows the transmission rates of light at different wavelengths passing through the filter 1450, the transmission rates of light at different wavelengths passing through the optical lens assembly without a filter, and the transmission rates of light at different wavelengths passing through the optical lens assembly provided with the filter 1450. The filters in this embodiment being configured to allow light of a certain wavelength to pass and block light of other wavelengths as shown in FIG. 33 and FIG. 34 are only exemplary. The filter of other embodiments of the present disclosure can also be configured to allow light in the operating wavelength range of the optical lens assembly to pass and block light of other wavelengths.

The detailed optical data of the 14th embodiment are shown in Table 27 and the aspheric surface data are shown in Table 28 below.

TABLE 27

14th Embodiment
fd = 3.67 mm, EPD = 2.66 mm, HFOV = 35.6 deg.

| Surface # | | Curvature Radius | Thickness | Material | Index d-line | 940 nm | Abbe # | Focal Length d-line | 940 nm |
|---|---|---|---|---|---|---|---|---|---|
| 0 | Object | Plano | Infinity | | | | | | |
| 1 | Lens 1 | 1.843 (ASP) | 0.971 | Plastic | 1.660 | 1.634 | 20.4 | 4.08 | 4.26 |
| 2 | | 4.628 (ASP) | 0.220 | | | | | | |
| 3 | Ape. Stop | Plano | 0.453 | | | | | | |
| 4 | Lens 2 | −5.279 (ASP) | 0.260 | Plastic | 1.660 | 1.634 | 20.4 | −6.89 | −7.17 |
| 5 | | 33.444 (ASP) | −0.142 | | | | | | |
| 6 | Stop | Plano | 0.285 | | | | | | |
| 7 | Lens 3 | 124.931 (ASP) | 0.735 | Plastic | 1.660 | 1.634 | 20.4 | 5.17 | 5.38 |
| 8 | | −3.499 (ASP) | 0.547 | | | | | | |
| 9 | Lens 4 | 1.696 (ASP) | 0.560 | Plastic | 1.614 | 1.594 | 26.0 | −14.76 | −14.98 |
| 10 | | 1.249 (ASP) | 0.500 | | | | | | |
| 11 | Filter | Plano | 0.210 | Glass | 1.517 | 1.508 | 64.2 | — | — |
| 12 | | Plano | 0.369 | | | | | | |
| 13 | Image | Plano | 0.000 | | | | | | |

Note:
Operating wavelength range is 850–960 nm (infrared light), reference wavelength is 940 nm, and d-line wavelength is 587.6 nm.
An effective radius of the stop 1401 (Surface 6) is 1.190 mm.

TABLE 28

Aspheric Coefficients

| Surface # | 1 | 2 | 4 | 5 |
|---|---|---|---|---|
| k= | 0.0000E+00 | −9.8985E+01 | 0.0000E+00 | 0.0000E+00 |
| A4= | −1.6993E−02 | 1.2279E−01 | −1.2780E−01 | −2.2156E−01 |
| A6= | 7.1556E−02 | −1.9279E−01 | −4.4407E−03 | 5.0114E−01 |
| A8= | −1.3981E−01 | 3.0551E−01 | 5.0629E−01 | −1.2204E+00 |
| A10= | 1.5950E−01 | −3.6446E−01 | −1.8511E+00 | 1.8988E+00 |
| A12= | −1.0183E−01 | 2.8046E−01 | 3.0883E+00 | −1.9996E+00 |
| A14= | 3.4098E−02 | −1.2091E−01 | −2.7241E+00 | 1.3858E+00 |
| A16= | −4.6358E−03 | 2.1526E−02 | 1.2335E+00 | −5.5537E−01 |
| A18= | — | — | −2.2514E−01 | 9.6090E−02 |

| Surface # | 7 | 8 | 9 | 10 |
|---|---|---|---|---|
| k= | 9.0000E+01 | −5.5499E+01 | −1.0000E+00 | −1.0000E+00 |
| A4= | −1.4712E−01 | −3.4011E−01 | −3.6379E−01 | −3.2123E−01 |
| A6= | 2.3579E−01 | 5.7713E−01 | 1.9036E−01 | 1.8009E−01 |
| A8= | −6.9822E−01 | −9.9035E−01 | −9.1889E−02 | −8.4807E−02 |
| A10= | 1.7431E+00 | 1.2989E+00 | 4.0400E−02 | 2.9238E−02 |
| A12= | −3.2610E+00 | −1.1742E+00 | −1.2562E−02 | −7.1024E−03 |
| A14= | 3.8101E+00 | 6.8732E−01 | 2.5008E−03 | 1.1829E−03 |
| A16= | −2.5919E+00 | −2.4379E−01 | −3.0410E−04 | −1.2878E−04 |
| A18= | 9.4793E−01 | 4.7331E−02 | 2.0665E−05 | 8.2821E−06 |
| A20= | −1.4531E−01 | −3.8599E−03 | −6.0384E−07 | −2.3877E−07 |

In the 14th embodiment, the equation of the aspheric surface profiles of the aforementioned lens elements is the same as the equation of the 1st embodiment. Also, the definitions of these parameters shown in the following table are the same as those stated in the above embodiments with corresponding values for the 14th embodiment, so an explanation in this regard will not be provided again.

Moreover, these parameters can be calculated from Table 27 and Table 28 as the following values and satisfy the following conditions:

14th Embodiment

| fd [mm] | 3.67 | EPD/TD | 0.68 |
|---|---|---|---|
| fr [mm] | 3.85 | TD/CT1 | 4.01 |
| EPD [mm] | 2.66 | TD/BL | 3.60 |
| fd/EPD | 1.38 | TL/ImgH | 1.762 |
| HFOV [deg.] | 35.6 | fd/R4 | 0.11 |
| Vd1 + Vd2 + Vd3 + Vd4 | 87.2 | fd/R7 | 2.17 |

-continued

14th Embodiment

| Vdmax − Vdmin | 5.6 | |fd/fd1| | 0.90 |
|---|---|---|---|
| CT1/(T12 + CT2) | 1.04 | |fd/fd2| | 0.53 |
| CT1/CT2 | 3.73 | |fd/fd3| | 0.71 |
| CT1/CT3 | 1.32 | |fd/fd4| | 0.25 |
| CT1/CT4 | 1.73 | fd/ET1 | 11.53 |
| CT1/ET1 | 3.05 | Yc22 [mm] | 0.20 |
| T12/T23 | 4.71 | 2 × Yc22/EPD | 0.15 |

15th Embodiment

Figure 35:
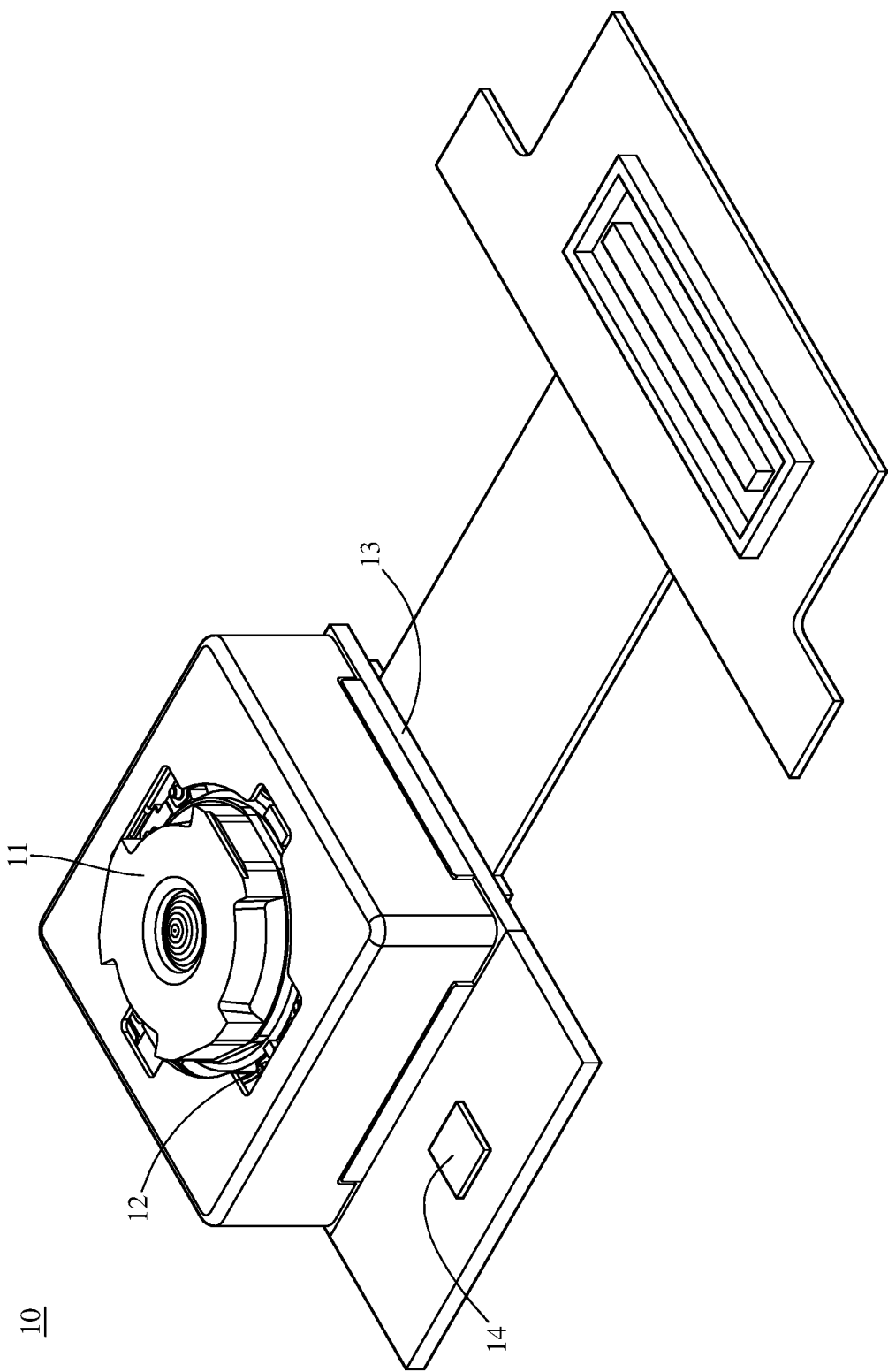
FIG. 35 is a perspective view of an image capturing unit according to the 15th embodiment of the present disclosure.

FIG. 35 is a perspective view of an image capturing unit according to the 15th embodiment of the present disclosure. In this embodiment, an image capturing unit 10 is a camera module including a lens unit 11, a driving device 12, an image sensor 13 and an image stabilizer 14. The lens unit 11 includes the optical lens assembly disclosed in the 3rd embodiment, a barrel and a holder member (their reference numerals are omitted) for holding the optical lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the optical lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

16th Embodiment

Figure 36:
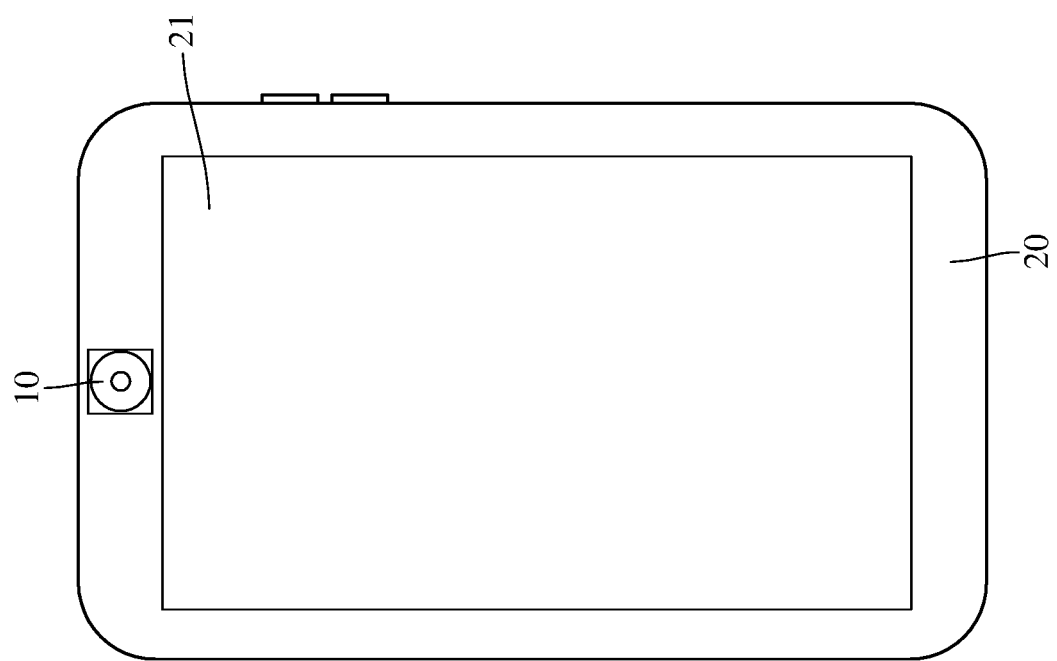
FIG. 36 is a perspective view of an electronic device according to the 16th embodiment of the present disclosure.

FIG. 36 is a perspective view of an electronic device according to the 16th embodiment of the present disclosure. In this embodiment, an electronic device 20 is a smartphone including the image capturing unit 10 disclosed in the 15th embodiment and a display unit 21.

The image capturing unit 10, which includes the optical lens assembly disclosed in the 3rd embodiment, is operated within the wavelength range of visible light for taking regular images. The image capturing unit 10 and the display unit 21 are disposed on the same side of the electronic device 20, such that the image capturing unit 10 can be a front-facing camera of the electronic device 20 for taking selfies, but the present disclosure is not limited thereto.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the optical lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

17th Embodiment

Figure 37:
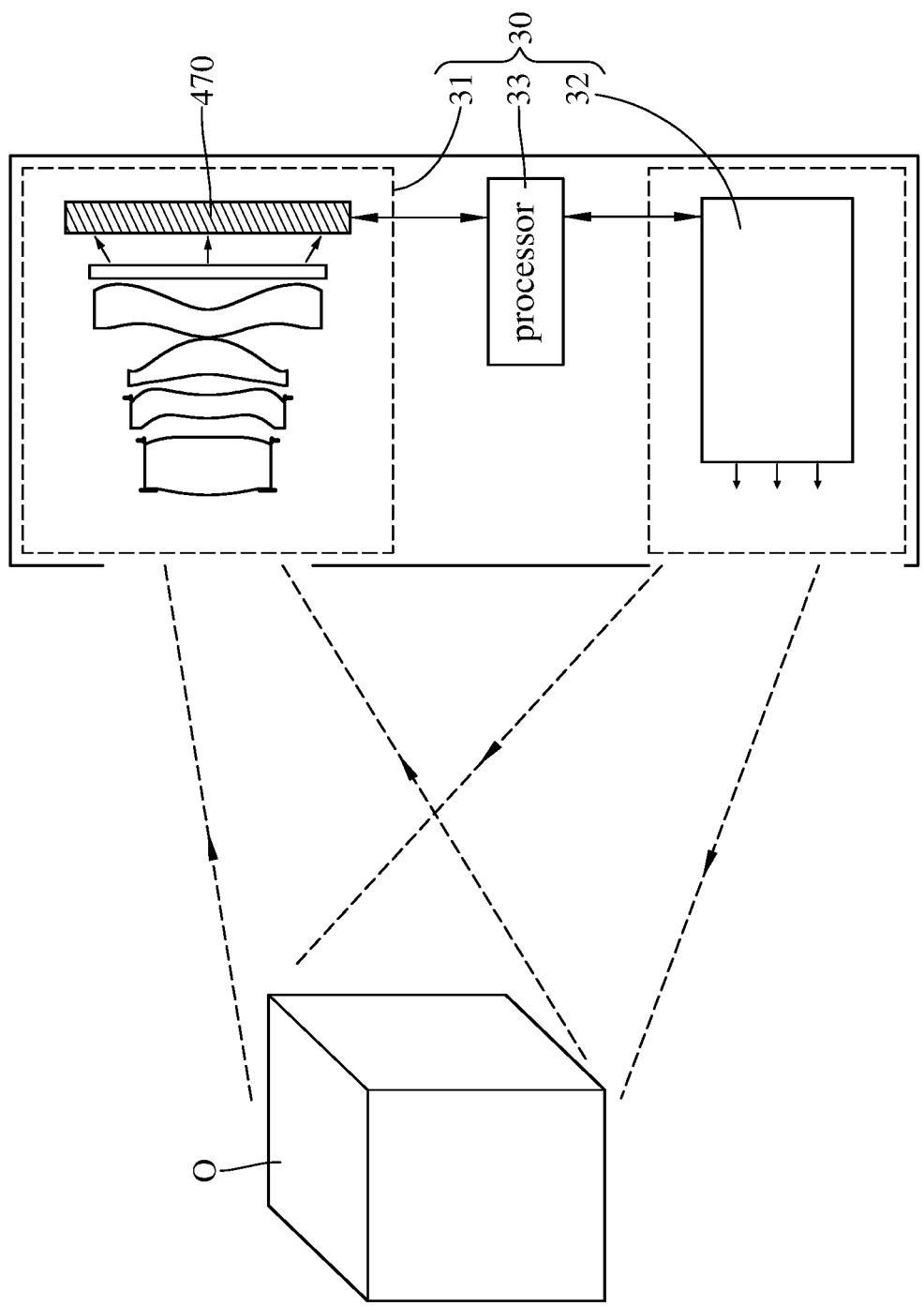
FIG. 37 is a schematic view of a detecting module according to the 17th embodiment of the present disclosure.

FIG. 37 is a schematic view of a detecting module according to the 17th embodiment of the present disclosure. In this embodiment, a detecting module 30 includes a receiving device 31, an infrared light source 32 and a processor 33. The receiving device 31 includes the optical lens assembly and the image sensor 470 disclosed in the 4th embodiment.

The infrared light source 32 can be a laser, a superluminescent diode (SLED), a micro LED, a resonant cavity light emitting diode (RCLED), a vertical cavity surface emitting laser (VCSEL) and the like. The infrared light source 32 can be a single light source or multiple light sources. The infrared light source 32 projects an infrared light onto a detected object O. The detected object O reflects the infrared light, and the reflected infrared light travels into the receiving device 31. The infrared light traveling into the receiving device 31 passes through the optical lens assembly and then is imaged on the image sensor 470.

The processor 33 is configured to analyze information of the image to obtain a relative distance between different parts of the detected object O, thereby determining a 3D profile of the detected object O.

The present disclosure is not limited to the detecting module 30 in FIG. 37. For example, the detecting module can further include a focus tunable component or a reflector. The focus tunable component is configured to adjust the focal length of the optical lens assembly of the receiving device 31 according to different photographing conditions so as to provide high image resolution. The reflector is configured to improve the space utilization.

According to the present disclosure, the detecting module can be operated with light having a wavelength range of 920 nm to 960 nm, such that the detecting module is applicable to applications such as augmented reality, face recognition and motion capturing.

18th Embodiment

Figure 38:
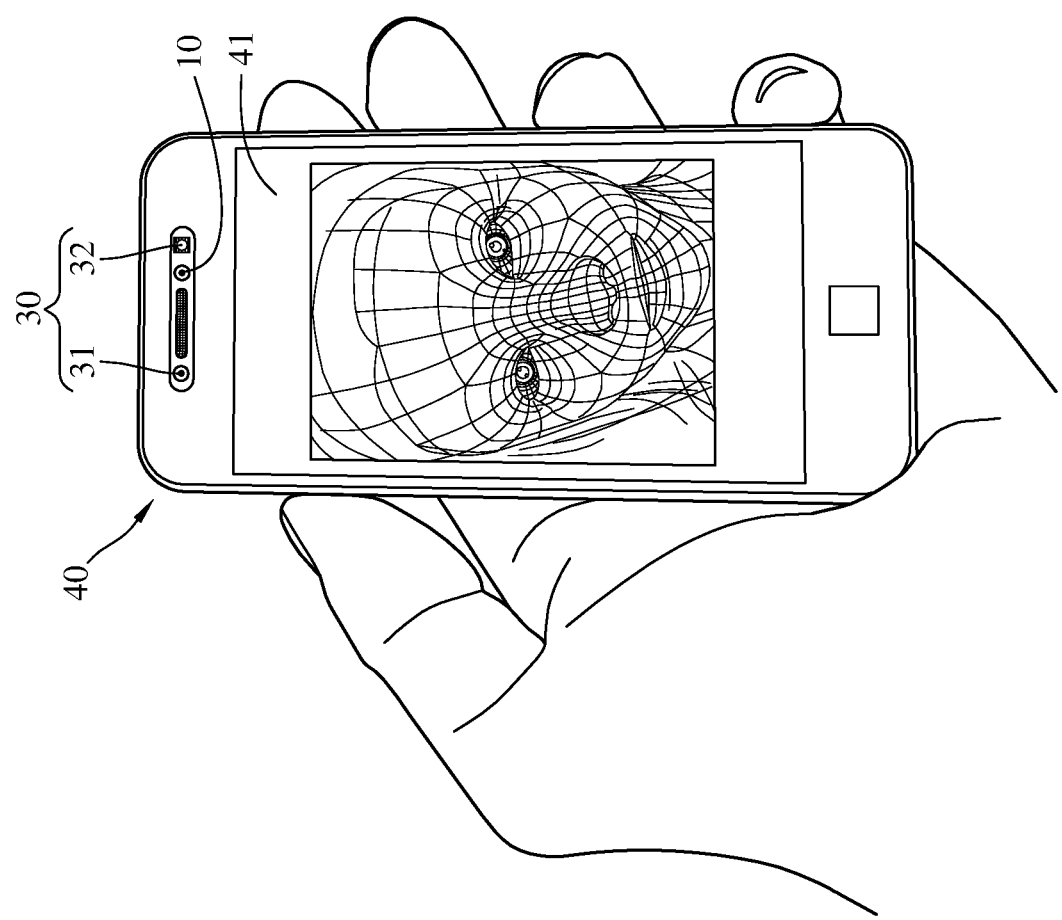
FIG. 38 is a front view of an electronic device according to the 18th embodiment of the present disclosure.

FIG. 38 is a front view of an electronic device according to the 18th embodiment of the present disclosure. In this embodiment, an electronic device 40 is a smartphone including the image capturing unit 10 disclosed in the 15th embodiment, a display unit 41 and the detecting module 30 disclosed in the 17th embodiment.

The image capturing unit 10 is operated within the wavelength range of visible light as a regular image capturing unit for imaging and photography.

The optical lens assembly of the receiving device 31 of the detecting module 30 receives the light reflected off the subject's face, and projected on the image sensor 470 to generate a corresponding image. The processor 33 is configured to analyze information of the image to obtain a relative distance between different parts of the subject's face, thereby determining a 3D profile of the subject's face. Moreover, after the information of the image is analyzed by the processor 33, an analyzed human facial image can be displayed on a screen 41 of the electronic device 40.

The image capturing unit 10 including the optical lens assembly disclosed in the 3rd embodiment and the receiving device 31 including the optical lens assembly disclosed in the 4th embodiment are only exemplary, and the present disclosure is not limited thereto. The image capturing unit and the receiving device may include the optical lens assembly disclosed in other embodiments of the present disclosure.

The foregoing description, for the purpose of explanation, has been described with reference to specific embodiments. It is to be noted that TABLES 1-28 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising four lens elements, the four lens elements being, in order from an object side to an image side along an imaging optical path, a first lens element, a second lens element, a third lens element and a fourth lens element;
    wherein the first lens element has positive refractive power, the second lens element has an image-side surface being concave in a paraxial region thereof, the third lens element has an object-side surface being concave in a paraxial region thereof, the fourth lens element with negative refractive power has an object-side surface being convex in a paraxial region thereof and an image-side surface being concave in a paraxial region thereof, and at least one of the object-side surface and the image-side surface of the fourth lens element has at least one inflection point in an off-axis region thereof;

wherein an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, a curvature radius of the object-side surface of the fourth lens element is R7, and the following conditions are satisfied:

$Vd1+Vd2+Vd3+Vd4<130$;

$1.0<CT1/(T12+CT2)<2.20$;

$2.25<TD/BL$; and $1.32<fd/R7$.

2. The optical lens assembly of claim 1, wherein the Abbe number of the first lens element is Vd1, the Abbe number of the second lens element is Vd2, the Abbe number of the third lens element is Vd3, the Abbe number of the fourth lens element is Vd4, and the following condition is satisfied:

$30<Vd1+Vd2+Vd3+Vd4<100$.

3. The optical lens assembly of claim 1, wherein the central thickness of the first lens element is CT1, a distance in parallel with an optical axis between a maximum effective radius position of the object-side surface of the first lens element and a maximum effective radius position of an image-side surface of the first lens element is ET1, and the following condition is satisfied:

$0.80<CT1/ET1<1.75$.

4. The optical lens assembly of claim 1, wherein the central thickness of the first lens element is CT1, the central thickness of the second lens element is CT2, the axial distance between the first lens element and the second lens element is T12, and the following condition is satisfied:

$1.10<CT1/(T12+CT2)<2.0$.

5. The optical lens assembly of claim 1, wherein the focal length of the optical lens assembly at the wavelength of helium d-line is fd, a focal length of the first lens element at the wavelength of helium d-line is fd1, a focal length of the second lens element at the wavelength of helium d-line is fd2, a focal length of the third lens element at the wavelength of helium d-line is fd3, a focal length of the fourth lens element at the wavelength of helium d-line is fd4, and the following conditions are satisfied:

$|fd/fd1|<1.0$;

$|fd/fd2|<0.80$;

$|fd/fd3|<0.80$; and $|fd/fd4|<0.80$.

6. The optical lens assembly of claim 1, wherein a vertical distance between a non-axial critical point on the image-side surface of the second lens element and an optical axis is Yc22, an entrance pupil diameter of the optical lens assembly is EPD, and the following condition is satisfied:

$0.50<2\times Yc22/EPD<2.0$.

7. The optical lens assembly of claim 1, wherein an entrance pupil diameter of the optical lens assembly is EPD, the axial distance between the object-side surface of the first lens element and the image-side surface of the fourth lens element is TD, and the following condition is satisfied:

$0.45<EPD/TD<1.0$.

8. The optical lens assembly of claim 1, wherein the central thickness of the first lens element is CT1, the central thickness of the second lens element is CT2, a central thickness of the third lens element is CT3, a central thickness of the fourth lens element is CT4, and the following conditions are satisfied:

$1.0<CT1/CT2$;

$1.0<CT1/CT3$; and $1.0<CT1/CT4$.

9. The optical lens assembly of claim 1, wherein the axial distance between the object-side surface of the first lens element and the image-side surface of the fourth lens element is TD, the axial distance between the image-side surface of the fourth lens element and the image surface is BL, and the following condition is satisfied:

$2.25<TD/BL<10$.

10. The optical lens assembly of claim 1, wherein the focal length of the optical lens assembly at the wavelength of helium d-line is fd, an entrance pupil diameter of the optical lens assembly is EPD, an axial distance between the object-side surface of the first lens element and the image surface is TL, a maximum image height of the optical lens assembly is ImgH, and the following conditions are satisfied:

$0.80<fd/EPD<1.70$; and $0.80<TL/ImgH<2.40$.

11. The optical lens assembly of claim 1, wherein the focal length of the optical lens assembly at the wavelength of helium d-line is fd, a distance in parallel with an optical axis between a maximum effective radius position of the object-side surface of the first lens element and a maximum effective radius position of an image-side surface of the first lens element is ET1, and the following condition is satisfied:

$fd/ET1<6.0$.

12. The optical lens assembly of claim 1, wherein the axial distance between the object-side surface of the first lens element and the image-side surface of the fourth lens element is TD, the central thickness of the first lens element is CT1, and the following condition is satisfied:

$1.0<TD/CT1<5.0$.

13. The optical lens assembly of claim 1, wherein each of the first lens element, the second lens element, the third lens element and the fourth lens element has at least one lens surface with at least one inflection point in an off-axis region thereof.

14. The optical lens assembly of claim 1, wherein at least one of the first lens element, the second lens element, the third lens element and the fourth lens element is made of black plastic material.

15. An image capturing unit, comprising:
the optical lens assembly of claim 1; and
an image sensor disposed on the image surface of the optical lens assembly.

16. An electronic device, comprising:
the image capturing unit of claim 15.

17. An optical lens assembly comprising four lens elements, the four lens elements being, in order from an object side to an image side along an imaging optical path, a first lens element, a second lens element, a third lens element and a fourth lens element;
wherein the first lens element has positive refractive power, the second lens element has an image-side surface being concave in a paraxial region thereof, the third lens element has positive refractive power, the fourth lens element has an object-side surface being convex in a paraxial region thereof and an image-side surface being concave in a paraxial region thereof, and at least one of the object-side surface and the image-side surface of the fourth lens element has at least one inflection point in an off-axis region thereof;
wherein an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, a central thickness of the fourth lens element is CT4, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, a focal length of the third lens element at the wavelength of helium d-line is fd3, a curvature radius of the object-side surface of the fourth lens element is R7, and the following conditions are satisfied:

$Vd1+Vd2+Vd3+Vd4<130$;

$1.05<CT1/(T12+CT2)$;

$1.75<TD/BL<20$; and $0.10<fd/R7$;

$|fd/fd3|<0.80$; and $1.20 \leq CT1/CT4$.

18. The optical lens assembly of claim 17, wherein the focal length of the optical lens assembly at the wavelength of helium d-line is fd, a focal length of the first lens element at the wavelength of helium d-line is fd1, a focal length of the second lens element at the wavelength of helium d-line is fd2, a focal length of the fourth lens element at the wavelength of helium d-line is fd4, and the following conditions are satisfied:

$|fd/fd1|<1.0$;

$|fd/fd2|<0.80$; and $|fd/fd4|<0.80$.

19. The optical lens assembly of claim 17, wherein the Abbe number of the first lens element is Vd1, the Abbe number of the second lens element is Vd2, the Abbe number of the third lens element is Vd3, the Abbe number of the fourth lens element is Vd4, and the following condition is satisfied:

$30<Vd1+Vd2+Vd3+Vd4<100$.

20. The optical lens assembly of claim 17, wherein the second lens element has positive refractive power, the second lens element has an object-side surface being convex in a paraxial region thereof, a vertical distance between a non-axial critical point on the object-side surface of the second lens element and an optical axis is Yc21, a vertical distance between a non-axial critical point on the image-side surface of the second lens element and the optical axis is Yc22, and the following condition is satisfied:

$0.3<Yc21/Yc22<1.20$.

21. The optical lens assembly of claim 17, wherein the axial distance between the first lens element and the second lens element is T12, an axial distance between the second lens element and the third lens element is T23, and the following condition is satisfied:

$0.50<T12/T23<6.0$.

22. The optical lens assembly of claim 17, wherein a maximum value among Abbe numbers of all lens elements of the optical lens assembly is Vdmax, a minimum value among Abbe numbers of all lens elements of the optical lens assembly is Vdmin, the focal length of the optical lens assembly at the wavelength of helium d-line is fd, a distance in parallel with an optical axis between a maximum effective radius position of the object-side surface of the first lens element and a maximum effective radius position of an image-side surface of the first lens element is ET1, and the following conditions are satisfied:

$Vdmax-Vdmin<10$; and $fd/ET1<6.0$.

23. The optical lens assembly of claim 17, wherein the central thickness of the first lens element is CT1, the central thickness of the second lens element is CT2, a central thickness of the third lens element is CT3, and the following conditions are satisfied:

$2.0<CT1/CT2$; and $1.0<CT1/CT3$.

24. The optical lens assembly of claim 17, wherein each of the first lens element, the second lens element, the third lens element and the fourth lens element has at least one lens surface with at least one critical point in an off-axis region thereof.

25. An image capturing unit, comprising:
the optical lens assembly of claim 17; and
an image sensor disposed on the image surface of the optical lens assembly.

26. An electronic device, comprising:
the image capturing unit of claim 25.

27. An optical lens assembly comprising four lens elements, the four lens elements being, in order from an object side to an image side along an imaging optical path, a first lens element, a second lens element, a third lens element and a fourth lens element;
wherein the first lens element has positive refractive power, the second lens element has an image-side surface being concave in a paraxial region thereof, the third lens element has positive refractive power, the fourth lens element with negative refractive power has an object-side surface being convex in a paraxial region thereof and an image-side surface being concave in a paraxial region thereof, and at least one of the object-side surface and the image-side surface of the fourth lens element has at least one inflection point in an off-axis region thereof;

wherein an Abbe number of the first lens element is Vd1, an Abbe number of the second lens element is Vd2, an Abbe number of the third lens element is Vd3, an Abbe number of the fourth lens element is Vd4, a central thickness of the first lens element is CT1, a central thickness of the second lens element is CT2, a central thickness of the fourth lens element is CT4, an axial distance between the first lens element and the second lens element is T12, an axial distance between an object-side surface of the first lens element and the image-side surface of the fourth lens element is TD, an axial distance between the image-side surface of the fourth lens element and an image surface is BL, a focal length of the optical lens assembly at a wavelength of helium d-line is fd, a curvature radius of the image-side surface of the second lens element is R4, a curvature radius of the object-side surface of the fourth lens element is R7, and the following conditions are satisfied:

$Vd1+Vd2+Vd3+Vd4<130$;

$1.0<CT1/(T12+CT2)$;

$2.25<TD/BL$;

$0.10<fd/R7$;

$0.10<fd/R4$; and $1.20 \leq CT1/CT4$.

28. The optical lens assembly of claim 27, wherein the second lens element has positive refractive power, and the second lens element has an object-side surface being convex in a paraxial region thereof.

29. The optical lens assembly of claim 27, wherein the axial distance between the object-side surface of the first lens element and the image-side surface of the fourth lens element is TD, the central thickness of the first lens element is CT1, and the following condition is satisfied:

$1.0<TD/CT1<5.0$.

30. The optical lens assembly of claim 27, wherein a maximum value among Abbe numbers of all lens elements of the optical lens assembly is Vdmax, a minimum value among Abbe numbers of all lens elements of the optical lens assembly is Vdmin, the focal length of the optical lens assembly at the wavelength of helium d-line is fd, a distance in parallel with an optical axis between a maximum effective radius position of the object-side surface of the first lens element and a maximum effective radius position of an image-side surface of the first lens element is ET1, and the following conditions are satisfied:

$Vdmax-Vdmin<10$; and $fd/ET1<6.0$.

31. The optical lens assembly of claim 27, wherein each of the first lens element, the second lens element, the third lens element and the fourth lens element has at least one lens surface with at least one critical point in an off-axis region thereof.

* * * * *